United States Patent
Li et al.

(10) Patent No.: US 10,924,743 B2
(45) Date of Patent: Feb. 16, 2021

(54) SKIPPING EVALUATION STAGES DURING MEDIA ENCODING

(71) Applicants: Microsoft Technology Licensing, LLC, Redmond, WA (US); Bin Li, Beijing (CN); Jizheng Xu, Beijing (CN)

(72) Inventors: Bin Li, Beijing (CN); Jizheng Xu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 552 days.

(21) Appl. No.: 15/549,261

(22) PCT Filed: Feb. 6, 2015

(86) PCT No.: PCT/CN2015/072408
§ 371 (c)(1),
(2) Date: Aug. 7, 2017

(87) PCT Pub. No.: WO2016/123792
PCT Pub. Date: Aug. 11, 2016

(65) Prior Publication Data
US 2018/0014017 A1    Jan. 11, 2018

(51) Int. Cl.
*H04N 19/132* (2014.01)
*H04N 19/119* (2014.01)
*H04N 19/52* (2014.01)
*H04N 19/172* (2014.01)
*H04N 19/147* (2014.01)
(Continued)

(52) U.S. Cl.
CPC ......... *H04N 19/132* (2014.11); *H04N 19/119* (2014.11); *H04N 19/127* (2014.11);
(Continued)

(58) Field of Classification Search
None
See application file for complete search history.

(56) References Cited

U.S. PATENT DOCUMENTS

| 6,753,878 B1 | 6/2004 | Heirich et al. |
| 6,763,068 B2 | 7/2004 | Oktem |

(Continued)

FOREIGN PATENT DOCUMENTS

| CN | 1694533 | 11/2005 |
| CN | 102055977 | 5/2011 |

(Continued)

OTHER PUBLICATIONS

Hsu et al., "Fast Coding Unit Decision Algorithm for HEVC," *Signal and Information Processing Association Annual Summit and Conf.*, 5 pp. (Oct. 2013).
(Continued)

*Primary Examiner* — Dave Czekaj
*Assistant Examiner* — Shanika M Brumfield
(74) *Attorney, Agent, or Firm* — Klarquist Sparkman, LLP

(57) ABSTRACT

Various innovations in media encoding are presented herein. In particular, the innovations can reduce the computational complexity of encoding by selectively skipping certain evaluation stages during encoding. For example, based on analysis of decisions made earlier in encoding or based on analysis of media to be encoded, an encoder can selectively skip evaluation of certain coding tools (such as residual coding or rate-distortion-optimized quantization), skip evaluation of certain values for parameters or settings (such as candidate unit sizes or transform sizes, or candidate partition patterns for motion compensation), and/or skip evaluation of certain coding modes (such as frequency transform skip mode) that are not expected to improve rate-distortion performance during encoding.

20 Claims, 22 Drawing Sheets

(51) Int. Cl.
    *H04N 19/127*     (2014.01)
    *H04N 19/176*     (2014.01)
    *H04N 19/61*     (2014.01)
    *H04N 19/70*     (2014.01)

(52) U.S. Cl.
    CPC ......... *H04N 19/147* (2014.11); *H04N 19/172* (2014.11); *H04N 19/176* (2014.11); *H04N 19/52* (2014.11); *H04N 19/61* (2014.11); *H04N 19/70* (2014.11)

(56) References Cited

U.S. PATENT DOCUMENTS

| | | |
|---|---|---|
| 7,260,148 B2 | 8/2007 | Sohm |
| 7,580,456 B2 | 8/2009 | Li et al. |
| 7,733,380 B1 | 6/2010 | Cote et al. |
| 7,764,738 B2 | 7/2010 | Kim et al. |
| 7,843,995 B2 | 11/2010 | Bhaskaran et al. |
| 7,903,733 B2 | 3/2011 | Panda et al. |
| 8,254,455 B2 | 8/2012 | Wu et al. |
| 8,270,467 B1 | 9/2012 | Wang |
| 8,295,356 B2 | 10/2012 | He et al. |
| 8,331,449 B2 | 12/2012 | Kim et al. |
| 8,335,255 B2 | 12/2012 | Lee et al. |
| 8,379,728 B2 | 2/2013 | Katzur et al. |
| 8,379,996 B2 | 2/2013 | Murata et al. |
| 8,428,373 B2 | 4/2013 | Jeon et al. |
| 8,457,202 B2 | 6/2013 | Wang et al. |
| 8,467,448 B2 | 6/2013 | Hsiang et al. |
| 8,514,933 B2 | 8/2013 | Liang et al. |
| 8,693,551 B2 | 4/2014 | Zheludkov et al. |
| 8,737,477 B2 | 5/2014 | Du La et al. |
| 8,743,949 B2 | 6/2014 | Srinivasan et al. |
| 8,804,836 B2 | 8/2014 | Nilsson et al. |
| 9,137,544 B2 | 9/2015 | Lin et al. |
| 9,219,915 B1 | 12/2015 | Bultje et al. |
| 2002/0025001 A1 | 2/2002 | Ismaeil et al. |
| 2003/0156648 A1 | 8/2003 | Holcomb et al. |
| 2003/0198294 A1* | 10/2003 | Zaccarin ............ H04N 19/119 375/240.16 |
| 2004/0264575 A1 | 12/2004 | Bjontegaard |
| 2005/0069211 A1 | 3/2005 | Lee et al. |
| 2005/0084012 A1 | 4/2005 | Hsu et al. |
| 2005/0207497 A1 | 9/2005 | Rovati et al. |
| 2006/0098738 A1 | 5/2006 | Cosman et al. |
| 2006/0133511 A1* | 6/2006 | Chen ................ H04N 19/197 375/240.24 |
| 2006/0164543 A1 | 7/2006 | Richardson et al. |
| 2007/0030894 A1 | 2/2007 | Tian et al. |
| 2007/0031051 A1 | 2/2007 | Lee et al. |
| 2007/0140344 A1 | 6/2007 | Shima |
| 2007/0177668 A1 | 8/2007 | Park |
| 2007/0263720 A1 | 11/2007 | He |
| 2007/0274396 A1 | 11/2007 | Zhang et al. |
| 2008/0279466 A1 | 11/2008 | Yang |
| 2009/0073005 A1 | 3/2009 | Normile et al. |
| 2009/0129472 A1 | 5/2009 | Panusopone et al. |
| 2009/0190660 A1 | 7/2009 | Kusakabe et al. |
| 2009/0245353 A1 | 10/2009 | Choi et al. |
| 2009/0290641 A1 | 11/2009 | Crinon et al. |
| 2010/0020872 A1 | 1/2010 | Shimizu et al. |
| 2010/0061447 A1 | 3/2010 | Tu et al. |
| 2010/0074338 A1 | 3/2010 | Yamori |
| 2010/0150253 A1 | 6/2010 | Kuo et al. |
| 2010/0189179 A1 | 7/2010 | Gu et al. |
| 2010/0215104 A1 | 8/2010 | Osamoto et al. |
| 2010/0246684 A1 | 9/2010 | Naito et al. |
| 2010/0260271 A1 | 10/2010 | Kapoor |
| 2010/0290521 A1 | 11/2010 | Liu et al. |
| 2011/0013700 A1 | 1/2011 | Kim |
| 2011/0051813 A1 | 3/2011 | Krishnan et al. |
| 2011/0109753 A1 | 5/2011 | Srinivasamurthy et al. |
| 2011/0142134 A1 | 6/2011 | Wahadaniah |
| 2011/0164677 A1 | 7/2011 | Lu et al. |
| 2011/0200264 A1 | 8/2011 | Park |
| 2011/0243225 A1 | 10/2011 | Min et al. |
| 2011/0268187 A1 | 11/2011 | Lamy-Bergot et al. |
| 2011/0274357 A1 | 11/2011 | Iwamoto et al. |
| 2011/0286520 A1 | 11/2011 | Xu et al. |
| 2011/0292998 A1 | 12/2011 | Ohgose et al. |
| 2012/0195366 A1 | 8/2012 | Liu et al. |
| 2012/0200663 A1 | 8/2012 | Sievers et al. |
| 2012/0281760 A1 | 11/2012 | Kim |
| 2013/0003838 A1 | 1/2013 | Gao et al. |
| 2013/0003860 A1 | 1/2013 | Sasai et al. |
| 2013/0016777 A1 | 1/2013 | Gao et al. |
| 2013/0021483 A1 | 1/2013 | Bennett et al. |
| 2013/0028317 A1 | 1/2013 | Parfenov et al. |
| 2013/0089143 A1 | 4/2013 | Siddaramanna et al. |
| 2013/0114696 A1 | 5/2013 | Liu |
| 2013/0114730 A1 | 5/2013 | Joshi et al. |
| 2013/0121401 A1 | 5/2013 | Zheludkov et al. |
| 2013/0128952 A1 | 5/2013 | Kwon et al. |
| 2013/0128964 A1 | 5/2013 | Chien et al. |
| 2013/0216149 A1 | 8/2013 | Sato |
| 2013/0230098 A1 | 9/2013 | Song et al. |
| 2013/0272389 A1 | 10/2013 | Sze et al. |
| 2013/0308696 A1 | 11/2013 | Kim et al. |
| 2013/0343462 A1 | 12/2013 | Li et al. |
| 2013/0343464 A1 | 12/2013 | Van der Auwera et al. |
| 2014/0010293 A1* | 1/2014 | Srinivasan ........... H04N 19/119 375/240.12 |
| 2014/0056516 A1* | 2/2014 | Wee .................... G06T 9/00 382/166 |
| 2014/0064359 A1 | 3/2014 | Rapaka et al. |
| 2014/0079133 A1 | 3/2014 | Sato |
| 2014/0219331 A1 | 8/2014 | Pai et al. |
| 2014/0219342 A1 | 8/2014 | Yu et al. |
| 2014/0219349 A1 | 8/2014 | Chien et al. |
| 2014/0226713 A1 | 8/2014 | Perlman et al. |
| 2014/0229186 A1 | 8/2014 | Mehrotra et al. |
| 2014/0241420 A1 | 8/2014 | Orton-Jay et al. |
| 2014/0254676 A1 | 9/2014 | Jiang et al. |
| 2014/0269919 A1 | 9/2014 | Rodriguez |
| 2014/0301465 A1 | 10/2014 | Kwon et al. |
| 2014/0369413 A1 | 12/2014 | Clark |
| 2015/0098500 A1 | 4/2015 | Oh et al. |
| 2015/0189269 A1 | 7/2015 | Han et al. |
| 2015/0271510 A1 | 9/2015 | Wen et al. |
| 2016/0094855 A1 | 3/2016 | Zhou |

FOREIGN PATENT DOCUMENTS

| | | | | |
|---|---|---|---|---|
| CN | 102148989 | | 8/2011 | |
| CN | 102665078 | | 9/2012 | |
| CN | 103118262 | | 5/2013 | |
| CN | 103248895 | | 8/2013 | |
| CN | 103281538 | | 9/2013 | |
| CN | 103384327 | | 11/2013 | |
| CN | 103533325 | | 1/2014 | |
| CN | 103763570 | | 4/2014 | |
| CN | 107197251 A * | 9/2017 | |
| EP | 1369820 | | 12/2003 | |
| EP | 1603338 | | 12/2005 | |
| EP | 1761069 | | 3/2007 | |
| EP | 2618572 | | 7/2013 | |
| EP | 2618572 A1 * | 7/2013 | ............. H04N 19/48 |
| EP | 2618752 | | 7/2013 | |
| JP | 2003-244696 | | 8/2003 | |
| JP | 2006-339774 | | 12/2006 | |
| WO | WO 2004/080084 | | 9/2004 | |
| WO | WO 2012/071949 | | 6/2012 | |
| WO | WO 2013/028580 | | 2/2013 | |
| WO | WO 2013/143103 | | 10/2013 | |
| WO | WO 2013/181821 | | 12/2013 | |
| WO | WO 2014/083491 | | 6/2014 | |

OTHER PUBLICATIONS

International Search Report and Written Opinion dated Nov. 11, 2015, from International Patent Application No. PCT/CN2015/072408, 7 pp.

(56) References Cited

OTHER PUBLICATIONS

Kim et al., "Fast Skip Mode Decision with Rate-Distortion Optimization for High Efficiency Video Coding," *IEEE Int'l Conf. on Multimedia and Expo Workshops*, 6 pp. (Jul. 2014).
Lan et al., "Intra Transform Skipping," JCTVC-I0408, 11 pp. (May 2012).
Lei et al., "Fast Intra Prediction Mode Decision for High Efficiency Video Coding," *Int'l Symp. on Computer, Communication, Control and Automation*, pp. 34-37 (Nov. 2013).
Shen et al., "CU Splitting Early Termination Based on Weighted SVM," *EURASIP Journal on Image and Video Processing*, 8 pp. (Jan. 2013).
Shen et al., "Effective CU Size Decision for HEVC Intracoding," *IEEE Trans. on Image Processing*, vol. 23, No. 10, pp. 4232-4241 (Oct. 2014).
Teng et al., "Fast Mode Decision Algorithm for Residual Quadtree Coding in HEVC," *IEEE Visual Communications and Image Processing*, 4 pp. (Nov. 2011).
Tian et al., "Content Adaptive Prediction Unit Size Decision Algorithm for HEVC Intra Coding," *Picture Coding Symp.*, 4 pp. (May 2012).
Wang et al., "An Effective TU Size Decision Method for Fast HEVC Encoders," *Int'l Symp. on Computer, Consumer and Control*, 4 pp. (Jun. 2014).
Won et al., "Transform Skip Based on Minimum TU Size," JCTVC-N0167, 10 pp. (Aug. 2013).
Yu et al., "Early Termination of Coding Unit Splitting for HEVC," *Signal & Information Processing Association Annual Summit and Conf.*, 4 pp. (Dec. 2012).
Zhang et al., "Fast Intra Prediction for High Efficiency Video Coding," *Advances in Multimedia Information Processing*, pp. 568-577 (Dec. 2012).
Communication pursuant to Article 94(3) EPC dated Feb. 5, 2018, from European Patent Application No. 15880748.7, 6 pp.
Notice on the First Office Action dated Oct. 15, 2018, from Chinese Patent Application No. 201580026724.6, 12 pp.
Search Report dated Jan. 17, 2018, from European Patent Application No. 15880748.7, 5 pp.
Notice on Grant of Patent dated Apr. 24, 2019, from Chinese Patent Application No. 201580026724.6, 4 pp.
Al et al., "Quality and Complexity Comparison of H.264 Intra Mode with JPEG2000 and JPEG," *IEEE Int'l Conf. on Image Processing*, vol. 1, pp. 525-528 (Oct. 2004).
Armbrust, "Capturing Growth: Photo Apps and Open Graph," 8 pp., downloaded from https://developers.facebook.com/blog/post/2012/07/17/capturing-growth--photo-apps-and-open-graph/ (Jul. 17, 2012).
BenHajyoussef et al., "Fast Gradient Based Intra Mode Decision for High Efficiency Video Coding," *Int'l Journal of Emerging Trends & Technology in Computer Science*, vol. 3, Issue 3, pp. 223-228 (May 2014).
Bhaskaranand et al., "Low-complexity Video Encoding for UAV Reconnaissance and Surveillance," *Proc. of Military Communications Conference*, 6 pp. (Nov. 2011).
Bjontegaard, "Calculation of Average PSNR Differences Between RD-curves," ITU-T VCEG-M33, 4 pp. (Apr. 2001).
Bross et al., "High Efficiency Video Coding (HEVC) Text Specification Draft 8," JCTVC-J1003_d7, 260 pp. (Jul. 2012).
Chang et al., "A Two Level Mode Decision Algorithm for H.264 High Profile Intra Encoding," *IEEE Int'l Symp. On Circuits and Systems*, pp. 508-511 (May 2012).
Chen et al., "Fast Integer Pel and Fractional Pel Motion Estimation for AVC," ISO/IEC MPEG 2002/M9117, 16 pp. (Nov. 2002).
Chen et al., "Fast Motion Estimation for JVT," JVT-G016, 12 pp. (Mar. 2003).
Deng et al., "Fast Mode Decision Algorithm for Inter-Layer Intra Prediction in SVC," *IEEE Int'l Conf. on Broadband Network and Multimedia Technology*, pp. 212-216 (Oct. 2011).
Ding et al., "Enable Efficient Compound Image Compression in H.264/AVC Intra Coding," *IEEE Int'l Conf. on Image Processing*, vol. 2, pp. 337-340 (Sep. 2007).

Do et al., "An Early Block Type Decision Method for Intra Prediction in H.264/AVC," *IEEE Workshop on Signal Processing Systems*, pp. 97-101 (Oct. 2009).
Fernando et al., "DFD Based Segmentation for H.263 Video Sequences," *IEEE Int'l Symp. On Circuits and Systems*, vol. 4, pp. 520-523 (May 1999).
Flynn et al., "High Efficiency Video Coding (HEVC) Range Extensions Text Specification: Draft 6," JCTVC-P1005_v1, 355 pp. (Jan. 2014).
Fritts et al., "Fast Intra-Prediction Mode Selection for H.264," PowerPoint presentation, downloaded from the World Wide Web, 23 pp. (downloaded on Apr. 17, 2015—document not dated).
Gabriellini et al., "Adaptive Transform Skipping for Improved Coding of Motion Compensated Residuals," BBC Research & Development White Paper, WHP 246, 22 pp. (Mar. 2013).
Gan et al., "Novel Multi-frame Fast Motion Search Algorithm Based on H.264," *Journal on Communications*, vol. 28, No. 1, pp. 17-21 (Jan. 2007).
Gardos et al., "Video Codec Test Model, Near-Term, Version 8 (TMN8)," ITU Study Group 16, Document Q15-A-59, 56 pp. (Jun. 1997).
"How VP9 Works, Technical Details & Diagrams," downloaded from the World Wide Web, 12 pp. (document marked Oct. 2013).
Hu et al., "Analysis and Optimization of x265 Encoder," *IEEE Visual Communications and Image Processing Conf.*, pp. 502-505 (Dec. 2014).
Hu et al., "Fast Inter-Mode Decision Based on Rate-Distortion Cost Characteristics," *Proc. of the Advances in Multimedia Information Processing and 11th Pacific Rim Conf. on Multimedia*, pp. 145-155 (Sep. 2010).
Huade et al., "A Fast CU Size Decision Algorithm Based on Adaptive Depth Selection for HEVC Encoder," *IEEE Int'l Conf. on Audio, Language and Image Processing*, pp. 143-146 (Jul. 2014).
Jiang et al., "Gradient Based Fast Mode Decision Algorithm for Intra Prediction in HEVC," *Int'l Conf. on Consumer Electronics, Communications and Networks*, pp. 1836-1840 (Jan. 2012).
Khan et al., "Fast Hierarchical Intra Angular Mode Selection for High Efficiency Video Coding," *Proc. Int'l Conf. on Image Processing*, 5 pp. (Oct. 2014).
Kibeya et al., "A Fast Coding Algorithm Based on Fast Mode Decision for HEVC Standard," *IEEE Int'l Conf. on Sciences and Techniques of Automatic Control & Computer Engineering*, pp. 158-163 (Dec. 2013).
Kim et al., "A Fast Intra Mode Skip Decision Algorithm Based on Adaptive Motion Vector Map," *Digest of Technical Papers Int'l Conf. on Consumer Electronics*, 2 pp. (Jan. 2009).
Kim et al., "A Fast Intra Mode Skip Decision Algorithm Based on Adaptive Motion Vector Map," *IEEE Trans. On Consumer Electronics*, vol. 55, No. 1, pp. 179-184 (Feb. 2009).
Kim et al., "A Fast Intra Skip Detection Algorithm for H.264/AVC Video Encoding," *ETRI Journal*, vol. 28, No. 6, pp. 721-731 (Dec. 2006).
Kim et al., "An Efficient and Fast Block Size Decision Exploiting Boundary Information of Inner Block for H.264/AVC Intra Prediction," *IEEE Southwest Symp. On Image Analysis and Interpretation*, pp. 101-104 (Mar. 2008).
Kim et al., "Block Partitioning Structure in the HEVC Standard," *IEEE Trans. On Circuits and Systems for Video Technology*, vol. 22, No. 12, pp. 1697-1706 (Dec. 2012).
Kim et al., "Efficient Intra-mode Decision Algorithm for Inter-frames in H.264/AVC Video Coding," *IET Image Processing*, vol. 5, No. 3, pp. 286-295 (Apr. 2011).
Kim et al., "Fast Coding Unit Size Decision Algorithm for Intra Coding in HEVC," *IEEE Int'l Conf. on Consumer Electronics*, pp. 637-638 (Jan. 2013).
Kim et al., "Fast Intra/Inter Mode Decision for H.264 Encoding Using a Risk-Minimization Criterion," *SPIE Proc., Applications of Digital Image Process*, vol. 5558, 11 pp. (Nov. 2004).
Kim et al., "Fast Intra Mode Decision of HEVC Based on Hierarchical Structure," *Proc. 8th Int'l Conf. on Information, Communications, and Signal Processing*, 4 pp. (Dec. 2011).
Kim et al., "TE9-1 Report on Performance Tests for Different CTU and TU Sizes," JCTVC-C067, 13 pp. (Oct. 2010).

(56) References Cited

OTHER PUBLICATIONS

Lan et al., "Compress Compound Images in H.264/MPEG-4 AVC by Exploiting Spatial Correlation," *IEEE Trans. on Image Processing*, vol. 19, No. 4, pp. 946-957 (Apr. 2010).

Lee et al., "Early Termination of Transform Skip Mode for High Efficiency Video Coding," *Int'l Conf. on Communications, Signal Processing and Computers*, pp. 177-181 (Feb. 2014).

Lee et al., "Fast Direct Mode Decision Algorithm Based on Optimal Mode Pattern Searching," *Int'l Journal of Multimedia and Ubiquitous Engineering*, vol. 7, No. 2, pp. 415-420 (Apr. 2012).

Li et al., "Description of Screen Content Coding Technology Proposal by Microsoft," JCTVC-Q0035, 27 pp. (Mar. 2014).

Li et al., "Low Complexity Encoders for JCTVC-Q0035," JCTVC-Q0052, 4 pp. (Mar. 2014).

Liang et al., "A Light-Weight HEVC Encoder for Image Coding," *Visual Communications and Image Processing*, 5 pp. (Nov. 2013).

Liao et al., "Rate-Distortion Cost Estimation for H.264/AVC," *IEEE Trans. on Circuits and Systems for Video Technology*, vol. 20, No. 1, pp. 38-49 (Jan. 2010).

Lin et al., "CE6 Subset 5.2.2 and 6.2.2: Intra Coding Improvements," JCTVC-H0057, 6 pp. (Feb. 2012).

Lin et al., "Fast Mode Decision for H.264 Based on Rate-Distortion Cost Estimation," *IEEE Int'l Conf. on Acoustics, Speech and Signal Processing*, vol. 1, 4 pp. (Apr. 2007).

Ma et al., "Rate Distortion Cost Modeling of Skip Mode and Early Skip Mode Selection for H.264," *SPIE Proc., Visual Communications and Image Processing*, vol. 7257, 4 pp. (Jan. 2009).

Microsoft Corporation, "Codec API Properties," downloaded from the World Wide Web, 10 pp. (downloaded on Apr. 17, 2015).

Microsoft Corporation, "H.264 Video Encoder," downloaded from the World Wide Web, 8 pp. (downloaded on Apr. 17, 2015).

Microsoft Corporation, "ICodecAPI Interface," downloaded from the World Wide Web, 3 pp. (downloaded on Apr. 17, 2015).

Microsoft Corporation, "IMFSample Interface," downloaded from the World Wide Web, 3 pp. (downloaded on Apr. 17, 2015).

Microsoft Corporation, "IMFTransform Interface," downloaded from the World Wide Web, 3 pp. (downloaded on Apr. 17, 2015).

Microsoft Corporation, "Sample Attributes," downloaded from the World Wide Web, 3 pp. (downloaded on Apr. 17, 2015).

Mrak et al., "Improving Screen Content Coding in HEVC by Transform Skipping," *20th European Signal Processing Conf.*, pp. 1209-1213 (Aug. 2012).

Nguyen et al., "Performance Analysis of HEVC-based Intra Coding for Still Image Compression," *Picture Coding Symposium*, pp. 233-236 (May 2012).

Pan et al., "Content Adaptive Frame Skipping for Low Bit Rate Video Coding," *Int'l Conf. on Information, Communications and Signal Processing*, pp. 230-234 (Dec. 2003).

Panusopone et al., "Evaluation of RQT in HM and Related TU Representation," JCTVC-E365, 9 pp. (Mar. 2011).

Panusopone et al., "Evaluation of RQT in HM and Related TU Representation," JCTVC-E365 slideshow, 9 pp. (Mar. 2011).

Piao et al., "Encoder Improvement of Unified Intra Prediction," JCTVC-C207, 5 pp. (Oct. 2010).

Rhee et al., "A Survey of Fast Mode Decision Algorithms for Inter-Prediction and Their Applications to High Efficiency Video Coding," *IEEE Trans. on Consumer Electronics*, vol. 58, No. 4, pp. 1375-1383 (Nov. 2012).

Richardson et al., "Fast H.264 Skip Mode Selection Using an Estimation Framework," *Proc. of Picture Coding Symp.*, 5 pp. (Apr. 2006).

Rodriguez et al., "Using Telemetry Data for Video Compression On Unmanned Air Vehicles," *AIAA Guidance, Navigation and Control Conference*, 8 pp. (Aug. 2006).

Sharabayko et al., "Research on H.265/HEVC Intra Prediction Modes Selection Frequencies," *Int'l Conf. for Students and Young Scientists*, 3 pp. (Apr. 2014).

Shen et al., "Adaptive Transform Size Decision Algorithm for High-Efficiency Video Coding Inter Coding," *Journal of Electronic Imaging*, vol. 23, Issue 4, 9 pp. (Aug. 2014).

Shen et al., "Fast Coding Unit Size Selection for HEVC Based on Bayesian Decision Rule," *Picture Coding Symp.*, pp. 453-456 (May 2012).

Shen et al., "Fast CU Size Decision and Mode Decision Algorithm for HEVC Intra Coding," *IEEE Trans. On Consumer Electronics*, vol. 59, No. 1, pp. 207-213 (Feb. 2013).

Smith, "Ooh! Aah! Google Images Presents a Nicer Way to Surf the Visual Web," 4 pp., downloaded from http://googleblog.blogspot.com/2010/07/ooh-ahh-google-images-presents-nicer.html (Jul. 20, 2010).

Sullivan et al., "The H.264/AVC Advanced Video Coding Standard: Overview and Introduction to the Fidelity Range Extensions," *SPIE Conf. on Applications of Digital Image Processing*, vol. 5558, pp. 454-474 (Aug. 2004).

Sun et al., "An Efficient Multi-Frame Dynamic Search Range Motion Estimation for H.264," *Visual Communications and Image Processing*, vol. 6508, 10 pp. (Jan. 2007).

Supplementary Partial European Search Report dated Oct. 13, 2017, from European Patent Application No. 15880748.7, 9 pp.

Tabatabai et al., "Core Experiment 6: Intra Prediction Improvement," JCTVC-D606_r1, 13 pp. (Jan. 2011).

Tagliasacchi et al., "Hash-Based Motion Modeling in Wyner-Ziv Video Coding," *IEEE Int'l Conf. on Acoustics, Speec and Signal Processing*, vol. 1, pp. 509-512 (Apr. 2007).

U et al., "An Early Intra Mode Skipping Technique for Inter Frame Coding in H.264 BP," *Digest of Technical Papers, Int'l Conf. on Consumer Electronic*, 2 pp. (Jan. 2007).

Usach-Molina et al., "Content-Based Dynamic Threshold Method for Real-Time Keyframe Selecting," *IEEE Trans. On Circuits and Systems for Video Technology*, vol. 20, No. 7, pp. 982-993 (Jul. 2010).

Vanam, "Motion Estimation and Intra Frame Prediction in H.264/AVC Encoder," Powerpoint presentation, downloaded from the World Wide Web, 31 pp. (Nov. 2013).

Wang et al., "An Efficient Intra Skip Decision Algorithm for H.264/AVC Video Coding," *Journal of Applied Science and Engineering*, vol. 17, No. 3, pp. 329-339 (May 2014).

Wang et al., "An Efficient Mode Decision Algorithm for H.264/AVC Encoding Optimization," *IEEE Trans. on Multimedia*, vol. 9, No. 4, pp. 882-888 (Jun. 2007).

Wang et al., "Prediction of Zero Quantized DCT Coefficients in H.264/AVC Using Hadamard Transformed Information," *IEEE Trans. on Circuits and Systems for Video Technology*, vol. 18, No. 4, pp. 510-515 (Apr. 2008).

Wei et al., "A Fast Macroblock Mode Decision Algorithm for H.264," *IEEE Asia Pacific Conf. on Circuits and Systems*, pp. 772-775 (Dec. 2006).

Wiegand et al., "Draft ITU-T Recommendation and Final Draft International Standard of Joint Video Specification (ITU-T Rec. H.264 – ISO/IEC 14496-10 AVC)," JVT-G050r1, 269 pp. (May 2003).

Xin et al., "Fast Inter Prediction Block Mode Decision Approach for H.264/AVC Based on All-Zero Blocks Detection," *IEEE Conf. on Industrial Electronics and Applications*, pp. 896-899 (Jun. 2013).

Zhang et al., "Early Termination Schemes for Fast Intra Mode Decision in High Efficiency Video Coding," *IEEE Int'l Symp. on Circuits and Systems*, pp. 45-48 (May 2013).

Zhang et al., "Improved Intra Prediction Mode-decision Method," *Visual Communications and Image Processing*, vol. 5960, pp. 632-646 (Jul. 2005).

Zhao et al., "Further Encoder Improvement of Intra Mode Decision," JCTVC-D283, 4 pp. (Jan. 2011).

Zhao et al., "Further Encoder Improvement of Intra Mode Decision," JCTVC-D283 slideshow, 14 pp. (Jan. 2011).

\* cited by examiner software 180 implementing one or more innovations for skipping evaluation stages during media encoding

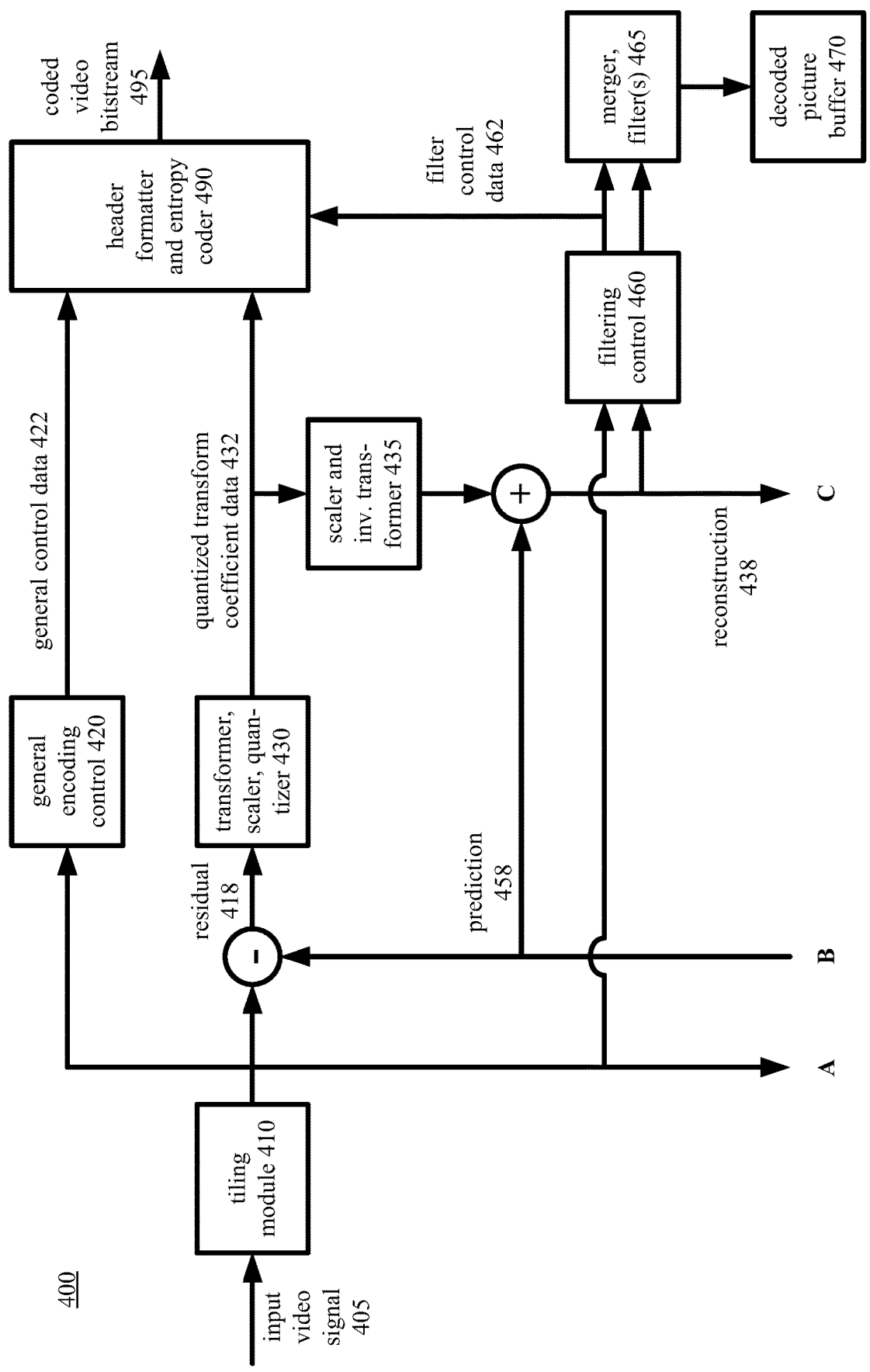

400 left 16x16 unit (631) in left area (630) (*e.g.*, left CU in left CTU) and above
16x16 unit (651) in above area (650) (*e.g.*, above CU in above CTU) for current
64x64 unit (611) of current area (610) (*e.g.*, current CU of current CTU)

left 16x16 unit (631) in left area (630) (*e.g.*, left CU in left CTU) and above
16x16 unit (651) in above area (650) (*e.g.*, above CU in above CTU) for current
32x32 unit (612) of current area (610) (*e.g.*, current CU of current CTU)

left 8x8 unit (633) in left area (630) (*e.g.*, left CU in left CTU) and above 16x16 units (653) in current area (610) (*e.g.*, above CU in current CTU) for current 16x16 unit (613) of current area (610) (*e.g.*, current CU of current CTU)

left 8x8 unit in left area (630) (*e.g.*, left CU in left CTU) and above 8x8 unit in current area (610) (*e.g.*, above CU in current CTU) for current 32x32 unit (614) of current area (610) (*e.g.*, current CU of current CTU)

FIG. 16b 1601 (example of 1640)

for current unit (1711), evaluate candidate MVs for contextual motion mode with residual coding skip mode on, including MVs from spatially adjacent neighbor units (1721 - 1725) and temporally adjacent neighbor unit (1731)

for current unit (1711), evaluate subset of the candidate MVs for contextual motion mode with residual coding skip mode off

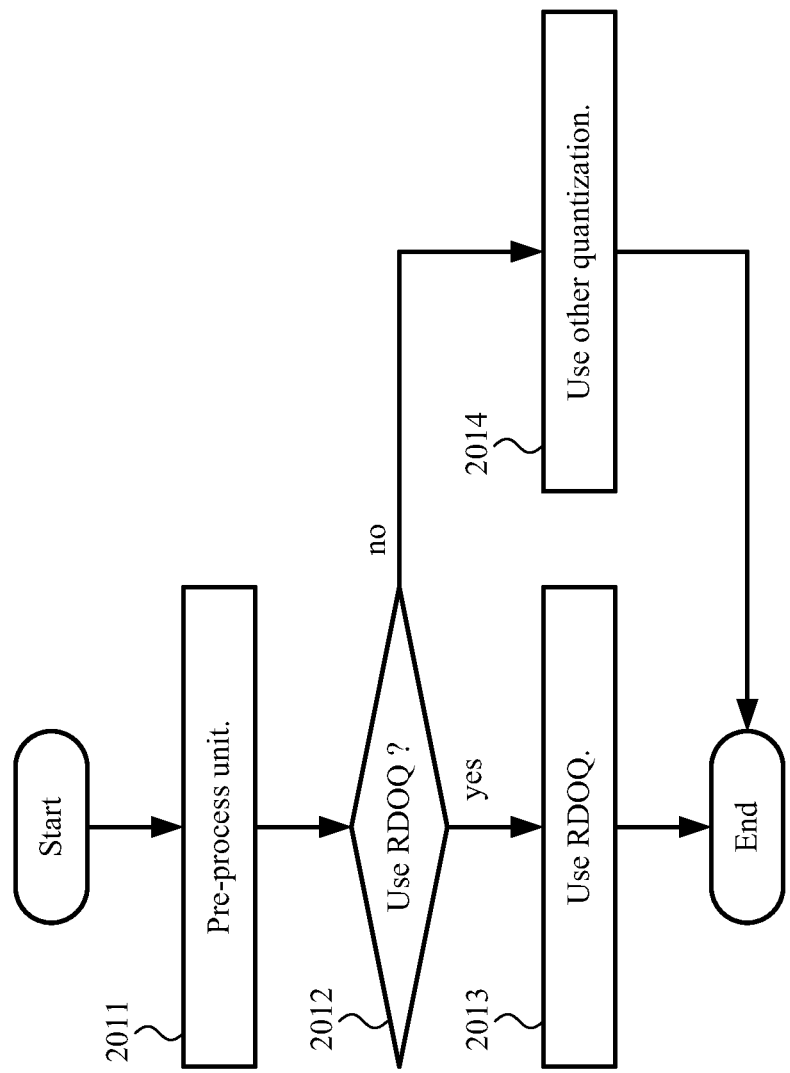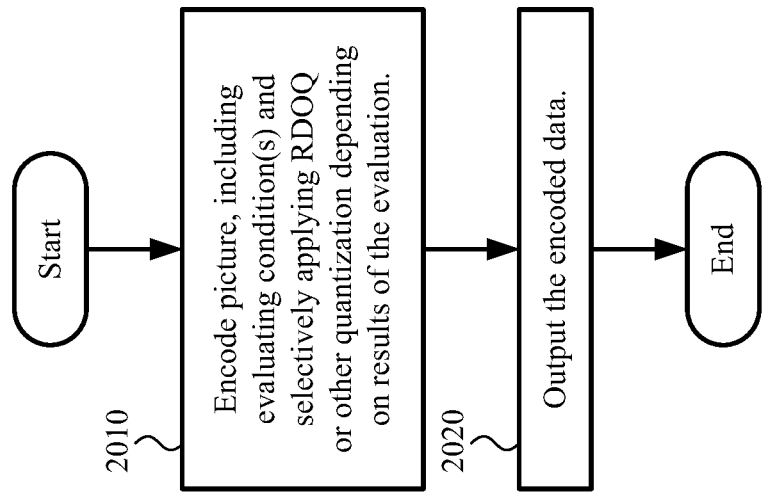

FIG. 21

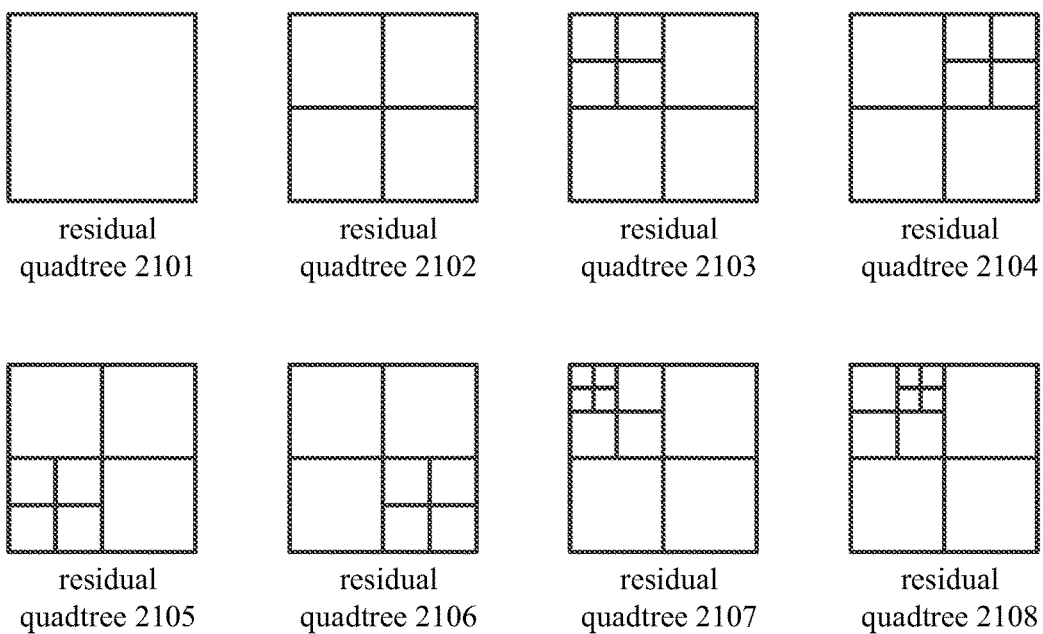

residual quadtree 2101 residual quadtree 2102 residual quadtree 2103 residual quadtree 2104 residual quadtree 2105 residual quadtree 2106 residual quadtree 2107 residual quadtree 2108

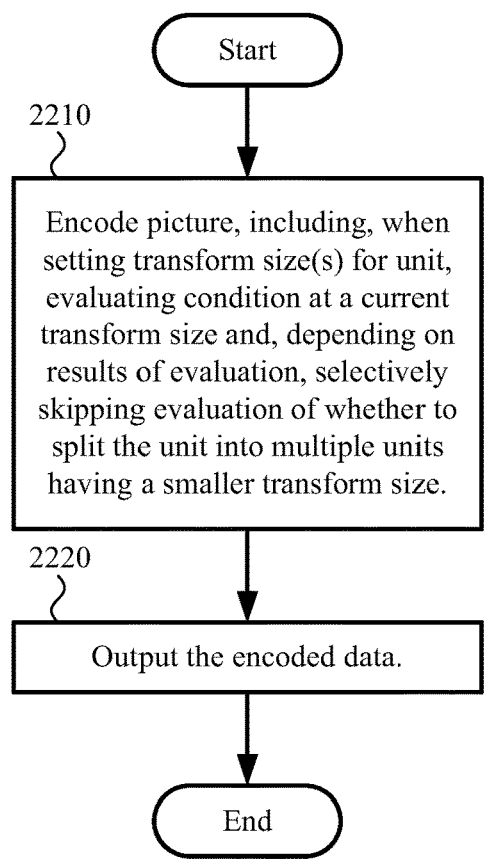

2200

2210 Encode picture, including, when setting transform size(s) for unit, evaluating condition at a current transform size and, depending on results of evaluation, selectively skipping evaluation of whether to split the unit into multiple units having a smaller transform size.

2220 Output the encoded data.

FIG. 23      2300
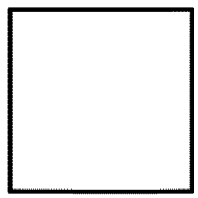
2Nx2N partition pattern
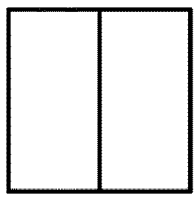
Nx2N partition pattern
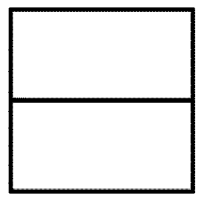
2NxN partition pattern
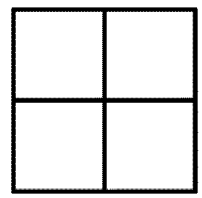
NxN partition pattern
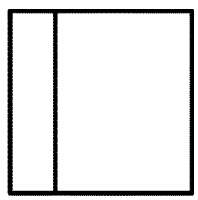
nLx2N partition pattern
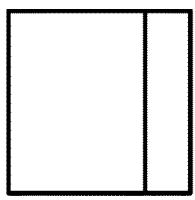
nRx2N partition pattern
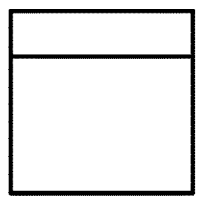
2NxnU partition pattern
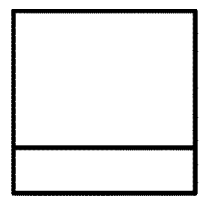
2NxnD partition pattern
FIG. 24      2400
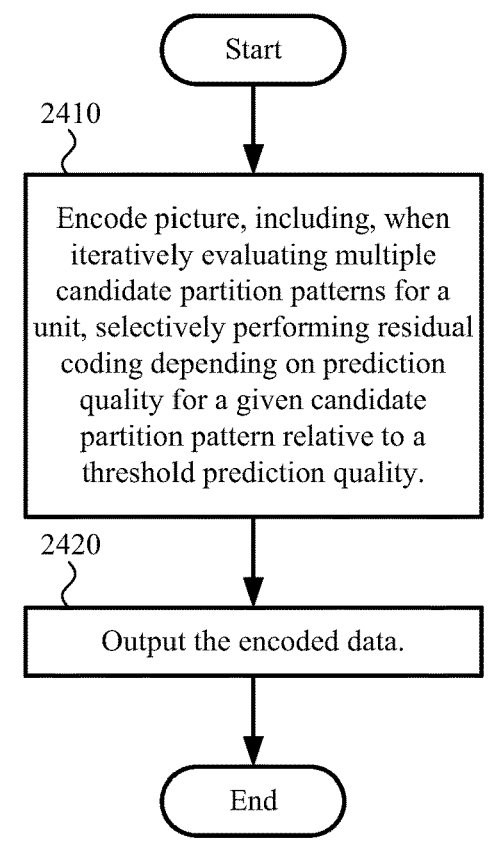

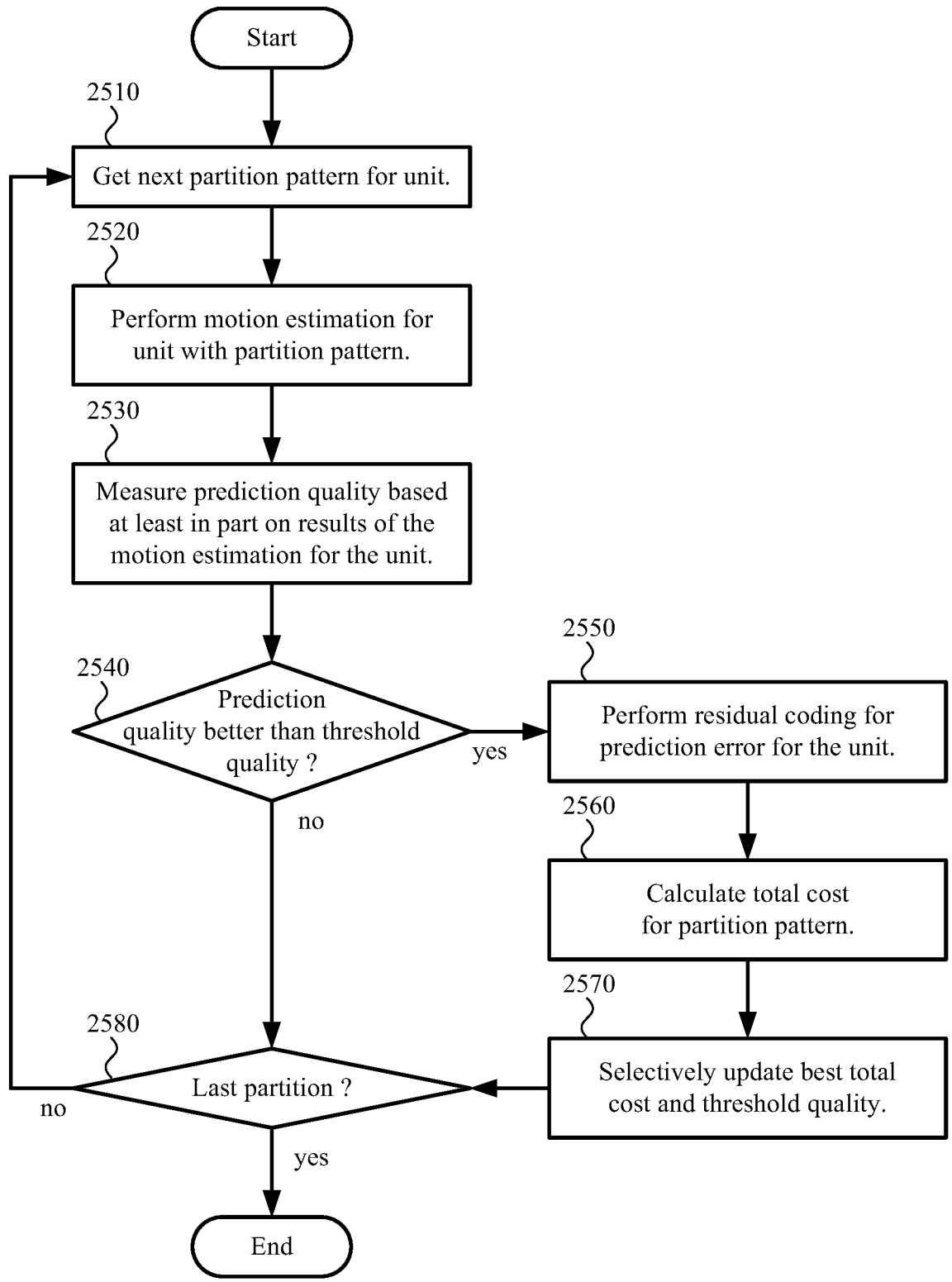

SKIPPING EVALUATION STAGES DURING MEDIA ENCODING

CROSS REFERENCE TO RELATED APPLICATIONS

This is the U.S. National Stage of International Application No. PCT/CN2015/072408, filed Feb. 6, 2015, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

As new video codec standards and formats have been developed, the number of coding tools available to an encoder has steadily grown, and the number of options to evaluate during encoding for values of parameters, modes, settings, etc. has also grown. At the same time, consumers have demanded improvements in temporal resolution (e.g., frame rate), spatial resolution (e.g., frame dimensions), and quality of video that is encoded. As a result of these factors, video encoding according to current video codec standards and formats is very computationally intensive. Despite improvements in computer hardware, video encoding remains time-consuming and resource-intensive in many encoding scenarios.

SUMMARY

In summary, the detailed description presents innovations in media encoding. In particular, the innovations can reduce the computational complexity of media encoding by selectively skipping certain evaluation stages during encoding. For example, based on analysis of decisions made earlier in encoding or based on analysis of media to be encoded, a media encoder can skip evaluation of certain coding tools, values for parameters or settings, or coding modes that are not expected to improve the rate-distortion performance of encoding (e.g., by lowering bit rate and/or improving quality).

According to one aspect of the innovations described herein, a media encoder encodes a first picture to produce encoded data, which the encoder outputs. For the first picture, the encoder determines a threshold unit size, which indicates a unit size at or below which a threshold proportion of content of the first picture is reached. The encoder also encodes a second picture, which follows the first picture in coding order, to produce encoded data, which the encoder outputs. When encoding the second picture, the encoder limits unit size for at least part of the second picture based at least in part on the threshold unit size for the first picture. In this way, based on the unit size(s) predominantly used in the first picture, the encoder can avoid evaluation of candidate unit sizes that are unlikely to improve rate-distortion performance during encoding for the second picture, which tends to speed up encoding.

According to another aspect of the innovations described herein, a media encoder encodes a picture to produce encoded data, then outputs the encoded data. As part of the encoding, when encoding a unit of the picture, the encoder evaluates each of multiple candidate motion vectors ("MVs") for contextual motion mode with residual coding skip mode on. Based on results of that evaluation, the encoder evaluates only a subset of the candidate MVs for contextual motion mode with residual coding skip mode off. In this way, the encoder can avoid evaluation of candidate MVs with residual coding skip mode off when those candidate MVs are unlikely to improve rate-distortion performance during encoding, which tends to speed up encoding.

According to another aspect of the innovations described herein, a media encoder encodes a picture to produce encoded data, then outputs the encoded data. As part of the encoding, the encoder evaluates one or more conditions. Depending on results of the evaluation, the encoder selectively applies either rate-distortion-optimized quantization ("RDOQ") or other quantization. In this way, the encoder can avoid use of RDOQ when it is unlikely to improve rate-distortion performance during encoding, which tends to speed up encoding.

According to another aspect of the innovations described herein, a media encoder encodes a picture to produce encoded data, then outputs the encoded data. As part of the encoding, the encoder sets a unit size for a current unit of the picture. In doing so, the encoder determines a unit size for at least one adjacent unit (e.g., a spatially adjacent unit in the same picture or a temporally adjacent unit in another picture) and, based at least in part on the unit size(s) for the adjacent unit(s), selectively skips evaluation of a candidate unit size for the current unit. In this way, based on unit sizes used in adjacent units, the encoder can avoid evaluation of candidate unit sizes that are unlikely to improve rate-distortion performance during encoding, which tends to speed up encoding.

According to another aspect of the innovations described herein, a media encoder encodes a first picture to produce encoded data, which the encoder outputs. For the first picture, the encoder measures usage of transform skip mode. The encoder also encodes a second picture, which follows the first picture in coding order, to produce encoded data, which the encoder outputs. When encoding the second picture, the encoder selectively disables transform skip mode for the second picture based at least in part on the usage of transform skip mode for the first picture. In this way, based on the measured usage of transform skip mode in the first picture, the encoder can avoid evaluation of transform skip mode when it is unlikely to improve rate-distortion performance during encoding for the second picture, which tends to speed up encoding.

According to another aspect of the innovations described herein, a media encoder encodes a picture to produce encoded data, then outputs the encoded data. As part of the encoding, the encoder sets a transform size or combination of transform sizes for a unit of the picture. In doing so, the encoder evaluates a condition at a current transform size. Depending on results of the evaluation of the condition, the encoder selectively skips evaluation of whether to split the unit from the current transform size into multiple units having a smaller transform size. In this way, the encoder can avoid evaluation of splitting for the unit when splitting is unlikely to improve rate-distortion performance during encoding, which tends to speed up encoding.

According to another aspect of the innovations described herein, a media encoder encodes a picture to produce encoded data, then outputs the encoded data. As part of the encoding, the encoder iteratively evaluates multiple candidate partition patterns for a unit of the picture. For a given candidate partition pattern, the encoder selectively performs residual coding depending on prediction quality relative to a threshold prediction quality, which is set based at least in part on prediction quality for a previously evaluated candidate partition pattern. In this way, the encoder can avoid residual coding for candidate partition patterns that are unlikely to improve rate-distortion performance during encoding, which tends to speed up encoding.

The innovations can be implemented as part of a method, as part of a computing system configured to perform the method or as part of a tangible computer-readable media storing computer-executable instructions for causing a computing system to perform the method. The various innovations can be used in combination or separately. For example, in some implementations, all of the innovations described herein are incorporated in media encoding decisions. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIGS. 4a and 4b are diagrams illustrating an example video encoder in conjunction with which some described embodiments can be implemented.

FIGS. 16a and 16b are flowcharts illustrating a generalized technique for using a measurement of transform skip mode usage for a first picture to limit use of transform skip mode in another picture.

FIGS. 20a and 20b are flowcharts illustrating techniques for selectively using rate-distortion-optimized quantization during encoding.

FIG. 21 is a diagram illustrating examples of residual quadtrees.

FIG. 22 is a flowchart illustrating a generalized technique for encoding a picture, including selectively skipping evaluation of whether to split a unit into multiple units having a smaller transform size.

FIG. 23 is a diagram illustrating examples of partition patterns for a unit encoded using motion compensation.

FIG. 24 is a flowchart illustrating a generalized technique for encoding a picture, including selectively skipping evaluation of residual coding for encoding with a given partition pattern.

FIG. 25 is a flowchart illustrating an example technique for selectively skipping evaluation of residual coding for encoding with a given partition pattern.

DETAILED DESCRIPTION

The detailed description presents innovations in media encoding. In particular, the innovations can reduce the computational complexity of media encoding by selectively skipping certain evaluation stages during encoding. For example, based on analysis of decisions made earlier in encoding or based on analysis of media to be encoded, a media encoder can skip evaluation of certain coding tools, values for parameters or settings, or coding modes that are not expected to improve rate-distortion performance during encoding (e.g., by lowering bit rate and/or improving quality). At the same time, skipping evaluation of the coding tools, values for parameters or settings, coding modes, etc. tends to speed up encoding.

Although operations described herein are in places described as being performed by a video encoder, in some cases the operations can be performed by another type of media processing tool (e.g., image encoder).

Some of the innovations described herein are illustrated with reference to terms specific to the H.265/HEVC standard. The innovations described herein can also be implemented for other standards or formats (e.g., the VP9 format, H.264/AVC standard).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
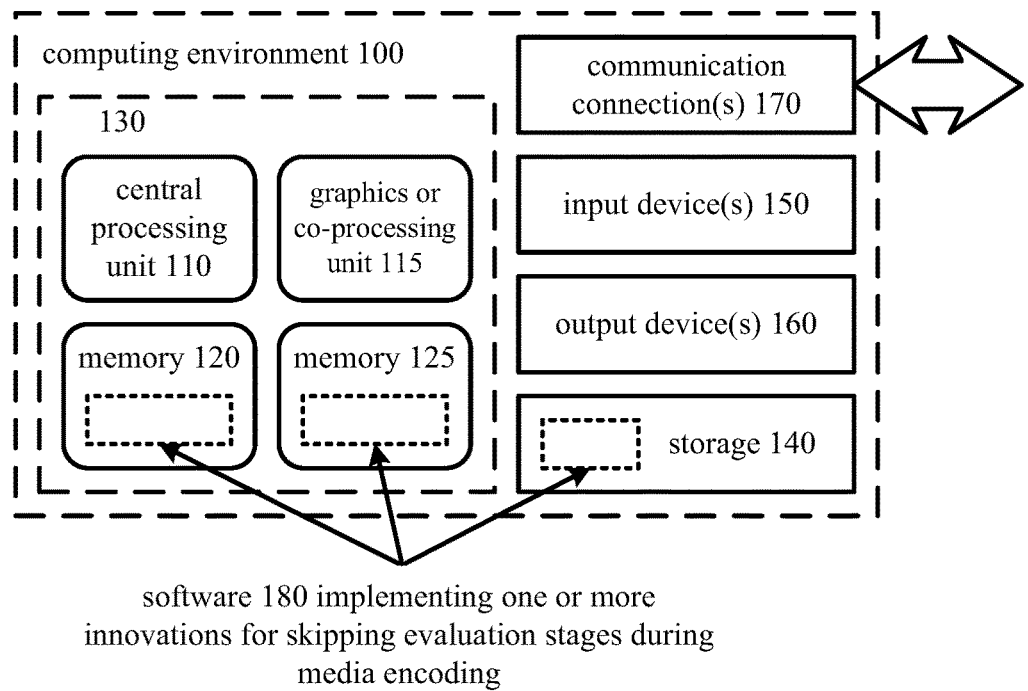
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for skipping evaluation stages during media encoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, optical media such as CD-ROMs or DVDs, or any other medium which can be used to store information and which can be accessed within the computing system (100). The storage (140) stores instructions for the software (180) implementing one or more innovations for skipping evaluation stages during media encoding.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
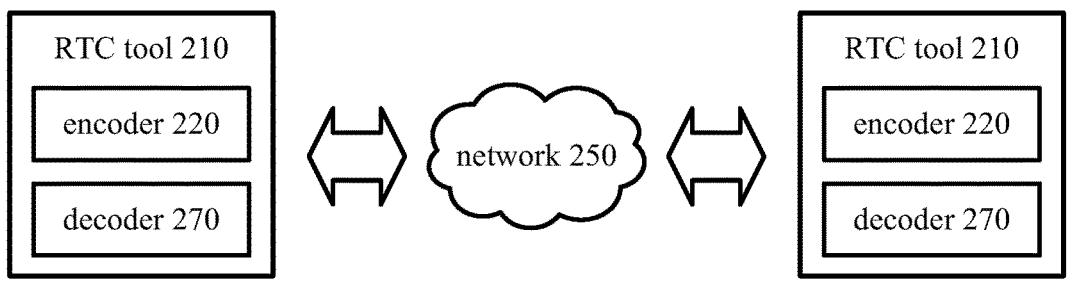
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, SMPTE 421M standard, ISO/IEC 14496-10 standard (also known as H.264 or AVC), another standard, or a proprietary format such as VP8 or VP9, or a variation or extension of one of those standards or formats, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
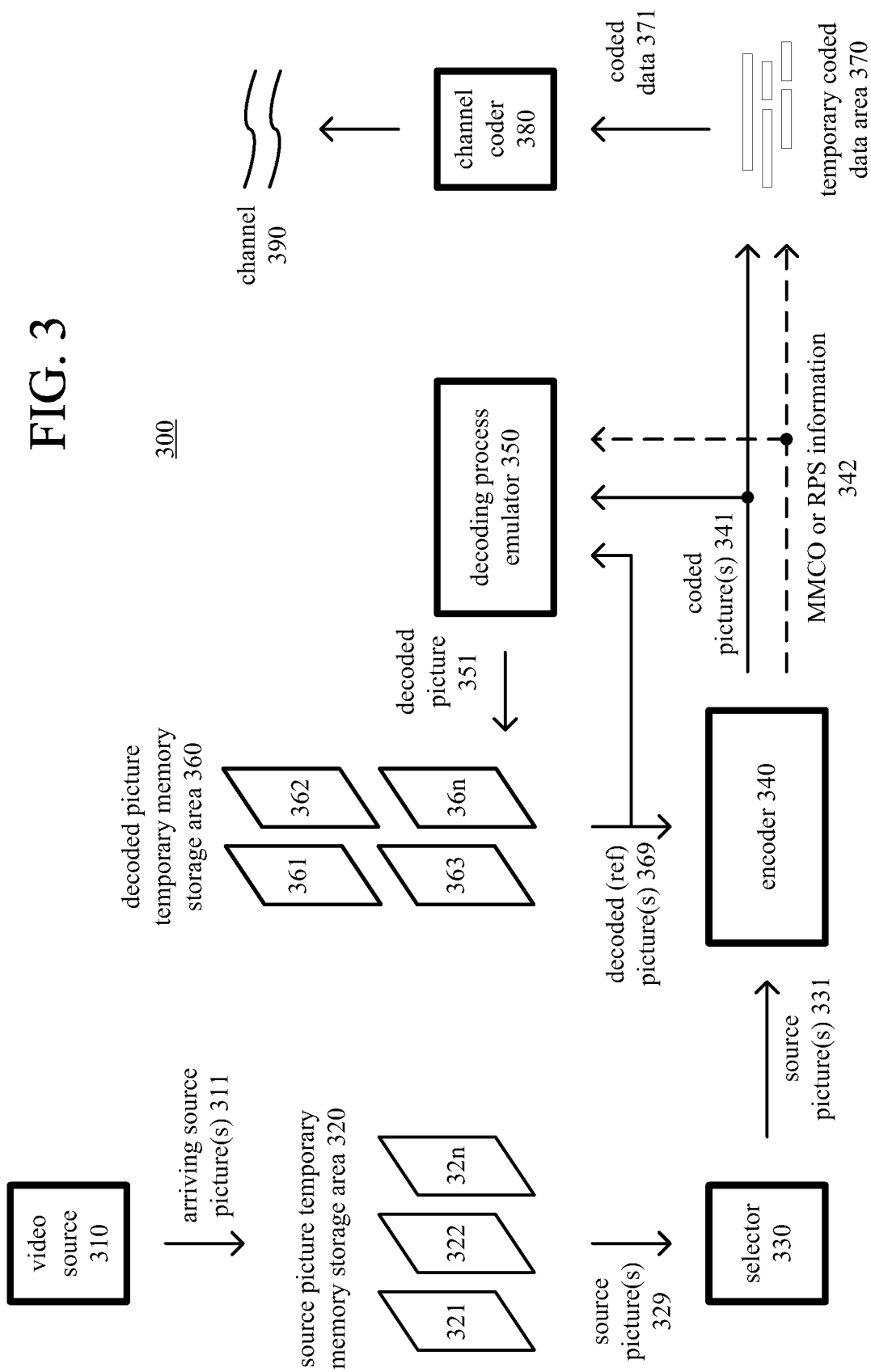
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content or be adapted for general video encoding. The encoder system (300) can be implemented as part of an operating system module, as part of an application library, as part of a standalone application or using special-purpose hardware. Overall, the encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) color components and resampling processing (e.g., to reduce the spatial resolution of chroma components) for encoding. Before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for a YUV 4:2:0 format or YUV 4:2:2 format), or the chroma sample values may have the same resolution as the luma sample values (e.g., for a YUV 4:4:4 format). Alternatively, video can be organized according to another format (e.g., RGB 4:4:4 format, GBR 4:4:4 format or BGR 4:4:4 format).

The encoder (340) encodes the selected picture (331) to produce a coded picture (341) and also produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be H.265/HEVC format, Windows Media Video format, VC-1 format, MPEG-x format (e.g., MPEG-1, MPEG-2, or MPEG-4), H.26x format (e.g., H.261, H.262, H.263, H.264), VPx format, a variation or extension of one of the preceding standards or formats, or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding.

For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax. The smallest allowable size of CU (e.g., 8×8, 16×16) can be signaled in the bitstream. Thus, in some example implementations, a CU can have a size of 64×64, 32×32, 16×16, or 8×8 (referring to the size of the luma CB in the CU).

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size. When a CU has one partition (so-called 2N×2N partition), the PU and CU are co-extensive. When a CU has four PUs (so-called N×N partition), each PU covers a quadrant of the CU. When a CU has two PUs, the two PUs can be configured in any of various partition patterns: top and bottom halves (so-called 2N×N partition), left and right halves (so-called N×2N partition), top quarter and remainder (so-called 2N×nU partition), bottom quarter and remainder (so-called 2N×nD partition), left quarter and remainder (so-called nL×2N partition), or right quarter and remainder (so-called nR×2N partition).

A CU also has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. In some example implementations, a TU can have a size of 32×32, 16×16, 8×8, or 4×4 (referring to the size of the luma TB in the TU). The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a residual data unit, CTB, CB, PB or TB, or some other set of sample values, depending on context. The term "unit" can indicate a macroblock, CTU, CU, PU, TU or some other set of blocks, or it can indicate a single block, depending on context.

Returning to FIG. 3, the encoder represents an intra-picture-coded block of a source picture (331) in terms of prediction from other, previously reconstructed sample values in the picture (331). For intra spatial prediction for a block, the intra-picture estimator estimates extrapolation of the neighboring reconstructed sample values into the block. The intra-picture estimator can output prediction information such as prediction mode (direction) for intra spatial prediction, which is entropy coded. An intra-picture prediction predictor applies the prediction information to determine intra prediction values.

The encoder (340) represents an inter-picture-coded, predicted block of a source picture (331) in terms of prediction from reference pictures. A motion estimator estimates the motion of the block with respect to one or more reference pictures (369). For a contextual motion mode, the motion estimator can evaluate motion vectors ("MVs") that were used in motion compensation for certain neighboring blocks or otherwise derived by rules (so-called merge mode MVs in the H.265/HEVC standard, or other MVs derived by a MV competition approach). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as MV information, which is entropy coded. In particular, information that indicates whether contextual motion mode (e.g., merge mode in the H.265/HEVC standard, or other MV competition approach) is used and, if so, the candidate MV for contextual motion mode, can be efficiently signaled. A motion compensator applies MVs to reference pictures (369) to determine motion-compensated prediction values for inter-picture prediction.

The encoder can determine the differences (if any) between a block's prediction values (intra or inter) and corresponding original values. These prediction residual values are further encoded using a frequency transform (if the frequency transform is not skipped), quantization and entropy encoding. In some implementations, the frequency transform can be skipped. In this case, prediction residual values can be quantized and entropy coded. In particular, transform skip mode may be useful when encoding screen content video.

For quantization, the encoder (340) sets values for quantization parameter ("QP") for a picture, tile, slice and/or other portion of video, and quantizes transform coefficients accordingly. The encoder (340) can use any of various approaches when quantizing transform coefficients, including rate-distortion-optimized quantization ("RDOQ") or other quantization.

The entropy coder of the encoder (340) compresses quantized transform coefficient values as well as certain side information (e.g., MV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some cases, coding of prediction residuals can be skipped for a unit. Examples of residual coding skip mode are further detailed below.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

The coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders.

Figure 4B:
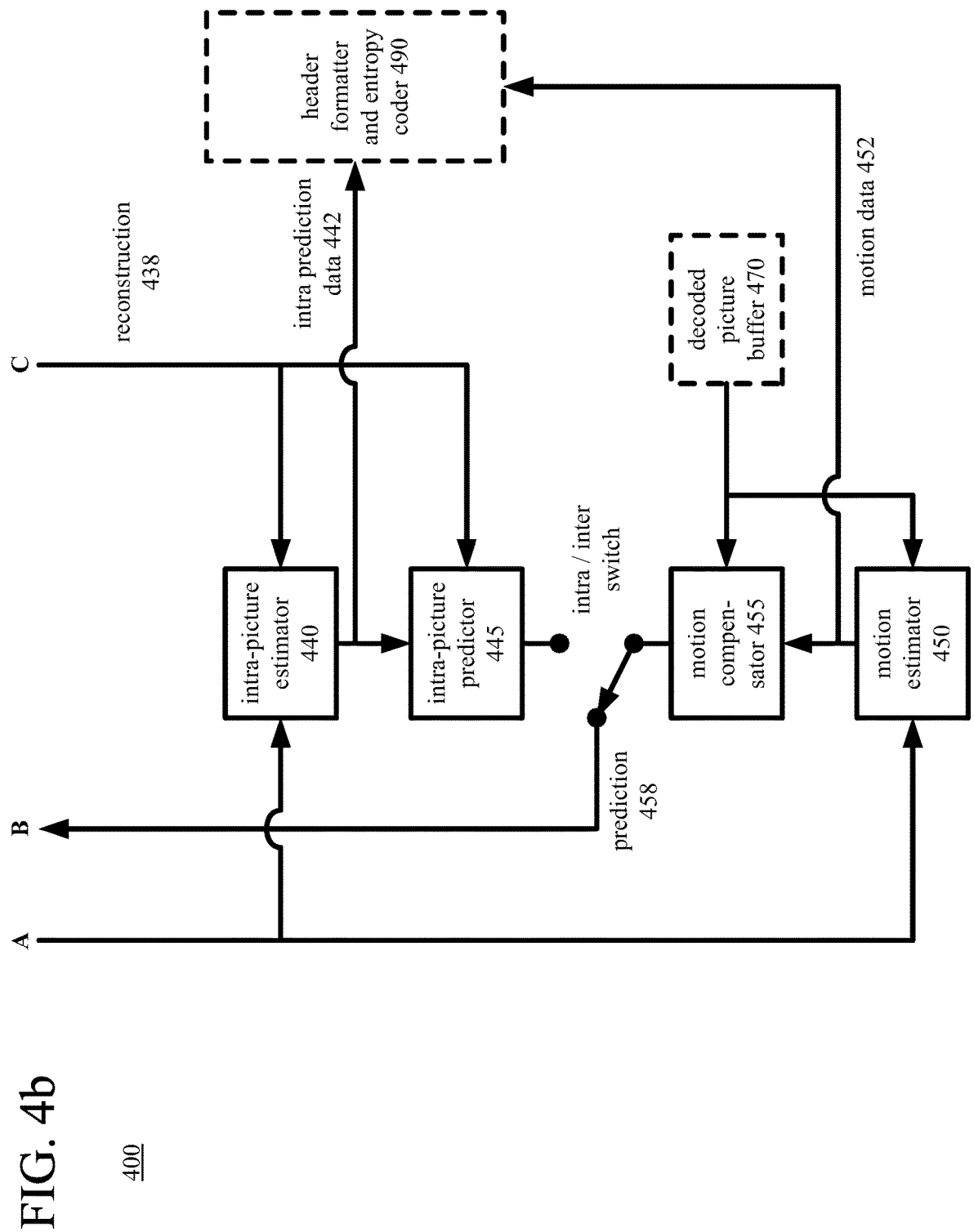

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TUs (TBs).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. In H.265/HEVC implementations, the encoder (400) partitions a picture into one or more slices, where each slice includes one or more slice segments.

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450) and intra/inter switch) to set and change coding parameters during encoding. The general encoding control (420) can also evaluate intermediate results during encoding, typically considering bit rate costs and/or distortion costs for different options. In particular, the general encoding control (420) can decide how to split a picture into CUs (CBs), PUs (PBs) and TUs (TBs) during encoding. In doing so, the general encoding control (420) can evaluate conditions as described in sections V and/or VI to decide when to skip evaluation of certain CU sizes. Or, the general encoding control (420) can evaluate conditions as described in section X to decide when to skip evaluation of certain TU sizes. Or, the general encoding control (420), working with the motion estimator (450), can decide which candidate MVs for contextual motion mode to evaluate fully (as described in section VIII) or decide which partition patterns merit in-depth evaluation (as described in section XI). Or, the general encoding control (420) can decide whether and how to use transform skip mode during encoding, as described in section VII. Or, the general encoding control (420) can decide when to use RDOQ or a simpler approach to quantizing coefficients, as described in section IX. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures, potentially evaluating candidate MVs in a contextual motion mode as well as other candidate MVs. For contextual motion mode, as candidate MVs for a current unit, the motion estimator (450) evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode in the H.265/HEVC standard is an example of contextual motion mode. More generally, a contextual motion mode involves a competition among multiple derived MVs and selection of one of the multiple derived MVs. When motion is consistent within a local region, there is a good chance that one of the candidate MVs for contextual motion mode will provide adequate motion-compensated prediction for a current block, such that the motion estimator (450) can terminate motion estimation early. The motion estimator (450) can evaluate different partition patterns for motion compensation for partitions of a given unit of the current picture (e.g., 2N×2N, 2N×N, N×2N, or N×N partitions for PUs of a CU in the H.265/HEVC standard).

The decoded picture buffer (470) buffers one or more reconstructed previously coded pictures for use as reference pictures. When multiple reference pictures are used, the multiple reference pictures can be from different temporal directions or the same temporal direction. The motion estimator (450) produces as side information motion data (452). In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MVs to the reconstructed reference picture(s) from the decoded picture buffer (470). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture. The intra-picture estimator (440) produces as side information intra prediction data (442), such as information indicating whether intra prediction uses spatial prediction, and prediction mode direction (for intra spatial prediction). The intra prediction data (442) is provided to the header formatter/entropy coder (490) as well as the intra-picture predictor (445). According to the intra prediction data (442), the intra-picture predictor (445) spatially predicts sample values of a current block of the current picture from neighboring, previously reconstructed sample values of the current picture.

The intra/inter switch selects whether the prediction (458) for a given block will be a motion-compensated prediction or intra-picture prediction. When residual coding is not skipped, the difference (if any) between a block of the prediction (458) and a corresponding part of the original current picture of the input video signal (405) provides values of the residual (418), which is further encoded. During reconstruction of the current picture, when residual values have been encoded/signaled, reconstructed residual values are combined with the prediction (458) to produce an approximate or exact reconstruction (438) of the original content from the video signal (405). (In lossy compression, some information is lost from the video signal (405).) In some cases, no residual is calculated for a unit. Instead, residual coding is skipped, and the predicted sample values are used as the reconstructed sample values. The decision about whether to skip residual coding can be made on a unit-by-unit basis (e.g., CU-by-CU basis in the H.265/HEVC standard) for some types of units (e.g., only inter-picture-coded units) or all types of units.

As part of residual coding, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the prediction residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU).

In H.265/HEVC implementations, the frequency transform can be skipped. In this case, values of the residual (418) can be quantized and entropy coded. In particular, transform skip mode may be useful when encoding screen content video, but not especially useful when encoding other types of video. The decision about whether to skip the frequency transform can be made on a unit-by-unit basis (e.g., TU-by-TU basis in the H.265/HEVC standard) for some units (e.g. TUs having a particular size such as 4×4) or all units. Transform skip mode can be enabled or disabled on a picture-by-picture basis (e.g., according to a syntax element in a PPS in the H.265/HEVC standard).

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490). When quantizing transform coefficients, the encoder (400) can use rate-distortion-optimized quantization ("RDOQ"), which is very time-consuming. With RDOQ, the encoder sets the optimal quantization level for each coefficient, adaptively tweaking coefficient values based on rate-distortion efficiency. Alternatively, the encoder (400) can apply simpler quantization rules, e.g., as described in section IX.

To reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (400) combines reconstructed residual values with values of the prediction (458) (e.g., motion-compensated prediction values, intra-picture prediction values) to form the reconstruction (438). When residual values have not been encoded/signaled, the encoder (400) uses the values of the prediction (458) as the reconstruction (438).

For intra-picture prediction, the values of the reconstruction (438) can be fed back to the intra-picture estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and SAO filtering on values of the reconstruction (438), for a given picture of the video signal (405). The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering and SAO filtering according to the filter control data (462) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (400), and the encoder (400) may provide syntax elements within the coded bitstream to indicate whether or not such filtering was applied. The decoded picture buffer (470) buffers the reconstructed current picture for use in subsequent motion-compensated prediction.

The header formatter/entropy coder (490) formats and/or entropy codes the general control data (422), quantized transform coefficient data (432), intra prediction data (442), motion data (452) and filter control data (462). For the motion data (452), the header formatter/entropy coder (490) can select and entropy code contextual motion mode index values, reference picture selection data, or other MV data. In some cases, the header formatter/entropy coder (490) also determines MV differentials for MV values (relative to MV predictors for the MV values), then entropy codes the MV differentials, e.g., using context-adaptive binary arithmetic coding. The header formatter/entropy coder (490) provides the encoded data in the coded video bitstream (495). The format of the coded video bitstream (495) can be H.265/HEVC format, Windows Media Video format, VC-1 format, MPEG-x format (e.g., MPEG-1, MPEG-2, or MPEG-4), H.26x format (e.g., H.261, H.262, H.263, H.264), VPx format, a variation or extension of one of the preceding standards or formats, or another format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Skipping Evaluation of Candidate Unit Sizes Depending on Unit Sizes of Adjacent Units.

This section presents examples of encoding that include selectively skipping evaluation of candidate unit sizes depending on the unit sizes of adjacent units (e.g., spatially adjacent units and/or temporally adjacent units). In many cases, during encoding of a current unit, based on the unit sizes used in adjacent units, an encoder can avoid evaluation of candidate unit sizes that are unlikely to improve rate-distortion performance, which tends to speed up encoding.

A. Selecting a Unit Size by Recursive, Full Evaluation.

Figure 5:
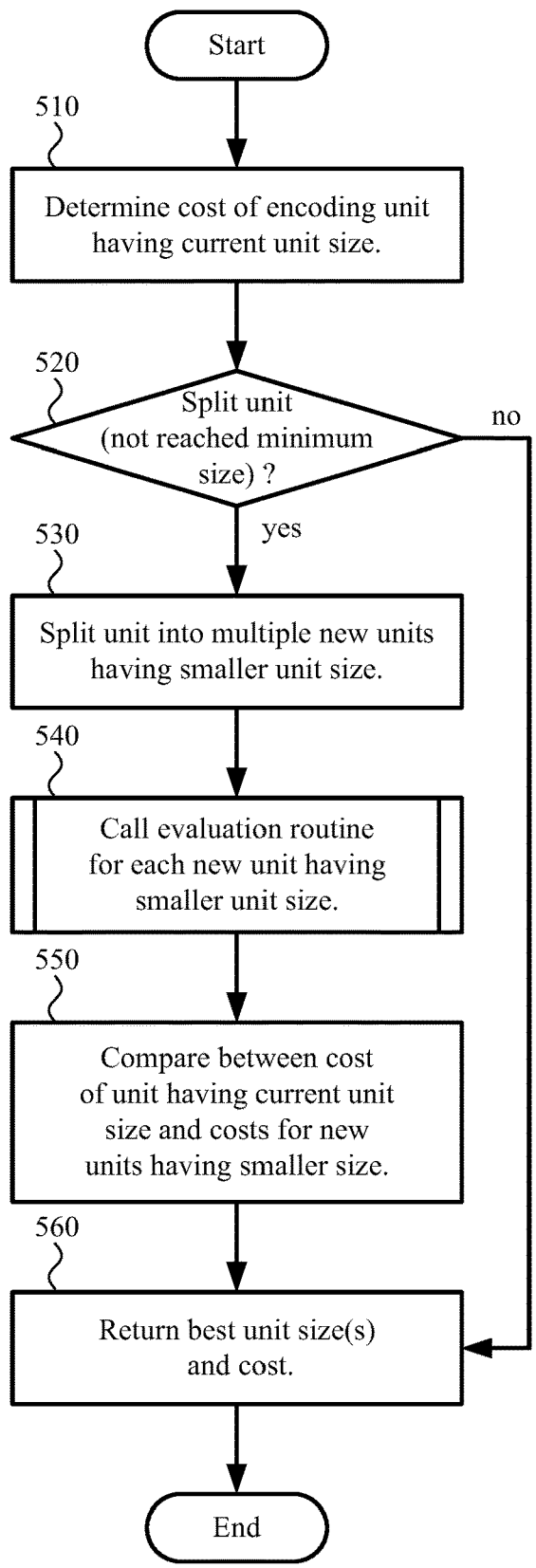
FIG. 5 is a flowchart illustrating an example technique for evaluation of candidate unit sizes for a unit of a picture.

In some approaches, to improve rate-distortion efficiency, an encoder checks every possible unit size for a unit. FIG. 5 shows an example technique (500) for evaluation of candidate unit sizes for a unit of a picture using full, recursive evaluation. An encoder such as the encoder (340) described with reference to FIG. 3, encoder (400) described with reference to FIGS. 4a and 4b, or other encoder can perform the technique (500).

To start, the encoder determines (510) the cost of encoding a current unit having a current unit size. For example, the current unit is a CU according to the H.265/HEVC standard. Alternatively, the unit is another type of unit. The current unit size is 64×64, 32×32, 16×16, 8×8, or some other unit size. The cost can be measured in terms of rate cost and/or distortion cost, using any available metric, and can be an estimate or depend on results of actual encoding.

The encoder checks (520) whether to split the current unit into multiple smaller units. For example, the multiple smaller units are quadrants of the current unit according to quadtree decomposition. The encoder can check whether the current unit has reached a minimum size for units and, if not, further split the current unit.

If the current unit is not split, the encoder returns (560) the combination of best unit sizes and corresponding best cost for encoding the current unit. In this case, the best unit size is the current unit size, and the best cost is the cost of encoding the current unit at the current unit size.

Otherwise, if the current unit is to be split, the encoder splits (530) the current unit into multiple new units having a smaller unit size and calls (540) an evaluation routine for each of the new units having the smaller unit size. In the evaluation routine, the new unit having the smaller unit size is evaluated as shown in FIG. 5, with the combination of best unit size(s) and corresponding best cost for encoding the new unit returned (560).

Then, the encoder compares (550) (a) the cost of encoding the current unit at the current unit size (from stage 510) with (b) the aggregate costs of encoding the (split) new units at the smaller unit size (returned from multiple calls in stage 540). From among these two options, the encoder returns (560) the combination of best unit size(s) and corresponding best cost for encoding the current unit—that is, the unit size or sizes having the smaller cost, and the value of the smaller cost.

In this way, the encoder can exhaustively evaluate different combinations of unit sizes for smaller units within the current unit. For example, the encoder can determine the cost of encoding a 64×64 CU, then split the 64×64 CU into four 32×32 CUs. For each of the four 32×32 CUs, the encoder can determine the cost of encoding the 32×32 CU, then split the 32×32 CU into four 16×16 CUs. This continues until the encoder reaches a CU having the minimum CU size (e.g., 16×16 or 8×8), which is not further split, and whose encoding cost is returned. At that point, with returned results from the four smaller CUs, the encoder compares the aggregate cost of encoding the four CUs at the minimum CU size (e.g., four 8×8 CUs) against the cost of encoding the CU that includes those four CUs (e.g., a 16×16 CU). The encoder returns the unit size(s) having the smaller cost. For a 16×16 CU, for example, the best combination of unit size(s) may be a 16×16 CU or four 8×8 CUs. Similarly, for a 32×32 CU, the best combination of unit size(s) may be a 32×32 CU, four 16×16 CUs, three 16×16 CUs and four 8×8 CUs in a 16×16 quadrant, two 16×16 CUs and eight 8×8 CUs in two 16×16 quadrants, one 16×16 CU and twelve 8×8 CUs in three 16×16 quadrants, or sixteen 8×8 CUs. For a 64×64 CU, the best combination of unit sizes may be a 64×64 CU, four 32×32 CUs, or any combination involving one or more of the 32×32 CUs having been split as described above.

B. Examples of Skipping Evaluation of Candidate Unit Sizes Depending on Unit Sizes of Spatially Adjacent Units.

To speed up the encoding process, an encoder can skip evaluation of some candidate unit sizes for a current unit depending on the unit sizes of spatially neighboring units. For example, the encoder considers unit sizes of a unit to the left of a current unit and a unit above the current unit. Alternatively, the encoder considers unit sizes of other and/or additional spatially adjacent units, relative to the current unit. If the unit sizes of spatially adjacent units are consistently small, a small unit size for the current unit is likely to be suitable, and the encoder can skip evaluation of large unit sizes for the current unit. Conversely, if the unit sizes of spatially adjacent units are consistently large, a large unit size for the current unit is likely to be suitable, and the encoder can skip evaluation of small unit sizes for the current unit.

Unit size can be tracked as depth relative to a starting depth for the maximum unit size. Suppose a current unit has the maximum unit size. In this case, the depth of the current unit is 0. If the size of the current unit is ¼ of the maximum unit size, the depth of the current unit is 1, and so on. Thus, if the maximum unit size is 64×64, the depth of a 64×64 unit is 0, the depth of a 32×32 unit is 1, the depth of a 16×16 unit is 2, and the depth of an 8×8 unit is 3.

The encoder can use the unit sizes of spatially adjacent units in various ways when deciding which candidate unit sizes to skip. For example, according to one rule, the encoder determines the minimum unit size among the unit sizes of spatially adjacent units, and uses the minimum unit size to limit which candidate unit sizes are evaluated for a current unit. The encoder can skip evaluation of any candidate unit size that is smaller than the minimum unit size (among the spatially adjacent units). Or, the encoder can skip evaluation of any candidate unit size that is less than one unit size smaller than the minimum unit size (among the spatially adjacent units). When unit size is tracked as depth, the encoder can determine the maximum depth among the depths of the spatially adjacent units, and skip evaluation of any candidate unit size having a depth larger than the maximum depth (or, alternatively, the maximum depth+1).

Or, as another example rule, the encoder determines the maximum unit size among the unit sizes of spatially adjacent units, and uses the maximum unit size to limit which candidate unit sizes are evaluated for a current unit. The encoder can skip evaluation of any candidate unit size that is larger than the maximum unit size (among the spatially adjacent units). Or, the encoder can skip evaluation of any candidate unit size that is more than one unit size larger than the maximum unit size (among the spatially adjacent units). When unit size is tracked as depth, the encoder can determine the minimum depth among the depths of the spatially adjacent units, and skip evaluation of any candidate unit size having a depth smaller than the minimum depth (or, alternatively, the minimum depth−1).

FIGS. 6a-6d show examples of spatially adjacent units having unit sizes considered when determining whether to skip evaluation of a candidate unit size for a current unit. In FIGS. 6a-6d, a current area (610) is evaluated for splitting into one or more units. For example, in H.265/HEVC implementations, the current area (610) is a current CTU, and the units are CUs. Alternatively, the area is another type of area, and the units are another type of units. An adjacent area (650) above the current area (e.g., an above CTU) and adjacent area (630) left of the current area (e.g., a left CTU) may include units (e.g., CUs) that are spatially adjacent a current unit of the current area (610). In the examples of FIGS. 6a-6d, the above area (650) and left area (630) were each split into multiple units (e.g., CUs) during previous encoding.

In the examples of FIGS. 6a-6d, an encoder considers unit sizes of a unit above the current unit and a unit left of the current unit. To determine which unit is left of the current unit or above the current unit, the encoder considers the top-left position of the current unit. The above unit is the unit that includes the position immediately above the top-left position of the current unit. The left unit is the unit that includes the position immediately left of the top-left position of the current unit. The adjacent (left or above) unit can have the same size as the current unit, or it can have a different size. The adjacent (left or above) unit can be in the current area (610) or an adjacent area, depending on position of the current unit within the current area (610). Alternatively, the encoder applies other rules to determine left unit and above unit for a current unit.

Figure 6A:
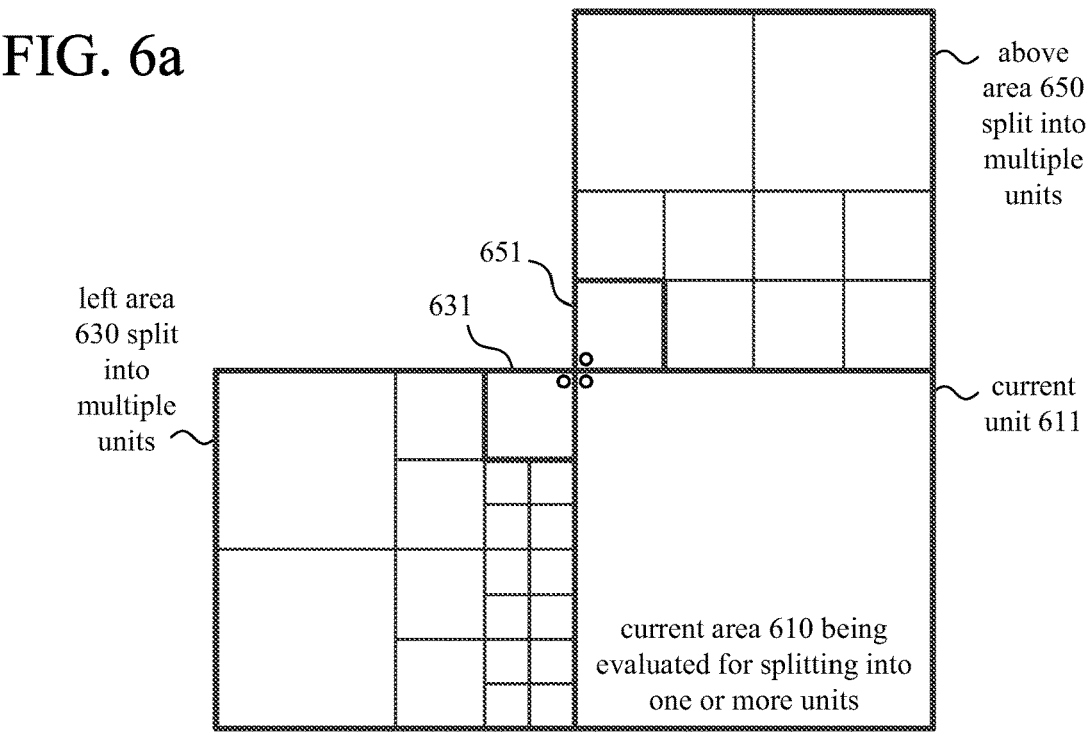
FIGS. 6a-6d are diagrams illustrating examples of spatially adjacent units having unit sizes considered when determining whether to skip evaluation of a candidate unit size for a current unit.

In FIG. 6a, the current area (610) includes a single current unit (611) having a size of 64×64. The encoder considers unit sizes of the 16×16 unit (631) in the left area (630) and 16×16 unit (651) in the above area (650) when evaluating candidate unit sizes for the current unit (611). Suppose the encoder skips evaluation of any candidate unit size more than one size larger than the maximum unit size (16×16) among the left unit (631) and above unit (651). In this case, the encoder skips evaluation of the 64×64 current unit (611).

Figure 6B:
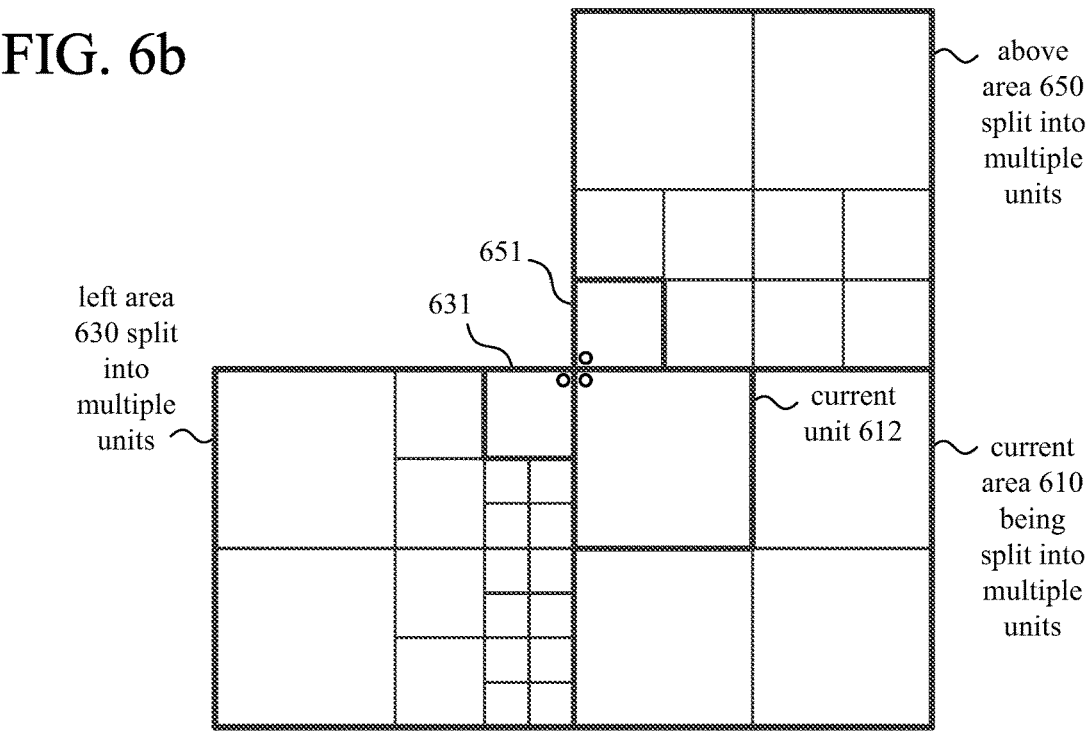

FIG. 6b shows evaluation at a later stage. In FIG. 6b, the current area (610) has been split into four 32×32 units by quadtree decomposition. The current unit (612) has a size of 32×32. The encoder considers unit sizes of the 16×16 unit (631) in the left area (630) and 16×16 unit (651) in the above area (650) when evaluating candidate unit sizes for the current unit (612). Suppose the encoder skips evaluation of any candidate unit size more than one size larger than the maximum unit size (16×16) among the left unit (631) and above unit (651). In this case, the encoder performs evaluation of the 32×32 current unit (612).

Figure 6C:
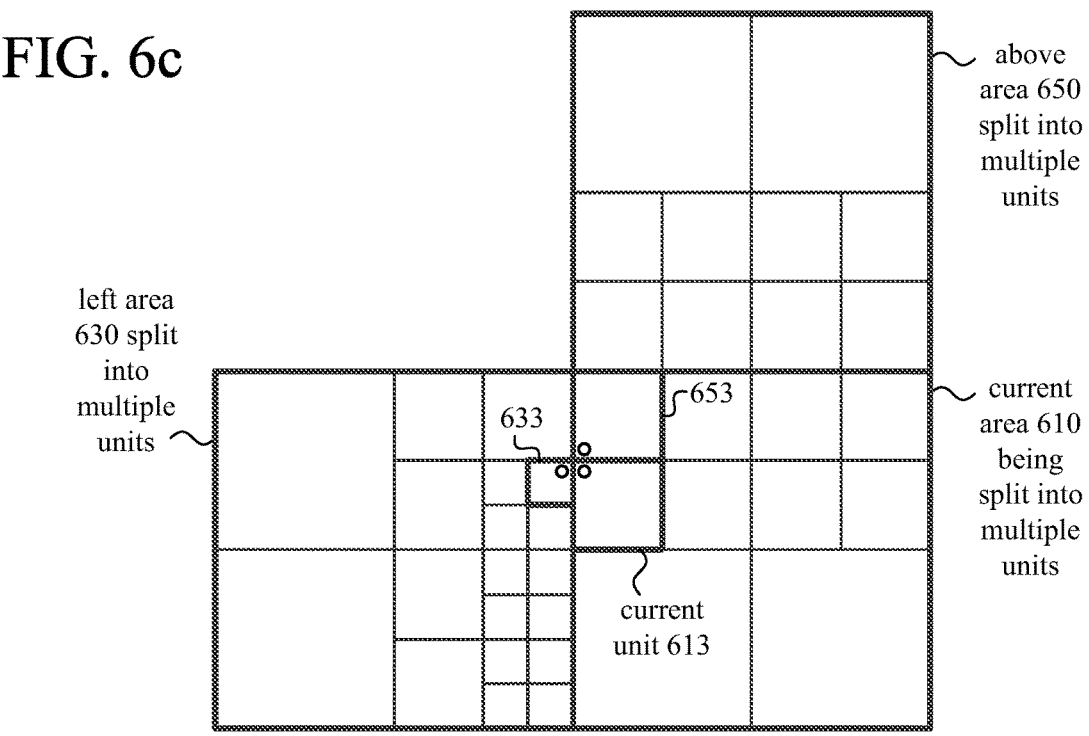

FIG. 6c shows evaluation at a later stage than FIG. 6b. In FIG. 6c, the current area (610) has been split into four 32×32 units by quadtree decomposition, and the first 32×32 unit has been further split into four 16×16 units by quadtree decomposition. The current unit (613) has a size of 16×16. The encoder considers unit sizes of an 8×8 unit (633) in the left area (630) and 16×16 unit (653) in the current area (610) when evaluating candidate unit sizes for the current unit (613). Suppose the encoder skips evaluation of any candidate unit size more than one size larger than the maximum unit size (16×16) among the left unit (633) and above unit (653). In this case, the encoder performs evaluation of the 16×16 current unit (613).

Figure 6D:
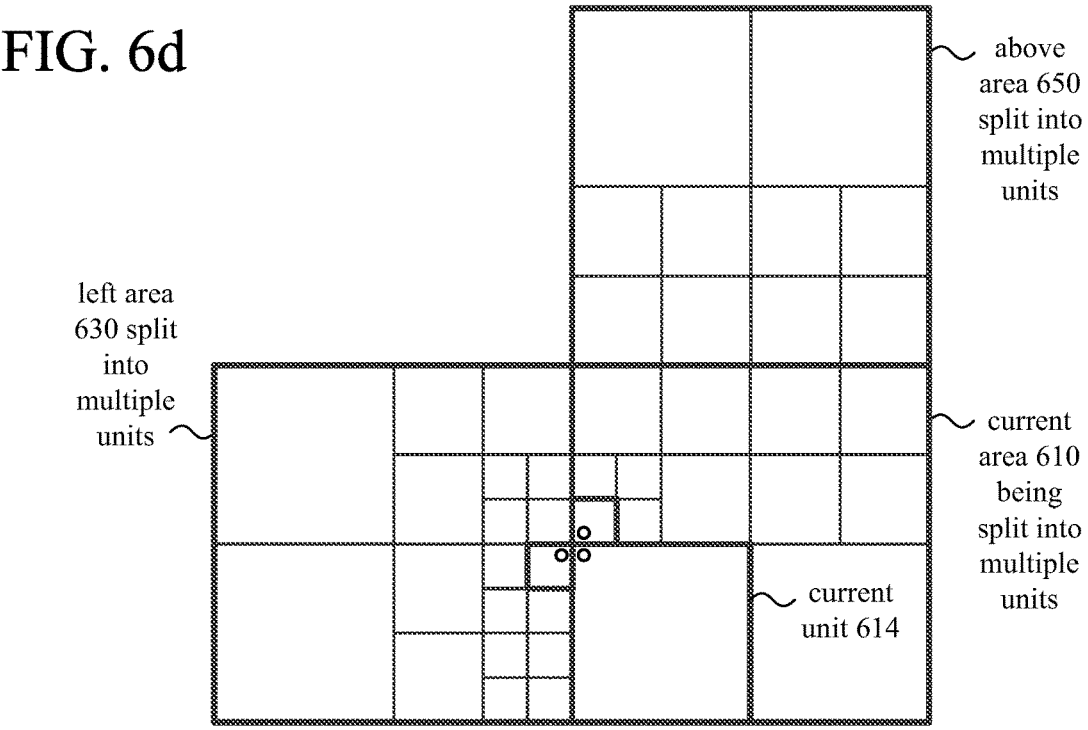

Finally, FIG. 6d shows evaluation at a later stage than FIG. 6c. In FIG. 6d, the current area (610) has been split into four 32×32 units by quadtree decomposition, and the top two 32×32 units have been further split into smaller units by quadtree decomposition. The current unit (614) has a size of 32×32. The encoder considers unit sizes of a left 8×8 unit in the left area (630) and above 8×8 unit in the current area (610) when evaluating candidate unit sizes for the current unit (614). Suppose the encoder skips evaluation of any candidate unit size more than one size larger than the maximum unit size (8×8) among the left unit and above unit. In this case, the encoder skips evaluation of the 32×32 current unit (614).

C. Examples of Skipping Evaluation of Candidate Unit Sizes Depending on Unit Sizes of Temporally Adjacent Units.

To speed up the encoding process, an encoder can also skip evaluation of some candidate unit sizes for a current unit depending on the unit sizes of temporally neighboring units. For example, the encoder considers the unit size of a collocated unit (same location as the current unit) in the next picture in display order and/or the unit size of a collocated unit in the previous picture in display order. Alternatively, the encoder considers unit sizes of other and/or additional temporally adjacent units. If the unit sizes of temporally adjacent units are consistently small, a small unit size for the current unit is likely to be suitable, and the encoder can skip evaluation of large unit sizes for the current unit. Conversely, if the unit sizes of temporally adjacent units are consistently large, a large unit size for the current unit is likely to be suitable, and the encoder can skip evaluation of small unit sizes for the current unit. As explained in the previous section, unit size can be tracked as depth relative to a starting depth for the maximum unit size.

The encoder can use the unit sizes of temporally adjacent units in various ways when deciding which candidate unit sizes to skip. For example, according to one rule, the encoder determines the minimum unit size among the unit sizes of temporally adjacent units, and uses the minimum unit size to limit which candidate unit sizes are evaluated for a current unit. The encoder can skip evaluation of any candidate unit size that is smaller than the minimum unit size (among the temporally adjacent units). Or, the encoder can skip evaluation of any candidate unit size that is less than one unit size smaller than the minimum unit size (among the temporally adjacent units). When unit size is tracked as depth, the encoder can determine the maximum depth among the depths of the temporally adjacent units, and skip evaluation of any candidate unit size having a depth larger than the maximum depth (or, alternatively, the maximum depth+1).

Or, as another example rule, the encoder determines the maximum unit size among the unit sizes of temporally adjacent units, and uses the maximum unit size to limit which candidate unit sizes are evaluated for a current unit. The encoder can skip evaluation of any candidate unit size that is larger than the maximum unit size (among the temporally adjacent units). Or, the encoder can skip evaluation of any candidate unit size that is more than one unit size larger than the maximum unit size (among the temporally adjacent units). When unit size is tracked as depth, the encoder can determine the minimum depth among the depths of the temporally adjacent units, and skip evaluation of any candidate unit size having a depth smaller than the minimum depth (or, alternatively, the minimum depth−1).

Figure 7:
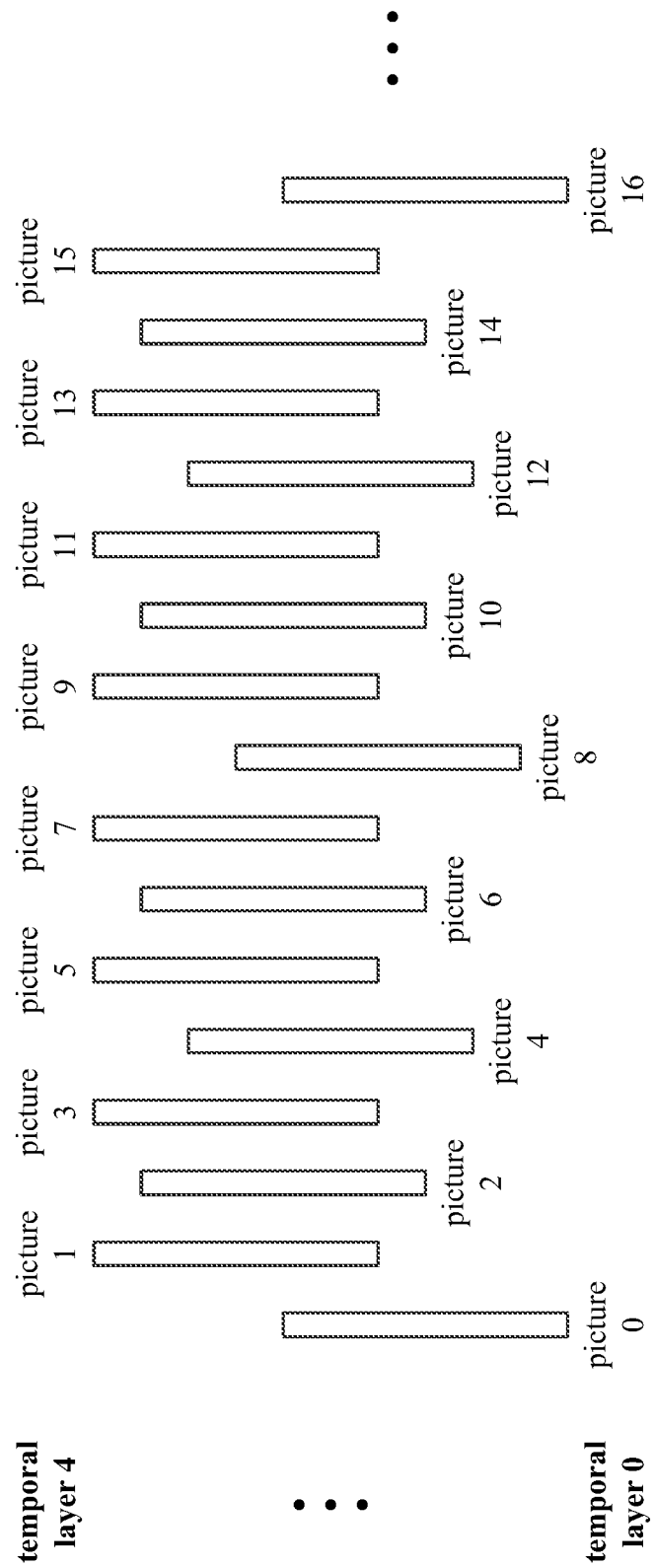
FIG. 7 is a diagram illustrating pictures of a video sequence organized in temporal layers.

FIG. 7 shows an example (700) of pictures of a video sequence organized in temporal layers. Temporal layer 0 includes pictures 0 and 16 in display order, and temporal layer 1 includes picture 8 in display order. Temporal layer 2 includes pictures 4 and 12 in display order. Temporal layer 3 includes pictures 2, 6, 10, and 14 in display order. Finally, temporal layer 4 includes pictures 1, 3, 5, 7, 9, 11, 13, and 15 in display order. The coding structure shown in FIG. 7 might be used, for example, in coding of B pictures for temporal scalability, with I-pictures in temporal layer 0, P-pictures in temporal layer 1, and B-pictures in temporal layers 2-4. In this case, if reference picture relationships are appropriately set, the pictures in temporal layer 4 can be dropped without interfering with playback of the pictures in temporal layers 0-3. Or, the pictures in temporal layers 3 and 4 can be dropped without interfering with playback of the pictures in temporal layers 0-2.

Typically, pictures in lower temporal layers are encoded with smaller quantization step sizes (higher quality), and pictures in higher temporal layers are encoded with larger quantization step sizes (lower quality). Similarly, with respect to unit sizes, pictures in lower temporal layers are usually encoded with smaller units, and pictures in higher temporal layers are usually encoded with larger units.

When encoding a current unit of a picture in a given temporal layer, the encoder finds collocated units in temporally adjacent pictures in a lower temporal layer. The lower temporal layer may be the next lower temporal layer, or it may be several temporal layers lower. The encoder evaluates the unit sizes for the temporally adjacent units when deciding whether to evaluate candidate unit sizes for the current unit.

Figure 8A:
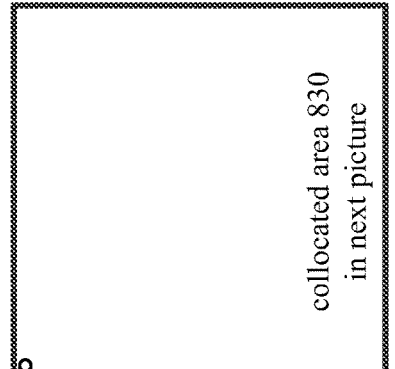
FIGS. 8a and 8b are diagrams illustrating examples of temporally adjacent units having unit sizes considered when determining whether to skip evaluation of a candidate unit size for a current unit.
Figure 8A:
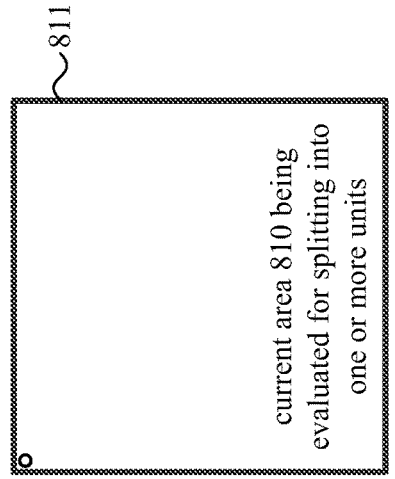
Figure 8A:
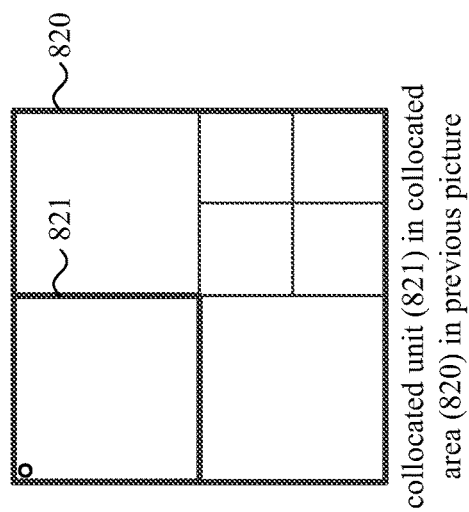
Figure 8B:
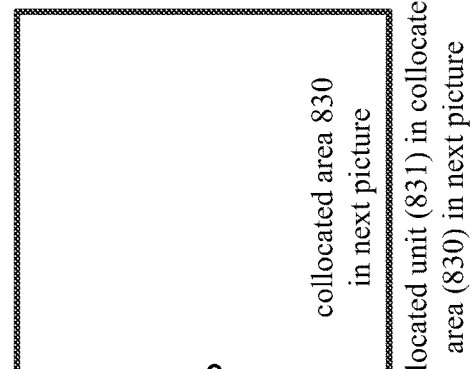
Figure 8B:
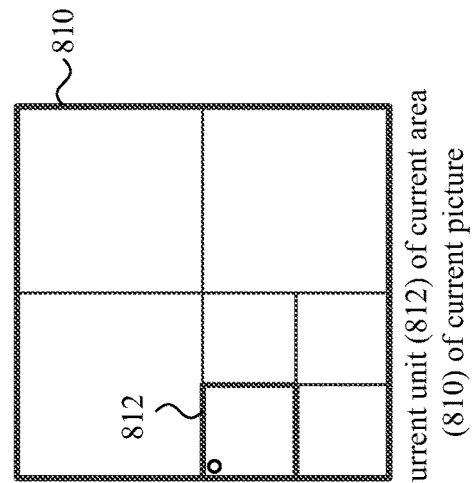
Figure 8B:
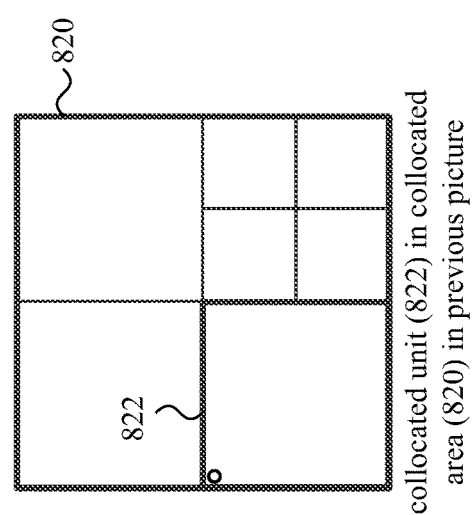

FIGS. 8*a* and 8*b* show examples of temporally adjacent units having unit sizes considered when determining whether to skip evaluation of a candidate unit size for a current unit of a current picture. In FIGS. 8*a* and 8*b*, a current area (810) is evaluated for splitting into one or more units. For example, in H.265/HEVC implementations, the current area (810) is a current CTU, and the units are CUs. Alternatively, the area is another type of area, and the units are another type of units. A collocated area (830) (e.g., CTU) in the next picture in display order and collocated area (820) (e.g., CTU) in the previous picture in display order include units (e.g., CUs) that are temporally adjacent a current unit of the current area (810). In the example of FIG. 8*a*, the collocated area (820) was split into multiple units (e.g., CUs) during previous encoding.

In the examples of FIGS. 8*a* and 8*b*, an encoder considers unit sizes of collocated units that are temporally adjacent to a current unit. To determine which units are collocated, the encoder considers the top-left position of the current unit. A collocated unit is a unit in another picture that includes the top-left position. The collocated unit can have the same size as the current unit, or it can have a different size. Alternatively, the encoder applies another rule to determine a collocated unit for a current unit.

In FIG. 8*a*, the current area (810) includes a single current unit (811) having a size of 64×64. When evaluating candidate unit sizes for the current unit (811), the encoder considers unit sizes of the 32×32 collocated unit (821) in the collocated area (820) in the previous picture and 64×64 collocated unit (831) in the collocated area (830) in the next picture. Suppose the encoder skips evaluation of any candidate unit size smaller than the minimum unit size (32×32) among the collocated units (821, 831). In this case, the encoder performs evaluation of the 64×64 current unit (811).

FIG. 8*b* shows evaluation at a later stage. In FIG. 8*b*, the current area (810) has been split into four 32×32 units by quadtree decomposition, and the 32×32 unit in the third quadrant has been further split into four 16×16 units. The current unit (812) has a size of 16×16. When evaluating candidate unit sizes for the current unit (812), the encoder considers unit sizes of the 32×32 collocated unit (822) in the collocated area (820) in the previous picture and 64×64 collocated unit (831) in the collocated area (830) in the next picture. Suppose the encoder skips evaluation of any candidate unit size smaller than the minimum unit size (32×32) among the collocated units (822, 831). In this case, the encoder skips evaluation of the 16×16 current unit (812). Effectively, the encoder can stop evaluating further splitting options as soon as the current unit size is equal to the minimum unit size among the temporally adjacent units.

D. Skipping Evaluation of Candidate Unit Sizes Depending on Unit Sizes of Adjacent Units, Generally.

Figure 9:
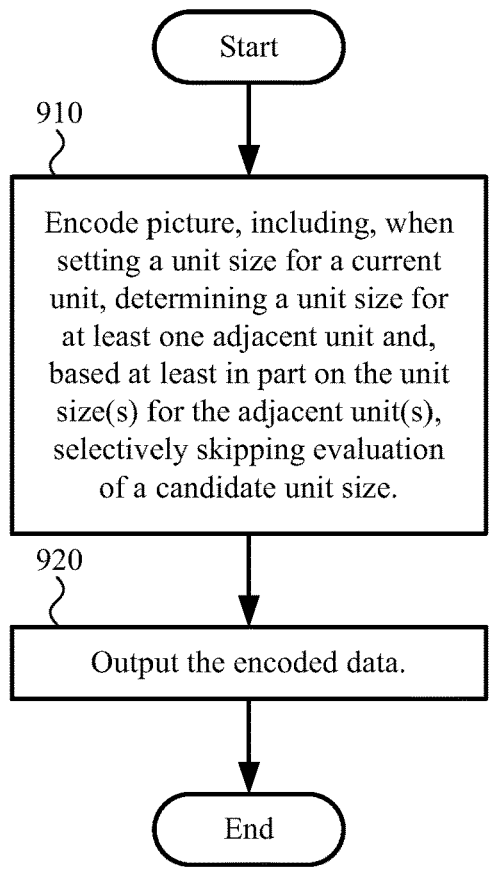
FIG. 9 is a flowchart illustrating a generalized technique for encoding a picture, where evaluation of a candidate unit size for a unit of the picture is selectively skipped depending on unit size of at least one adjacent unit.

FIG. 9 illustrates a generalized technique (900) for encoding a picture, where evaluation of a candidate unit size for a unit of the picture is selectively skipped depending on unit size of at least one adjacent unit. An encoder such as the encoder (340) described with reference to FIG. 3, encoder (400) described with reference to FIGS. 4a and 4b, or other encoder can perform the technique (900).

The encoder encodes (910) a picture to produce encoded data, which the encoder outputs (920). As part of the encoding (910), the encoder sets a unit size for a current unit of the picture. In doing so, the encoder determines a unit size for at least one adjacent unit and, based at least in part on the unit size(s) for the adjacent unit(s), selectively skips evaluation of a candidate unit size for the current unit. For example, the current unit and adjacent unit(s) are CUs (in H.265/HEVC implementations) having CU sizes. Alternatively, the current unit and adjacent unit(s) are other type of units having other unit sizes. The encoder can also determine a current unit size for the current unit, where the skipping of evaluation of a candidate unit size also depends on the current unit size. For example, the encoder skips the evaluation of the candidate unit size for the current unit depending on results of comparing the current unit size for the current unit to the unit size for at least one adjacent unit.

Figure 10:
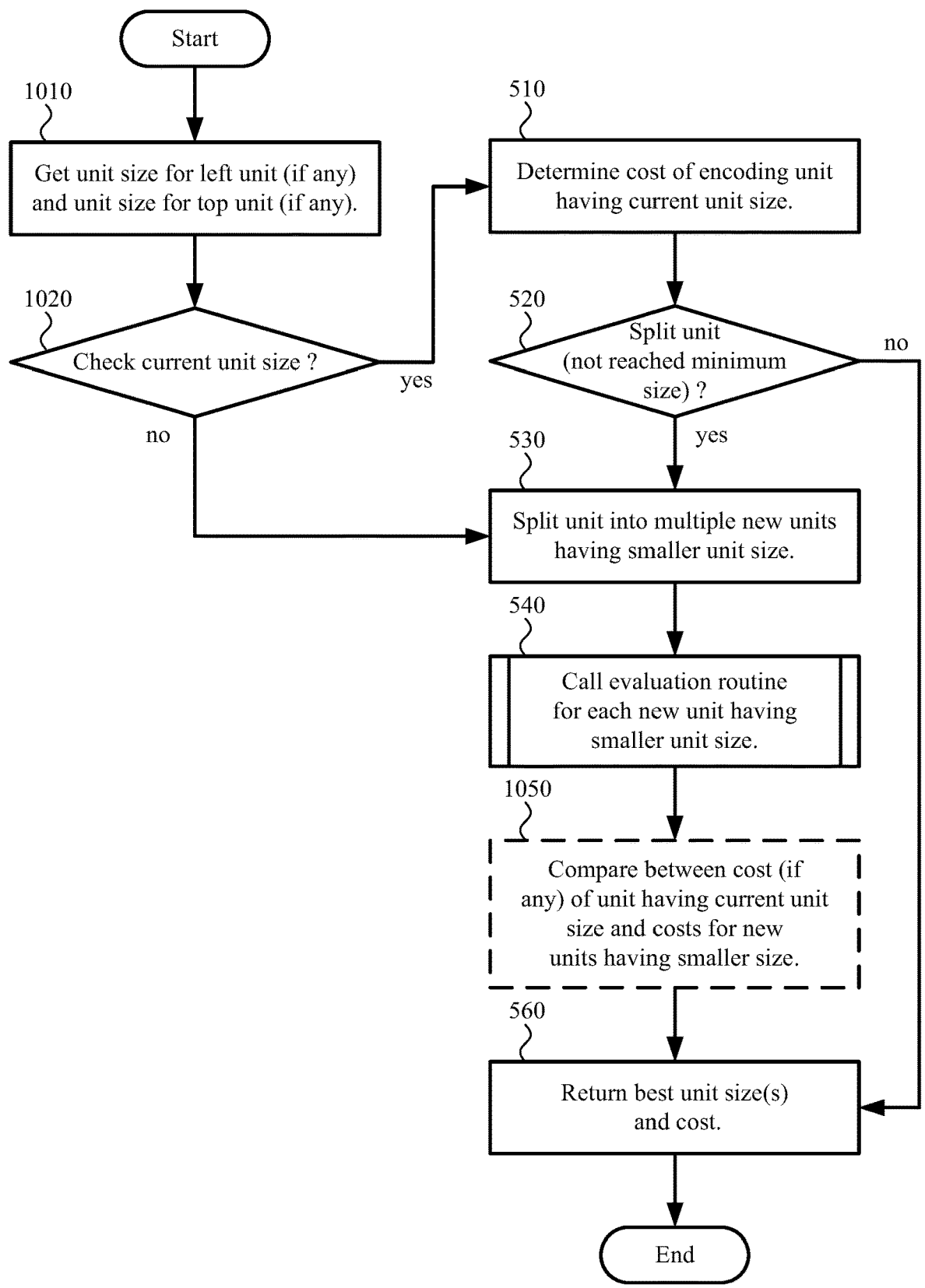
FIGS. 10 and 11 are flowcharts illustrating example techniques for setting the unit size for a unit of a picture, where evaluation of a candidate unit size is selectively skipped depending on unit sizes of adjacent units.

The adjacent unit(s) can be spatially adjacent units, relative to the current unit of the picture. FIG. 10 shows an example technique (1000) for setting the unit size for a unit of a picture, where evaluation of a candidate unit size is selectively skipped depending on unit sizes of spatially adjacent units. An encoder such as the encoder (340) described with reference to FIG. 3, encoder (400) described with reference to FIGS. 4a and 4b, or other encoder can perform the technique (1000). Many of the stages of the technique (1000) shown in FIG. 10 are the same as stages of the technique (500) shown in FIG. 5, and description of such stages will not be repeated here.

To determine the unit size for at least one spatially adjacent unit, the encoder gets (1010) the unit size for a first adjacent unit left of the current unit (if the left adjacent unit is available) and the unit size for a second adjacent unit above the current unit (if the above unit is available). The encoder then determines the maximum unit size among the unit size for the first adjacent unit and the unit size for the second adjacent unit.

The encoder determines (1020) whether to check the current unit size and, if so, checks (510) the cost of encoding the current unit at the current unit size. Otherwise, the encoder directly splits (530) the current unit into multiple new units having a smaller unit size. For example, the encoder skips evaluation of any candidate unit size (current unit size) that is more than a threshold difference from the unit size for the at least one adjacent unit (here, the maximum unit size among the first and second adjacent units). When comparing (1050) (a) the cost of encoding the current unit at the current unit size (from stage 510) with (b) the aggregate costs of encoding the (split) new units at the smaller unit size (from stage 540), the cost of encoding the current unit at the current unit size might not be available. Otherwise, the comparing stage (1050) is the same as in the corresponding stage (550) described with reference to FIG. 5.

Alternatively, instead of or in addition to determining the maximum unit size among the first and second adjacent units, the encoder determines the minimum unit size among the unit size for the first adjacent unit and the unit size for the second adjacent unit. The encoder can then use the minimum unit size to limit which candidate unit sizes are evaluated for the current unit, as explained in section V.B.

Figure 11:
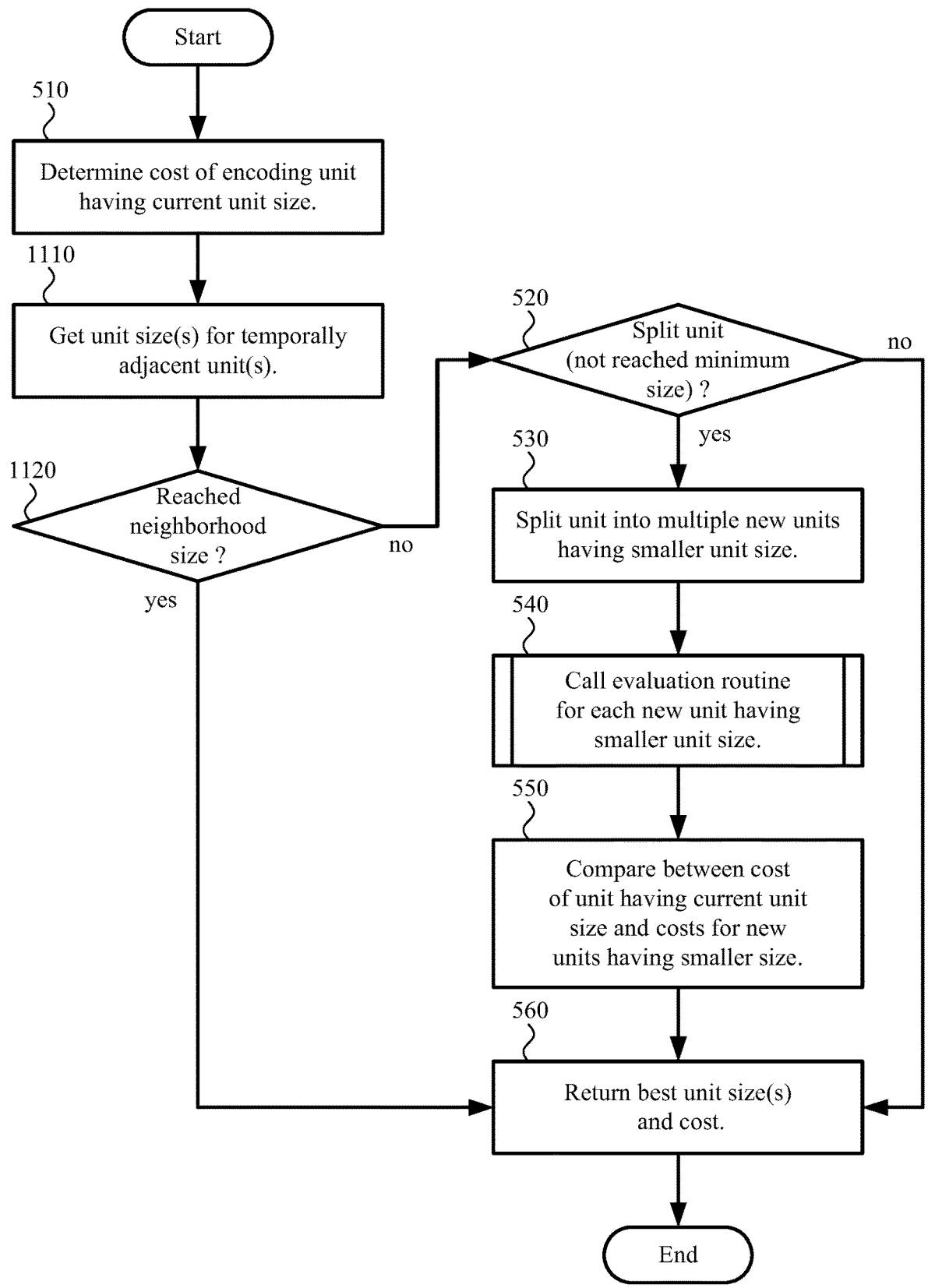

The adjacent unit(s) can also be temporally adjacent units, relative to the current unit of the picture (e.g., collocated units of temporally adjacent pictures among pictures that are lower in a temporal hierarchy). FIG. 11 is a flowchart illustrating an example technique for setting the unit size for a unit of a picture, where evaluation of a candidate unit size is selectively skipped depending on unit sizes of temporally adjacent units. An encoder such as the encoder (340) described with reference to FIG. 3, encoder (400) described with reference to FIGS. 4a and 4b, or other encoder can perform the technique (1100). Many of the stages of the technique (1100) shown in FIG. 11 are the same as stages of the technique (500) shown in FIG. 5, and description of such stages will not be repeated here.

After determining (510) the cost of encoding the current unit at the current unit size, to determine the unit size for at least one temporally adjacent unit, the encoder gets (1110) the unit size for each of one or more temporally adjacent units. The temporally adjacent unit(s) can include first and second collocated units in first and second temporally adjacent pictures, respectively, among pictures that are lower in a temporal hierarchy. The encoder then determines the minimum unit size among the unit size for the first collocated unit and the unit size for the second collocated unit.

The encoder determines (1120) whether it has reached the unit size in the temporal neighborhood of the current unit. If so, the encoder terminates splitting and returns (560) the combination of best unit sizes and corresponding best encoding cost for the current unit. Otherwise, the encoder checks (530) whether to further split the current unit. For example, the encoder skips evaluation of any candidate unit size that is less than the unit size for the at least one adjacent unit (here, the minimum unit size among the first and second collocated units).

Alternatively, instead of or in addition to determining the minimum unit size among the first and second collocated units, the encoder determines the maximum unit size among the unit size for the first collocated unit and the unit size for the second collocated unit. The encoder can then use the maximum unit size to limit which candidate unit sizes are evaluated for the current unit, as explained in section V.C.

An encoder can consider unit sizes of spatially adjacent units and consider unit sizes of temporally adjacent units when determining whether to skip evaluation of candidate unit sizes for a current unit. For example, an encoder can skip evaluation of any candidate unit size larger than a maximum unit size of spatially adjacent units (see FIG. 10) and skip evaluation of any candidate unit size smaller than a minimum unit size of spatially adjacent units (see FIG. 11).

VI. Skipping Evaluation of Candidate Unit Sizes Depending on Tracked Usage of Unit Sizes.

This section presents examples of encoding that include selectively skipping evaluation of candidate unit sizes for a current unit of a current picture depending on prior usage of unit sizes in a previous picture. In many cases, based on the unit size(s) predominantly used in a first picture, during encoding of another picture, the encoder can avoid evaluation of candidate unit sizes that are unlikely to improve rate-distortion performance, which tends to speed up encoding.

A. Examples of Using Tracked Usage of Unit Sizes to Selectively Skip Evaluation of Candidate Unit Sizes.

Usually, an encoder uses intra-picture-coded units to encode new content in video. For new content in a picture, the encoder often cannot find a good match in a reference picture. Also, to achieve better intra-picture prediction, an intra-picture-coded unit typically has a small unit size. Using a small unit size for intra-picture prediction shortens the distance between known sample values (at the edge of a unit) and unknown sample values (further away from the edge of the unit), which tends to improve prediction results for natural video content or other content having complicated variations in sample values. On the other hand, for some smooth content (e.g., computer-generated content), using a large unit size for intra-picture-coded units may improve overall coding efficiency.

In many cases, a video sequence periodically includes an intra-picture-coded picture, and different intra-picture-coded pictures are separated by other pictures having a mix of inter-picture-coded content and intra-picture-coded content. Often, the one or more unit sizes that are used most frequently for units in an intra-picture-coded picture are also used most frequently in intra-picture-coded content of subsequent pictures. For example, if most units of an intra-picture-coded picture have a unit size of 16×16 or smaller, intra-picture-coded units in subsequent pictures tend to have a unit size of 16×16 or smaller. On the other hand, if many units of an intra-picture-coded picture have a large unit size, intra-picture-coded units in subsequent pictures are more likely to have a large unit size. Based on the unit size(s) predominantly used in an intra-picture-coded picture, during encoding of intra-picture-coded units for a subsequent picture, an encoder can avoid evaluation of candidate unit sizes that are unlikely to improve rate-distortion performance.

More generally, in many cases, the one or more unit sizes that are used most frequently for units in a first picture are also the unit size(s) used most frequently in subsequent pictures. Based on the unit size(s) predominantly used in the first picture, during encoding for the subsequent pictures, the encoder can avoid evaluation of candidate unit sizes that are unlikely to improve rate-distortion performance.

Figure 12:
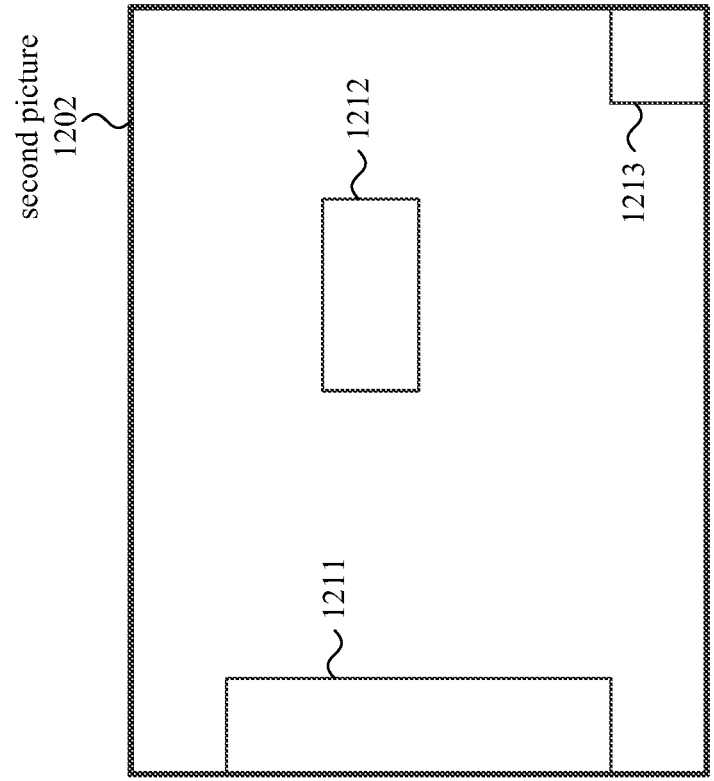
FIG. 12 is a diagram illustrating an example of determination and use of a threshold unit size for a first picture to limit unit size of units in another picture.
Figure 12:
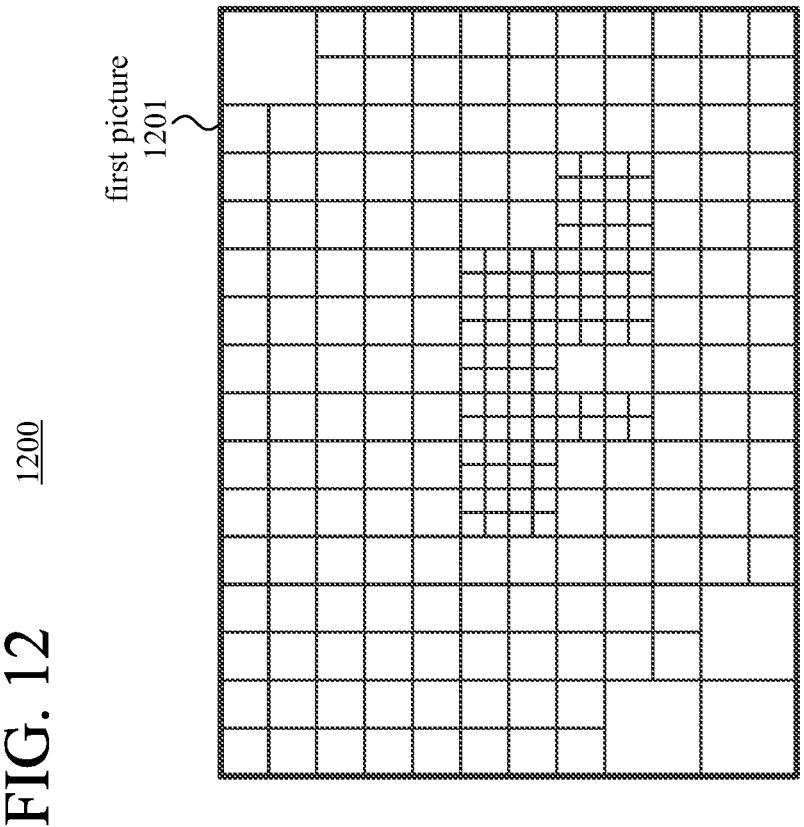

FIG. 12 shows an example (1200) of determination and use of a threshold unit size for a first picture (1201) to limit unit size of units in another picture. In FIG. 12, the first picture (1201) includes a mix of 64×64 units, 32×32 units, and 16×16 units. The encoder determines the unit size at which a threshold proportion of the first picture (1201) is reached. The threshold proportion depends on implementation (e.g., 85%, 90%, 95%). The threshold proportion can be evaluated in terms of sample values of the first picture (1201) or some other measure of area of the first picture (1201). In the example of FIG. 12, the threshold proportion is 90%, and more than the threshold proportion of the first picture (1201) is reached by 32×32 units or 16×16 units, collectively, covering the first picture (1201). Thus, the threshold unit size is 32×32.

The second picture (1202) includes regions (1211, 1212, 1213) within which the threshold unit size (32×32) from the first picture (1201) limits unit size. Within the regions (1211, 1212, 1213), the encoder evaluates candidate unit sizes at or below the threshold unit size, but does not evaluate larger unit sizes. In other regions of the second picture (1202), the threshold unit size does not constrain unit sizes of units. Alternatively, the threshold unit size can constrain unit sizes of all units in the second picture (1202).

As another example, suppose an intra-picture-coded picture (first picture) is encoded using a mix of 64×64 units, 32×32 units, 16×16 units, and 8×8 units. After the intra-picture-coded picture is encoded, the encoder determines the threshold unit size for the picture. The encoder calculates the number of each of the unit sizes used when encoding the intra-picture-coded picture (first picture): $n_{64 \times 64}$ 64×64 units, $n_{32 \times 32}$ 32×32 units, $n_{16 \times 16}$ 16×16 units, and $n_{8 \times 8}$ 8×8 units. The encoder then calculates the number of sample values in the units of the respective unit sizes for the picture. (In practice, the encoder can consider one component plane of the picture, e.g., the luma plane, or multiple component planes of the picture.) The 64×64 units cover $n_{64 \times 64}$*64*64 sample values, the 32×32 units cover $n_{32 \times 32}$*32*32 sample values, the 16×16 units cover $n_{16 \times 16}$*16*16 sample values, and the 8×8 units cover $n_{8 \times 8}$*8*8 sample values. The total number of sample values for the picture is width*height sample values. Starting from the smallest unit size, the encoder determines the unit size at or below which a threshold proportion $t_1$ of the picture is reached (i.e., covered by sample values of units). The threshold proportion $t_1$ depends on implementation (e.g., 90%) For example, the encoder checks whether $n_{8 \times 8}$*8*8>=$t_1$*width*height. If so, the threshold unit size is 8×8. Otherwise, the encoder checks whether $n_{16 \times 16}$*16*16+$n_{8 \times 8}$*8*8>=$t_1$*width*height. If so, the threshold unit size is 16×16. Otherwise, the encoder checks whether $n_{32 \times 32}$*32*32+$n_{16 \times 16}$*16*16+$n_{8 \times 8}$*8*8>= $t_1$*width*height. If so, the threshold unit size is 32×32. Otherwise, the threshold unit size is 64×64. When encoding intra-picture-coded units in following pictures, the encoder can use the threshold unit size to skip evaluation of unit sizes larger than the threshold unit size.

Or, as another example, suppose a first picture includes a mix of intra-picture-coded units and inter-picture-coded units. The encoder can determine the threshold unit size for the intra-picture-coded units in the first picture using the approach described in the previous paragraph (but using a threshold proportion $t_1$ of the total samples in the intra-picture-coded units instead of $t_1$*width*height). Then, when encoding intra-picture-coded units in following pictures, the encoder can use the threshold unit size to skip evaluation of unit sizes larger than the threshold unit size.

B. Skipping Evaluation of Candidate Unit Sizes Depending on Tracked Usage of Unit Sizes, Generally.

Figure 13:
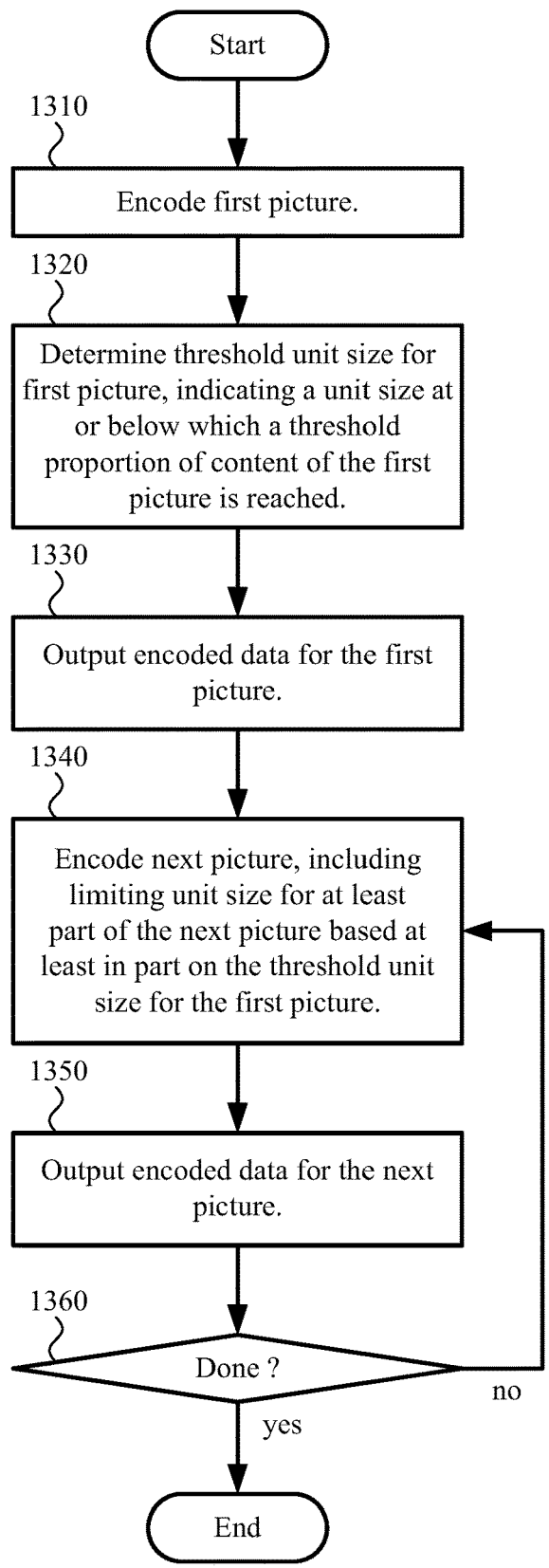
FIG. 13 is a flowchart illustrating a generalized technique for using a threshold unit size for a first picture to limit unit size of units in another picture.

FIG. 13 illustrates a generalized technique (1300) for using a threshold unit size for a first picture to limit unit size of units in another picture. An encoder such as the encoder (340) described with reference to FIG. 3, encoder (400) described with reference to FIGS. 4a and 4b, or other encoder can perform the technique (1300).

The encoder encodes (1310) a first picture among multiple pictures to produce encoded data for the first picture, which the encoder later outputs (1330). Also, the encoder determines (1320) a threshold unit size for the first picture. The threshold unit size indicates a unit size at or below which a threshold proportion of content of the first picture is reached. The threshold proportion depends on implementation. For example, the threshold proportion is between 80% and 95%. When the units are CUs, the threshold unit size is a threshold CU size.

The encoder encodes (1340) the next picture among the multiple pictures to produce encoded data for the next picture, and which the encoder outputs (1350). The next picture follows the previous picture in coding order (e.g., the second picture follows the first picture in coding order). When encoding (1340) the next picture, the encoder limits unit size for at least part of the next picture based at least in part on the threshold unit size for the first picture. When the units of the next picture are CUs, the unit size that is limited is CU size.

For purposes of determining (1320) the threshold unit size, the content of the first picture can be the intra-picture-coded units of the first picture. For example, the first picture is entirely encoded using intra-picture-coded units, the next picture is at least partially encoded using inter-picture-coded units, and unit size is limited for any intra-picture-coded units in the next picture. Or, as another example, the first picture is partially encoded using intra-picture-coded units, the next picture is at least partially encoded using inter-picture-coded units, and unit size is limited for any intra-picture-coded units in the next picture. Alternatively, for purposes of determining (1320) the threshold unit size, the content of the first picture is all units of the first picture.

After outputting (1350) the encoded data for the next picture, the encoder checks (1360) whether to continue encoding with the next picture. If so, the encoder encodes (1340) another picture (e.g., third picture, fourth picture, and so on), limiting unit size for at least part of the other picture based at least in part on the threshold unit size for the first picture.

Figure 14:
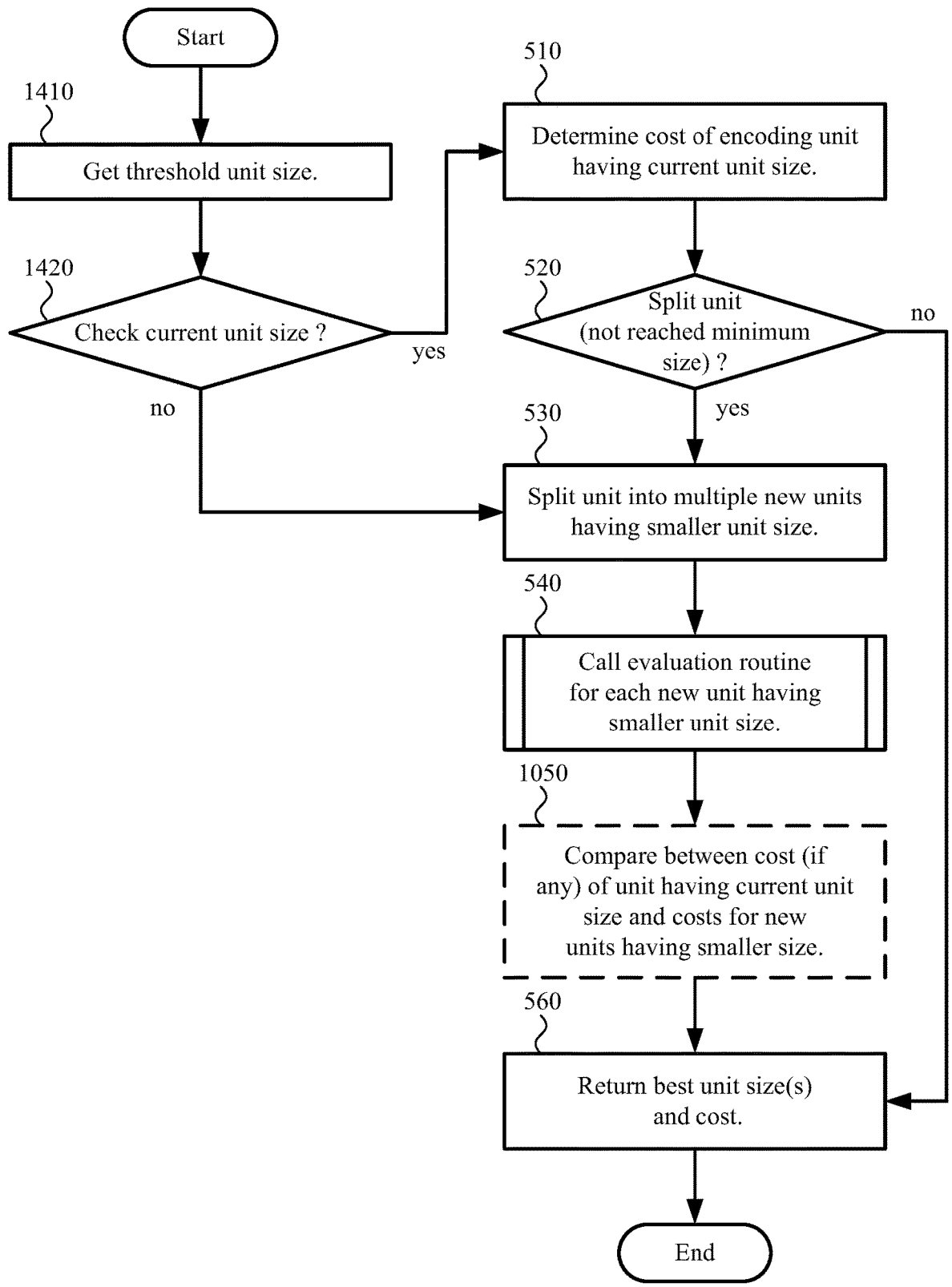
FIG. 14 is a flowchart illustrating an example technique for setting the unit size for a unit of a picture, where a threshold unit size from another picture limits the unit size.

FIG. 14 illustrates an example technique (1400) for setting the unit size for a unit of a picture, where a threshold unit size from another picture limits the unit size. An encoder such as the encoder (340) described with reference to FIG. 3, encoder (400) described with reference to FIGS. 4a and 4b, or other encoder can perform the technique (1400). Many of the stages of the technique (1400) shown in FIG. 14 are the same as stages of the technique (500) shown in FIG. 5 and/or technique (1000) shown in FIG. 10, and description of such stages will not be repeated here.

The encoder gets (1410) a threshold unit size for a first picture. For example, the threshold unit size is a threshold unit size as described earlier in this section. The encoder determines (1420) whether to check the current unit size and, if so, checks (510) the cost of encoding the current unit at the current unit size. Otherwise, the encoder directly splits (530) the current unit into multiple new units having a smaller unit size. For example, the encoder skips evaluation of any candidate unit size that is larger than the threshold unit size.

VII. Skipping Evaluation of Transform Skip Mode.

This section presents examples of encoding that include selectively skipping evaluation of transform skip mode. In many cases, based on the measured usage of transform skip mode in a first picture, an encoder can avoid evaluation of transform skip mode during encoding of another picture when transform skip mode is unlikely to improve rate-distortion performance, which tends to speed up encoding.

A. Examples of Using Tracked Usage of Transform Skip Mode to Selectively Skip Evaluation of Transform Skip Mode.

Transform skip mode, in which the encoder skips a frequency transform for a unit, and instead quantizes and entropy codes sample values, is very useful when encoding screen content video or other artificially created content. On the other hand, when encoding video captured by a video camera, transform skip mode is less likely to improve coding efficiency.

In many cases, a video sequence periodically includes an intra-picture-coded picture, and different intra-picture-coded pictures are separated by other pictures having a mix of inter-picture-coded content and intra-picture-coded content. Based on the usage of transform skip mode in an intra-picture-coded picture, during encoding for a subsequent picture, an encoder can avoid evaluation of transform skip mode when it is unlikely to improve rate-distortion performance. More generally, in many cases, the usage of transform skip mode in a first picture also applies to subsequent pictures. Based on the tracked usage of transform skip mode in the first picture, during encoding for subsequent pictures, the encoder can avoid evaluation of transform skip mode when it is unlikely to improve rate-distortion performance.

Figure 15:
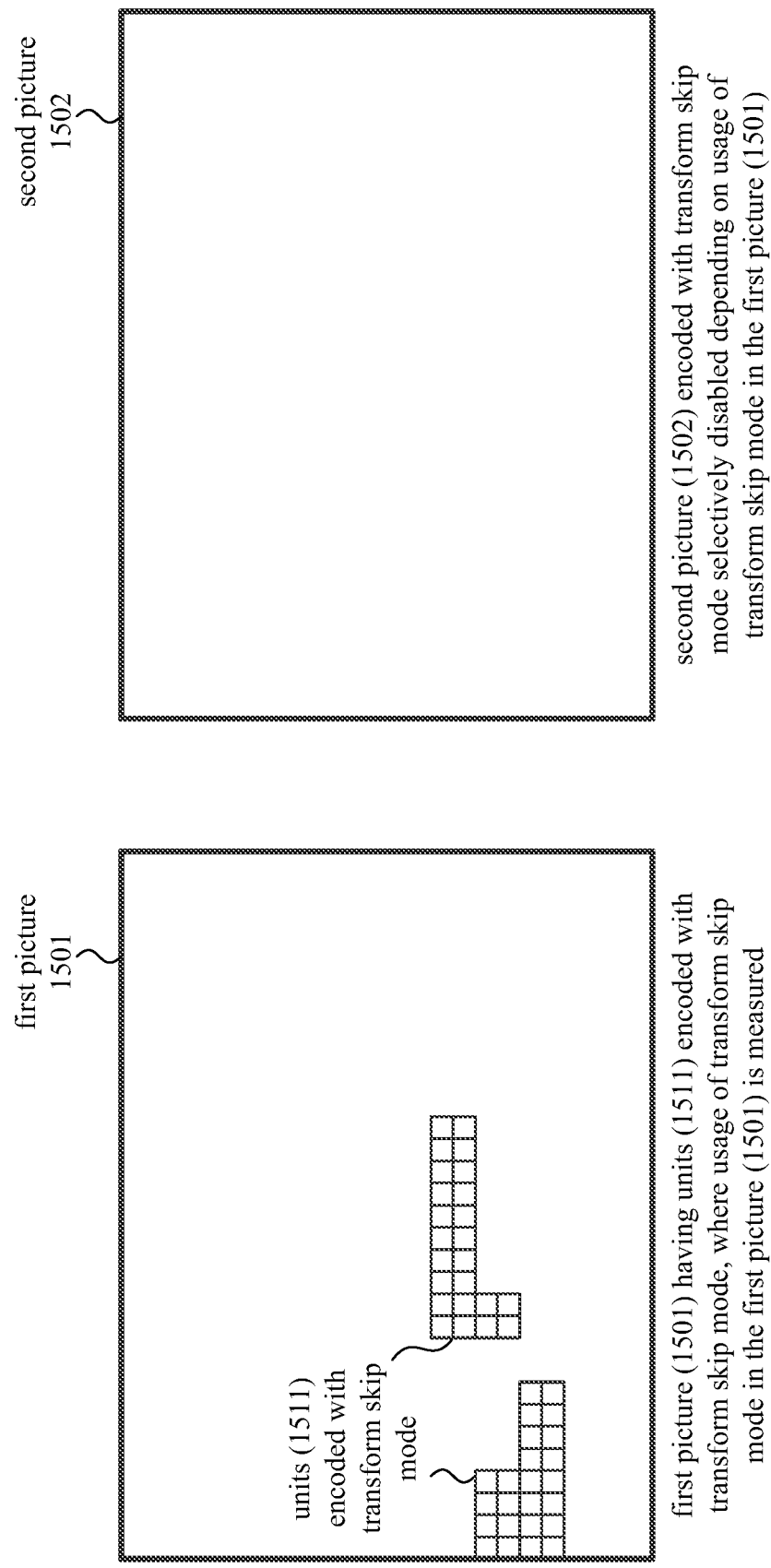
FIG. 15 is a diagram illustrating an example of use of a measurement of transform skip mode usage for a first picture to selectively disable use of transform skip mode in another picture.

FIG. 15 shows an example (1500) of use of measurement of the usage of transform skip mode for a first picture (1501) to selectively limit the use of transform skip mode in another picture. In FIG. 15, the first picture (1501) includes a mix of units (1511) encoded with transform skip mode and units not encoded with transform skip mode (which are the rest of the units of the first picture (1501)). The encoder measures the usage of transform skip mode in the first picture (1501). The usage of transform skip mode can be measured in terms of sample values of the first picture (1501) or some other measure of area of the first picture (1501).

The second picture (1502) is encoded with transform skip mode selectively disabled depending on usage of transform skip mode in the first picture (1501), relative to a threshold proportion of the first picture (1501). The threshold proportion depends on implementation (e.g., 1%, 2%, 5%). In the example of FIG. 15, the threshold proportion is 2%, and more than the threshold proportion of the first picture (1501) is encoded using transform skip mode. Thus, in the example of FIG. 15, transform skip mode is enabled when encoding the second picture (1502) because the measured usage of transform skip mode in the first picture (1501) is greater than the threshold proportion (2%).

As another example, suppose an intra-picture-coded picture (first picture) is encoded with transform skip mode enabled, such that it potentially includes a mix of units encoded with transform skip mode and units encoded without transform skip mode. After the intra-picture-coded picture is encoded, the encoder measures the usage of transform skip mode in the picture. The encoder calculates the number of sample values in the units encoded with transform skip mode. (In practice, the encoder can consider one component plane of the picture, e.g., the luma plane, or multiple component planes of the picture.) The total number of sample values for the picture is width*height sample values. The encoder determines whether the number of sample values in the units encoded with transform skip mode is more than a threshold proportion $t_2$ of the sample values for the picture. When encoding the following pictures, the encoder can disable transform skip mode if the number of sample values in the units encoded with transform skip mode (in the first picture) is less than a threshold proportion $t_2$ of the sample values for the first picture. Otherwise, if transform skip mode is enabled, units of the following pictures may be encoded with transform skip mode or without transform skip mode (that is, using a frequency transform).

Or, as another example, suppose a first picture includes a mix of intra-picture-coded units and inter-picture-coded units. The encoder can determine the usage of transform skip mode when encoding the first picture using the approach described in the previous paragraph. Then, when encoding the following pictures, the encoder can use the measured usage of transform skip mode (for the first picture) to selectively skip evaluation of transform skip mode.

B. Skipping Evaluation of Transform Skip Mode Depending on Tracked Usage of Transform Skip Mode, Generally.

Figure 16A:
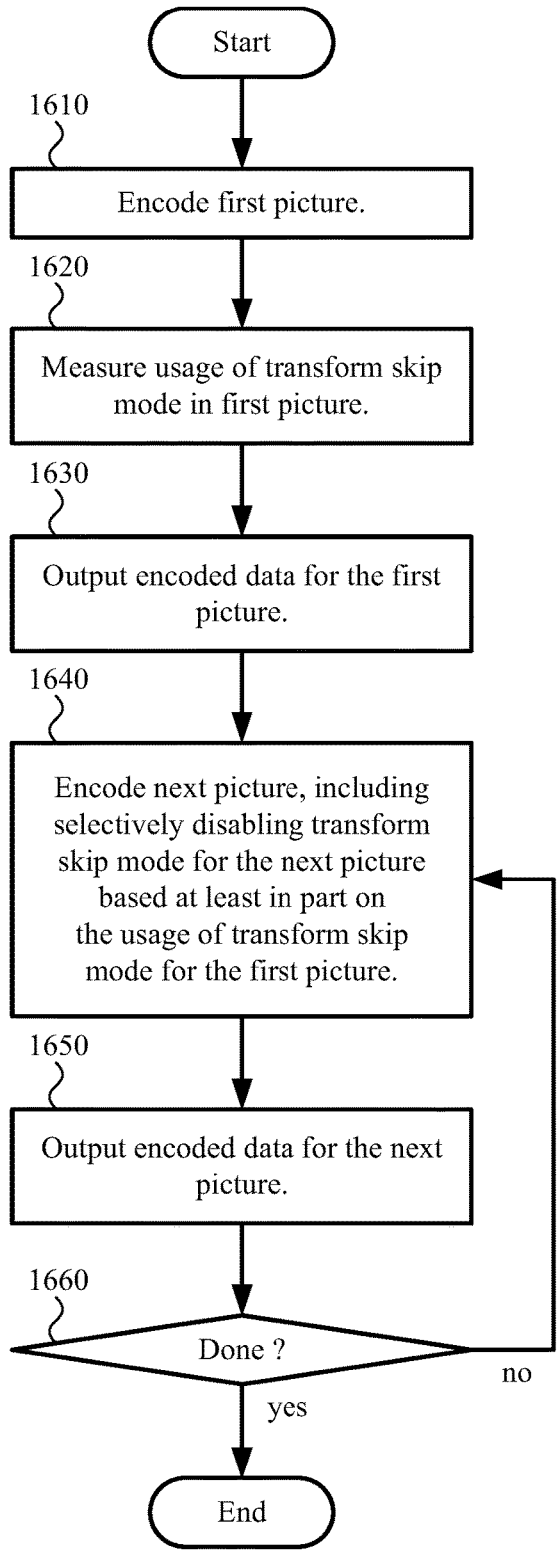
Figure 16A:
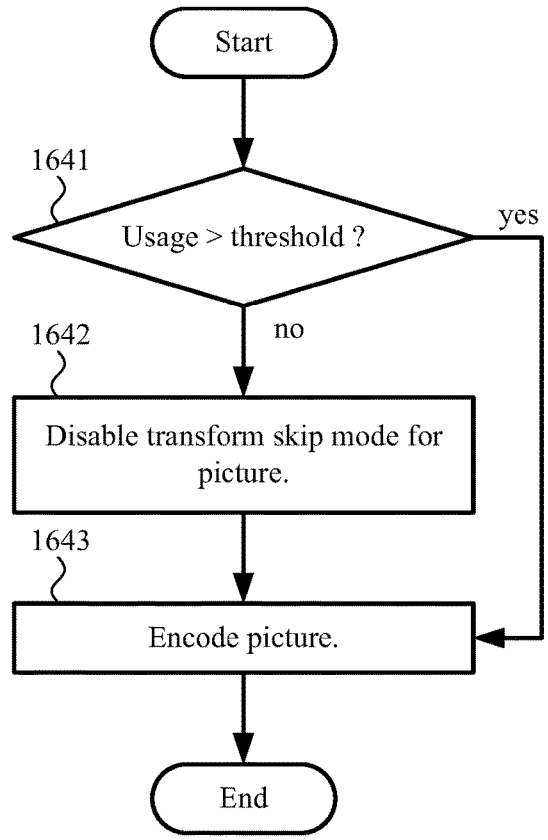

FIGS. 16a and 16b illustrate a generalized technique (1600) for using a measurement of transform skip mode usage for a first picture to limit use of transform skip mode in another picture. An encoder such as the encoder (340) described with reference to FIG. 3, encoder (400) described with reference to FIGS. 4a and 4b, or other encoder can perform the technique (1600).

The encoder encodes (1610) a first picture among multiple pictures to produce encoded data for the first picture, which the encoder later outputs (1630). Also, the encoder measures (1620) usage of transform skip mode for the first picture. The measured usage of transform skip mode indicates a proportion of content of the first picture encoded using transform skip mode.

The encoder encodes (1640) the next picture among the multiple pictures to produce encoded data for the next picture, which the encoder outputs (1650). The next picture follows the previous picture in coding order (e.g., the second picture follows the first picture in coding order). When encoding (1640) the next picture, the encoder selectively disables transform skip mode for the next picture based at least in part on the usage of transform skip mode for the first picture, relative to a threshold proportion. The threshold proportion depends on implementation. For example, the threshold proportion is between 1% and 3%.

For example, as shown in the technique (1601) of FIG. 16*b*, the encoder compares (1641) the usage of transform skip mode for the first picture to a threshold proportion. If the usage of transform skip mode for the first picture is less than the threshold proportion, the encoder disables (1642) transform skip mode for the next picture and encodes (1643) the next picture.

Otherwise (the usage of transform skip mode for the first picture is more than the threshold proportion), the encoder encodes (1643) the next picture. In doing so, the encoder evaluates both transform skip mode and transform mode for at least some units of the next picture.

For purposes of measuring (1620) the usage of transform skip mode, the first picture can be entirely encoded using intra-picture-coded units, and the next picture can be at least partially encoded using inter-picture-coded units. Or, as another example, the first picture can be partially encoded using intra-picture-coded units, and the next picture can be at least partially encoded using inter-picture-coded units.

Returning to FIG. 16*a*, after outputting (1650) the encoded data for the next picture, the encoder checks (1660) whether to continue encoding with the next picture. If so, the encoder encodes (1640) another picture (e.g., third picture, fourth picture, and so on), selectively disabling transform skip mode for the next picture based at least in part on the usage of transform skip mode for the first picture.

VIII. Skipping In-Depth Evaluation of Candidate MVs for Contextual Motion Mode.

This section presents examples of encoding that include selectively skipping in-depth evaluation of candidate motion vectors ("MVs") for contextual motion mode. In many cases, during encoding of a current unit, an encoder can avoid in-depth evaluation of candidate MVs for contextual motion mode when those candidate MVs are unlikely to improve rate-distortion performance, which tends to speed up encoding.

A. Examples of Selective Skipping In-Depth Evaluation for Some Candidate MVs for Contextual Motion Mode.

In a contextual motion mode, candidate MVs for a current unit are derived from the MVs of spatially neighboring units, temporal neighboring units and/or rules. During motion estimation, an encoder can evaluate one or more of the candidate MVs for contextual motion mode. If a candidate MV for contextual motion mode is selected for the current unit, the encoder can signal information indicating that contextual motion mode is used for the current unit, along with information identifying which candidate MV is used for the current unit. Such signaling can be very efficient, compared to signaling of MV information as a differential relative to a predicted MV. During decoding, a decoder can derive the same candidate MVs for contextual motion mode for the current unit, then select the candidate MV identified by the signaled information. Merge mode in the H.265/HEVC standard is an example of contextual motion mode. More generally, a contextual motion mode involves a competition among multiple derived MVs and selection of one of the multiple derived MVs.

During encoding, an encoder can compute differences between predicted values for a current unit and the original sample values for the current unit. The differences define a prediction residual, or residual, for the current unit. The residual can be split into smaller units for purposes of a frequency transform, quantization, or entropy coding. Or, coding of the residual can be skipped. In particular, the encoder can skip coding of the residual if the sample values of the residual are all zero or mostly zero, or if the quantized transform coefficients for the residual are all zero or mostly zero, or to reduce bit rate by omitting the residual even if it has significant values, or to reduce coding complexity (and decoding complexity) by omitting the residual even if it has significant values, or for some other reason. In most codec standards and formats, the encoder can efficiently signal whether residual coding is skipped or not skipped for a unit. In the H.265/HEVC standard, for example, a flag for a CU indicates whether residual coding has been skipped for the CU. (In the H.265/HEVC standard, a "skipped" CU is also defined as having a 2N×2N partition pattern. That is, aside from lacking residual data, the CU has a single PU and is not split into smaller PUs for purposes of motion compensation.) Based on signaled information, a decoder can determine whether or not residual coding is skipped for a unit.

An encoder can concurrently evaluate options for contextual motion mode and residual coding, so as to identify a candidate MV for contextual motion mode that provides the best overall performance, considering residual coding. Evaluating options for residual coding can be computationally complex and time-consuming, considering operations to evaluate options for quantizing residuals, operations to reconstruct the residuals, and operations to evaluate quality after reconstruction. To speed up encoding, the encoder can selectively skip evaluation of residual coding options for some candidate MVs for contextual motion mode.

Figure 17A:
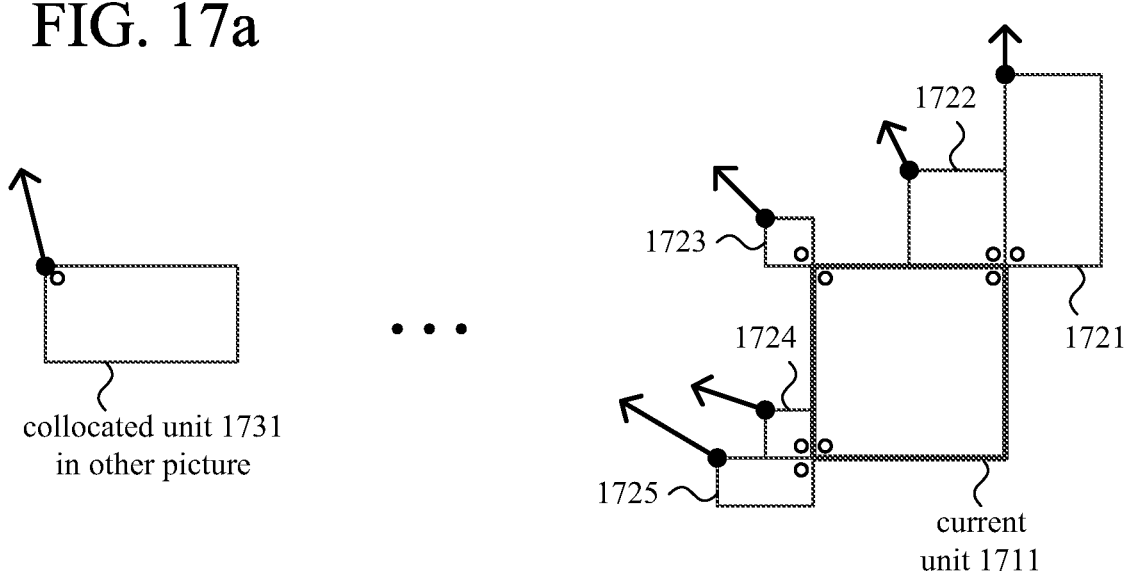
FIGS. 17a and 17b are diagrams illustrating examples of candidate motion vectors ("MVs") considered for contextual motion mode with residual coding skip mode on or off, respectively.
Figure 17B:
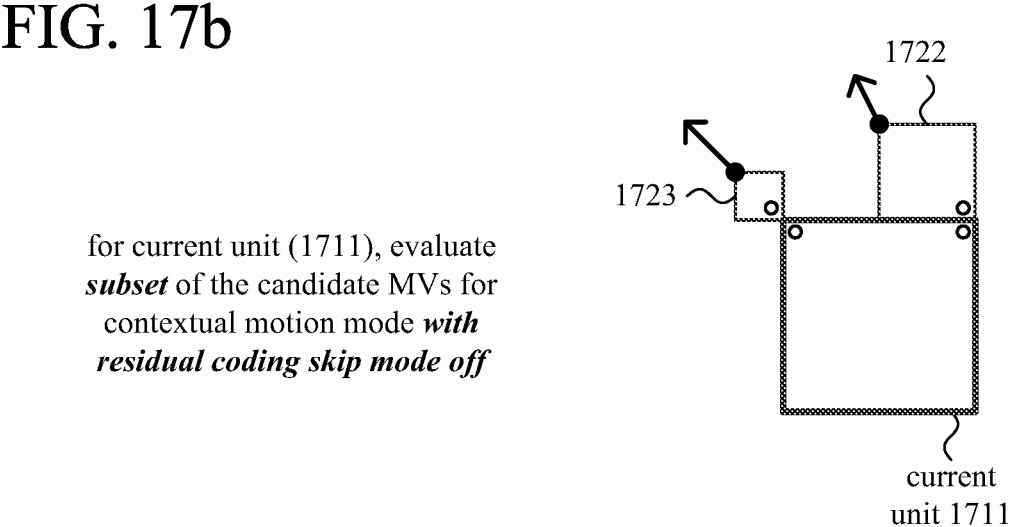

FIGS. 17*a* and 17*b* are diagrams illustrating examples of candidate MVs for contextual motion mode with residual coding skip mode on or off. FIG. 17*a* shows candidate MVs for contextual motion mode for a current unit (1711). The candidate MVs include MVs of spatially adjacent units (1721-1725), which have defined locations relative to the top-left position, top-right position, or bottom-left position of the current unit (1711). That is, two spatially adjacent units (1722, 1721) are defined as the units including the position above and position to the above-right of, respectively, the top-right position of the current unit (1711). Another spatially adjacent unit (1723) is defined as the unit including the position above and to the left of the top-left position of the current unit (1711). Two other spatially adjacent units (1724, 1725) are defined as the units including the position left of and position to the below-left of, respectively, the bottom-left position of the current unit (1711). The candidate MVs also include the MV of a collocated unit (1731) in another picture.

During encoding, the encoder evaluates the candidate MVs for contextual motion mode (including the MVs from the spatially adjacent units 1721-1725 and the MV from the temporally adjacent unit (1731)) with residual coding skip mode on. That is, the encoder evaluates the respective candidate MVs with residual coding skipped and, in H.265/ HEVC implementations, with a partition pattern of 2N×2N. Since residual coding is skipped, the encoder skips evaluation of coding options for residuals. Instead, the encoder relatively quickly computes a metric of the suitability of the respective candidate MVs for contextual motion mode. The metric can be a rate-distortion cost that accounts for bit rate associated with signaling candidate MV information for contextual motion mode, an estimate of bit rate for prediction residuals, and distortion associated with the prediction error. Or, the metric can be some other type of measure.

The encoder ranks the candidate MVs for contextual motion mode according to the computed values of the performance metric. The encoder identifies a subset of the candidate MVs for contextual motion mode. The subset can include a single candidate MV having the best performance with residual coding skip mode on, the top two candidate MVs with residual coding skip mode on, or some other number of the candidate MVs for contextual motion mode. In FIG. 17*b*, the subset of candidate MVs for contextual motion mode includes MVs of two spatially adjacent units (1722, 1723).

For the subset of the candidate MVs for contextual motion mode, the encoder evaluates the candidate MV(s) with residual coding skip mode off. That is, when the encoder evaluates a candidate MV in the subset, the encoder evaluates options for residual coding. As a result, after motion compensation using the candidate MV, at least some values of a residual may be encoded for the unit. Because options for residual coding are evaluated and residuals are reconstructed to evaluate quality, the evaluation process is more time-consuming. The encoder avoids, however, such time-consuming evaluation of options for residual encoding for at least some of the candidate MVs for contextual motion mode, which are outside the subset.

The number of candidate MVs evaluated for contextual motion mode can depend on implementation. For example, the encoder evaluates 3, 4, 5, 6 or some other number of the candidate MVs shown in FIG. 17*a*. Alternatively, the encoder evaluates other and/or different candidate MVs for contextual motion mode. For example, the encoder evaluates a candidate MV derived according to rules if one of the MVs for a spatially adjacent unit or temporally adjacent unit is missing, or if identical candidate MVs are eliminated from consideration.

The encoder can also evaluate other coding options for the current unit (1711). For example, after evaluating the candidate MVs for contextual motion mode, the encoder evaluates other MVs for the current unit. For H.265/HEVC implementations, the encoder can evaluate partition patterns other than 2N×2N.

B. Selective Skipping In-Depth Evaluation for Some Candidate MVs for Contextual Motion Mode, Generally.

Figure 18:
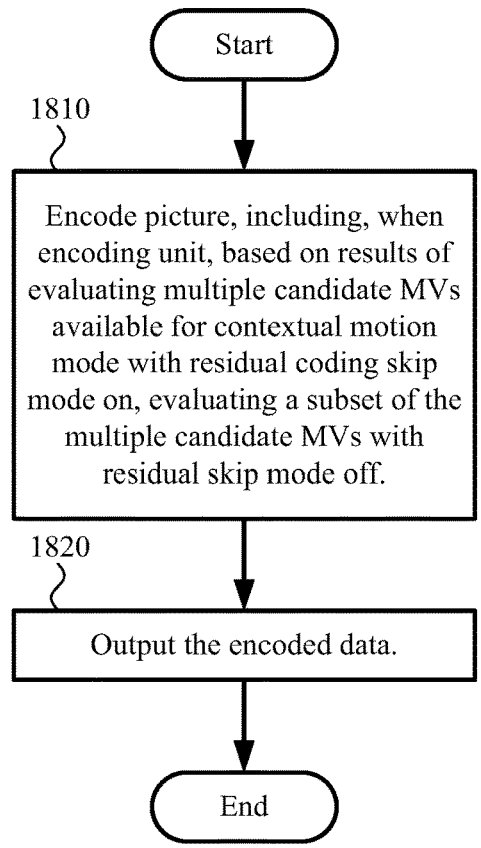
FIG. 18 is a flowchart illustrating a generalized technique for encoding a picture, including selectively skipping evaluation of candidate MVs for contextual motion mode with residual coding skip mode off.

FIG. 18 shows a generalized technique (1800) for encoding a picture, including selectively skipping evaluation of candidate MVs for contextual motion mode with residual coding skip mode off. An encoder such as the encoder (340) described with reference to FIG. 3, encoder (400) described with reference to FIGS. 4*a* and 4*b*, or other encoder can perform the technique (1800).

The encoder encodes (1810) a picture to produce encoded data, then outputs (1820) the encoded data. As part of the encoding (1810), when encoding a unit (e.g., CU) of the picture, the encoder evaluates, with residual coding skip mode on, each of multiple candidate MVs for contextual motion mode. For example, the multiple candidate MVs for contextual motion mode include one or more MVs each associated with a spatially adjacent unit in the picture. FIG. 17*a* shows examples of spatially adjacent units. The candidate MVs for contextual motion mode can also include one or more MVs each associated with a temporally adjacent unit in another picture. FIG. 17*a* also shows an example of a temporally adjacent unit. The candidate MVs for contextual motion mode can further include one or more MVs each derived by rules. Alternatively, the candidate MVs for contextual motion mode include other and/or additional MVs. With residual coding skip mode on, the unit lacks residual data, so evaluation is relatively fast. In H.265/ HEVC implementations, with residual coding skip mode on, the unit is a CU that has a single PU (2N×2N partition pattern).

Based on results of that evaluation (of candidate MVs for contextual motion mode with residual coding skip mode on), the encoder evaluates, with residual coding skip mode off, only a subset of the multiple candidate MVs for contextual motion mode. For example, the subset includes a single candidate MV of the candidate MVs for contextual motion mode. Or, the subset includes two of the candidate MVs for contextual motion mode. Or, the subset includes more of the candidate MVs for contextual motion mode. After evaluating the subset of candidate MVs for contextual motion mode with residual coding skip mode off, the encoder can evaluate other coding options for the unit (e.g., different MVs, different partition patterns, with residual coding skip mode on or off).

Figure 19:
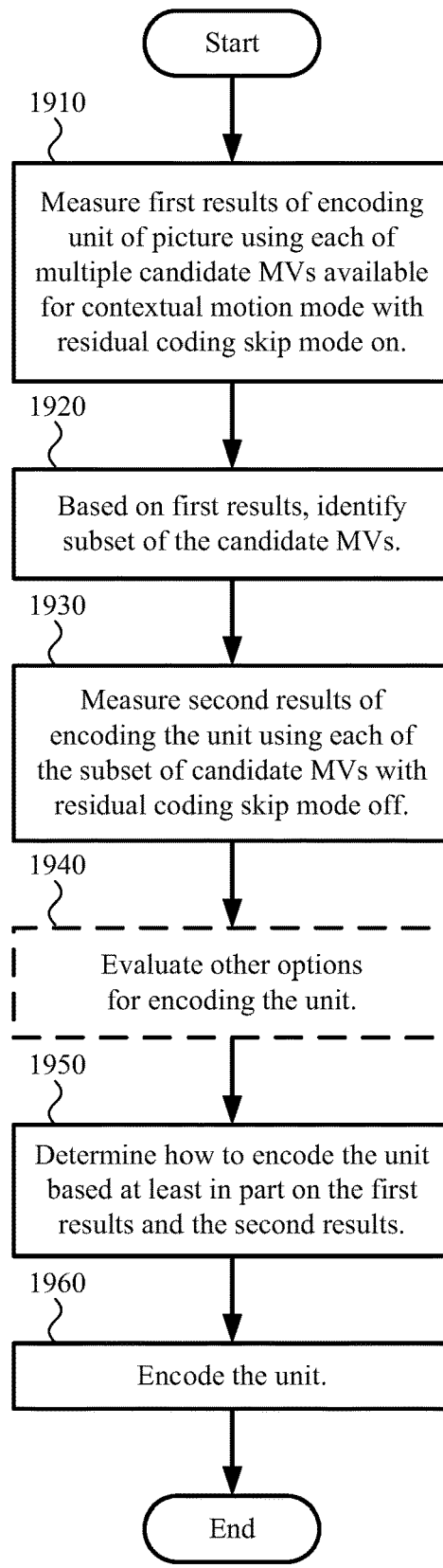
FIG. 19 is a flowchart illustrating an example technique for encoding a unit, including selectively skipping evaluation of candidate MVs for contextual motion mode with residual coding skip mode off.

In more detail, FIG. 19 shows an example technique (1900) for encoding a unit, including selectively skipping evaluation of candidate MVs for contextual motion mode with residual coding skip mode off. An encoder such as the encoder (340) described with reference to FIG. 3, encoder (400) described with reference to FIGS. 4*a* and 4*b*, or other encoder can perform the technique (1900).

The encoder measures (1910), as first results, the results of encoding a unit with residual coding skip mode on using each of multiple candidate MVs for contextual motion mode. The unit is, for example, a CU having size of 64×64, 32×32, 16×16, or 8×8, or another type of unit. Thus, the encoder evaluates the candidate MVs for contextual motion mode without coding residuals.

Based on the first results, the encoder identifies (1920) a subset of the multiple candidate MVs for contextual motion mode. For example, according to some criteria such as rate-distortion cost, the encoder identifies the top x candidate MVs for contextual motion mode, where x depends on implementation (e.g., x is 1, 2, or some other number). The encoder measures (1930) second results of encoding the unit with residual coding skip mode off (e.g., evaluating coding options for residuals) using each of the subset of the candidate MVs. Optionally, the encoder can also evaluate (1940) other options for encoding the unit (e.g., different MVs, different partition patterns, with residual coding skip mode on or off).

The encoder determines (1950) how to encode the unit based at least in part on the first results and the second results. For example, the encoder selects the encoding option that provides the best performance for the unit. Then, the encoder encodes (1960) the unit. Thus, the unit can be encoded using one of the candidate MVs for contextual motion mode with residual coding skip mode on, using one of the subset of candidate MVs for contextual motion mode with residual coding skip mode off, or using some other mode.

IX. Skipping Evaluation of RDOQ.

This section presents examples of encoding that include selective application of rate-distortion-optimized quantization ("RDOQ") or other quantization, depending on one or more conditions evaluated by an encoder. In many cases, during encoding of a current unit, the encoder can avoid the use of RDOQ when it is unlikely to improve rate-distortion performance, which tends to speed up encoding.

A. Examples of Selective Application of RDOQ.

With RDOQ, an encoder sets the optimal quantization level for each coefficient, adaptively tweaking coefficient values based on rate-distortion efficiency. RDOQ tends to be very time-consuming, but can provide excellent rate-distortion efficiency.

Other forms of quantization are simpler to apply. For example, in one simple form of quantization, an encoder quantizes a coefficient x by determining the quantized coefficient $Q(x)=\text{sign}(x) \times \text{floor}(\text{abs}(x) \div s + f)$, where $Q(x)$ represents the quantized version of the coefficient x, the function sign(n) returns the sign of the input n, the function abs(n) returns the absolute value of the input n, the function floor(n) returns the maximum integer not greater than the input n, the ÷ operator is a division operator (but not an integer division operator), s is the quantization step size (which depends on the quantization parameter ("QP") set for a frame, unit, component block, etc.), and f is an offset that controls rounding. The rounding control value f depends on implementation. If f=0, a quantized coefficient is rounded towards zero, which tends to result in more zero-value quantized coefficients since more low values are quantized to zero instead of one. If f=½, a quantized coefficient is rounded to the nearest integer, which tends to result in fewer zero-value quantized coefficients. Typically, the value off is in the range [0, ½]. The value off can be different depending on picture type or component plane. For example, during quantization of coefficients, f=⅓ for intra-picture-coded pictures, and f=⅙ for inter-picture-coded pictures.

An encoder can selectively apply RDOQ when it is more likely to improve rate-distortion efficiency, but otherwise apply some other form of quantization that is computationally simpler (e.g., as described in the preceding paragraph). The encoder can evaluate any of several conditions when determining whether to apply RDOQ or another form of quantization.

For example, for a first condition, the encoder considers unit size of a unit whose transform coefficients are quantized. If the unit is smaller than a threshold unit size, the encoder applies RDOQ to transform coefficients of the unit. Otherwise, the encoder applies the other, simpler form of quantization to transform coefficients of the unit. The unit whose size is evaluated can be a CU, TU, or other type of unit. For example, the threshold unit size is 32×32. The encoder skips RDOQ if unit size is 32×32 or higher, but applies RDOQ if the unit size is 16×16 or lower. Alternatively, the threshold unit size has some other value.

As another example, for a second condition, the encoder considers the picture order of a picture in which transform coefficients are quantized. The encoder applies RDOQ every n pictures, where the value of n depends on implementation. Otherwise, the encoder applies another, simpler form of quantization. The value of n can be 4, 8, 16, or some other number of pictures. The period reflected by n can correspond to a temporal layer (e.g., temporal layer 0) or picture type (e.g., intra-picture-coded picture). When the order of a picture is indicated with a picture order count ("POC") value, the encoder can check whether POC % n==0. If so, the encoder applies RDOQ to transform coefficients of units in the picture. Otherwise, the encoder performs the other, simpler form of quantization to transform coefficients of units in the picture.

As another example, for a third condition, the encoder pre-processes a unit of a picture or multiple units of the picture to determine whether to apply RDOQ. The pre-processing can include, for example, applying a simple form of quantization to transform coefficients in a manner consistent with the formula $Q(x)=\text{sign}(x) \times \text{floor}(\text{abs}(x) \div s + f)$, as explained above. For such pre-processing, the rounding control value f can be set to a value that tends to preserve non-zero-value coefficients. For example, f=½ for pre-processing of coefficients of a luma component, and f=⅓ for pre-processing of coefficients of chroma components. The encoder then determines whether the transform coefficients include significant values. For example, the encoder calculates the sum of absolute values of the quantized transform coefficients. If the sum of absolute values of the coefficients is higher than a threshold value, the encoder applies RDOQ when encoding the coefficients. Otherwise, RDOQ is skipped, and the encoder applies the other, simpler form of quantization when encoding the coefficients. If the threshold value is zero, any unit with non-zero transform coefficients (after pre-processing/simple quantization) is quantized using RDOQ. Alternatively, the threshold value can have a higher value, or the encoder can use a different measure of the significance of transform coefficients. Alternatively, the pre-processing can include other operations to evaluate a picture or unit(s) therein.

B. Selectively Applying RDOQ, Generally.

FIG. 20a shows a generalized technique (2000) for selectively using RDOQ during encoding. An encoder such as the encoder (340) described with reference to FIG. 3, encoder (400) described with reference to FIGS. 4a and 4b, or other encoder can perform the technique (2000).

The encoder encodes (2010) a picture to produce encoded data, then outputs (2020) the encoded data. As part of the encoding (2010), the encoder evaluates one or more conditions. The evaluated condition(s) can include: (1) unit size for a unit of the picture (e.g., CU size for a CU, TU size for a TU); (2) POC for the picture; and/or (3) results of pre-processing (e.g., results of applying simple quantization). Alternatively, the evaluated condition(s) include other and/or additional conditions.

Depending on results of the evaluation, the encoder selectively applies either RDOQ or other quantization. For example, RDOQ is applied if the unit size for a unit of the picture is smaller than a threshold unit size, but the other quantization is applied if the unit size for the unit is larger than the threshold unit size. By skipping RDOQ for large unit sizes, the encoder can speed up encoding by omitting RDOQ when it is unlikely to improve coding efficiency. Or, as another example, RDOQ is applied periodically among pictures of a video sequence depending on the POC of the picture. By periodically applying RDOQ, the encoder can speed up encoding by applying RDOQ when it is most likely to be beneficial (e.g., on pictures that will be reference pictures for motion compensation). Or, as another example, RDOQ is applied only if the results of pre-processing indicate presence of a threshold amount of activity. For example, the pre-processing includes applying simple quantization to coefficients of a unit of the picture, and the threshold amount of activity is at least one non-zero coefficient. In this way, the encoder can avoid the use of RDOQ when it is unlikely to improve rate-distortion performance during encoding, which tends to speed up encoding. By selectively omitting RDOQ when it is unlikely to improve rate-distortion efficiency, quantization is much faster, which can significantly reduce overall encoding time, without much of a penalty to coding efficiency.

FIG. 20b shows an example technique (2001) for selectively using RDOQ during encoding. An encoder such as the encoder (340) described with reference to FIG. 3, encoder (400) described with reference to FIGS. 4a and 4b, or other encoder can perform the technique (2001).

The encoder pre-processes (2011) a unit of a picture, e.g., performing simple quantization on transform coefficients of the unit. The encoder decides (2012) whether to use RDOQ on transform coefficients of the unit, and then either uses (2013) RDOQ or uses (2014) other quantization on the transform coefficients of the unit. For example, the encoder calculates the sum of absolute values of quantized transform coefficients, then compares the sum to a threshold value (such as zero). If the sum of absolute values is higher than the threshold value, the encoder uses (2013) RDOQ when encoding the transform coefficients. Otherwise, RDOQ is skipped, and the encoder uses (2014) the other, simpler form of quantization when encoding the transform coefficients. For example, the encoder quantizes coefficients in a manner consistent with the formula $Q(x)=\text{sign}(x)\times\text{floor}(\text{abs}(x)\div s+f)$, as described above.

Alternatively, the threshold value can have a higher value, or the encoder can use a different measure of the significance of transform coefficients.

X. Skipping Evaluation of Whether to Split Unit into Smaller Units for Transform.

This section presents examples of encoding that include selectively skipping evaluation of whether to split a unit (e.g., TU) into smaller units for purposes of frequency transforms. In many cases, during encoding of a current unit, an encoder can avoid splitting the current unit when splitting is unlikely to improve rate-distortion performance, which tends to speed up encoding.

A. Examples of Selective Skipping of Transform Splitting Evaluation.

FIG. 21 shows example organizations (2101 . . . 2108) for a residual quadtree ("RQT"), which differ in terms of how blocks of residual values are organized for frequency transforms. Many other possible organizations for the RQT are not shown. In the RQT, a block corresponds to a block of a unit (e.g., TU). In general, the blocks of a given unit are split using the same pattern (that is, chroma blocks are split, if at all, like the corresponding luma block).

In some approaches, to improve rate-distortion efficiency, an encoder checks every possible transform size for a unit. For example, the encoder uses full, recursive evaluation of the possible combinations of transform sizes for a unit, generally following the evaluation approach shown in FIG. 5 but evaluating transform sizes. To start, the encoder determines the cost of encoding a current unit having a current transform size. For example, the current unit is a TU according to the H.265/HEVC standard. Alternatively, the unit is another type of unit. The current transform size is 32×32, 16×16, 8×8, 4×4, or some other transform size. The cost can be measured in terms of rate cost and/or distortion cost, using any available metric, and can be an estimate or depend on results of actual encoding.

The encoder checks whether to split the current unit into multiple smaller units with smaller transform sizes (e.g., quadrants of the current unit according to quadtree decomposition). The encoder can check whether the current unit has reached a minimum transform size and, if not, further split the current unit. If the current unit is not split, the encoder returns (as the combination of best transform sizes and corresponding best cost for the current unit) the current transform size and cost of encoding the current unit at the current transform size.

Otherwise, if the current unit is to be split, the encoder splits the current unit into multiple new units having a smaller transform size and calls an evaluation routine for each of the new units having the smaller transform size. In the evaluation routine, the new unit having the smaller transform size is similarly evaluated, with the combination of best transform sizes and corresponding best cost for the new unit returned.

Then, when results of evaluation for the new units with the smaller transform size have been returned, the encoder compares (a) the cost of encoding the current unit at the current transform size with (b) the aggregate costs of encoding the (split) new units at the smaller transform size. From among these two options, the encoder returns the combination of best transform sizes and corresponding best cost for the current unit—that is, the transform size or sizes having the smaller encoding cost, and the value of the smaller encoding cost. In this way, the encoder can exhaustively evaluate different combinations of transform sizes for smaller units within the current unit. For example, the encoder can determine the cost of encoding a 32×32 TU, then split the 32×32 TU into four 16×16 TUs. For each of the four 16×16 TUs, the encoder can determine the cost of encoding the 16×16 TU, then split the 16×16 TU into four 8×8 TUs. This continues until the encoder reaches a TU having the minimum TU size (e.g., 4×4), which is not further split. At that point, the encoder compares the aggregate cost of encoding the four TUs at the minimum TU size (e.g., four 4×4 TUs) against the cost of encoding the TU that includes those four TUs (e.g., an 8×8 TU with an 8×8 transform). The encoder returns the transform size(s) having the smaller encoding cost. For an 8×8 TU, for example, the best combination of transform size(s) may be an 8×8 TU or four 4×4 TUs. Similarly, for a 16×16 TU, the best combination of transform size(s) may be a 16×16 TU, four 8×8 TUs, three 8×8 TUs and four 4×4 TUs in an 8×8 quadrant, two 8×8 TUs and eight 4×4 TUs in two 8×8 quadrants, one 8×8 TU and twelve 4×4 TUs in three 8×8 quadrants, or sixteen 4×4 TUs. For a 32×32 TU, the best combination of transform size(s) may be a 32×32 TU, four 16×16 TUs, or any combination involving one or more of the 16×16 TUs split as described above. Full, recursive evaluation of options for transform sizes can be time-consuming and computationally intensive.

To speed up the encoding process, an encoder can skip evaluation of some transform sizes depending on one or more conditions evaluated by the encoder. For example, the encoder considers whether the quantized transform coefficients of a current unit are all zero at the current transform size. If so, smaller transform sizes are unlikely to improve coding efficiency, and the process of evaluating smaller transform sizes is terminated for the current unit. Conversely, if there is at least one non-zero transform coefficient at the current transform size, using smaller transform size might improve coding efficiency, so the encoder evaluates options for encoding the current unit with smaller transform sizes. Alternatively, the encoder considers another condition (e.g., magnitude of non-zero values of quantized transform coefficients, magnitude of values of a prediction residual, spatial variation of values of a prediction residual) when deciding whether to skip evaluation of smaller transform sizes. The encoder can check the condition for all component blocks of the current unit. Or, the encoder can check the condition for only one component block of the current unit (e.g., for the luma block).

B. Skipping Evaluation of Transform Splitting Options, Generally.

FIG. 22 shows a generalized technique (2200) for encoding a picture, including selectively skipping evaluation of whether to split a unit into multiple units having a smaller transform size. An encoder such as the encoder (340) described with reference to FIG. 3, encoder (400) described with reference to FIGS. 4a and 4b, or other encoder can perform the technique (2200).

The encoder encodes (2210) a picture to produce encoded data, then outputs (2220) the encoded data. As part of the encoding (2210), the encoder sets a transform size or combination of transform sizes for a unit of the picture (e.g., for a TU in H.265/HEVC implementations). In doing so, the encoder evaluates a condition at a current transform size. For example, the condition is whether the unit has any non-zero value coefficients at the current transform size. The encoder can check the condition for only a luma block of the unit, or the encoder can check the condition for a luma block and chroma blocks of the unit. Alternatively, the encoder checks another condition. Depending on results of the evaluation of the condition, the encoder selectively skips evaluation of whether to split the unit from the current transform size into multiple units having a smaller transform size. In this way, the encoder can avoid splitting the unit into smaller units for frequency transforms when such splitting is unlikely to improve rate-distortion performance during encoding, which tends to speed up encoding.

XI. Selectively Skipping In-Depth Evaluation of Candidate Partition Patterns.

This section presents examples of encoding that include selectively skipping in-depth evaluation of candidate partition patterns for motion compensation. In many cases, during encoding of a current unit, an encoder can avoid evaluation of options for residual coding for candidate partition patterns that are unlikely to improve rate-distortion performance, which tends to speed up encoding.

A. Examples of Selective Skipping of In-Depth Evaluation of Candidate Partition Patterns.

FIG. 23 shows example partition patterns (2300) for a unit that is encoded using motion compensation. The example partition patterns (2300) include 2N×2N, N×2N, 2N×N, N×N, nL×2N, nR×2N, 2N×nU, and 2N×nD patterns. When a unit has one partition (so-called 2N×2N partition pattern), the partition and unit are co-extensive. When a unit has four partitions (so-called N×N partition pattern), each partition covers a quadrant of the unit. When a unit has two partitions, the two partitions can be configured in any of various patterns: top and bottom halves (so-called 2N×N partition pattern), left and right halves (so-called N×2N partition pattern), left quarter and remainder (so-called nL×2N partition pattern), right quarter and remainder (so-called nR×2N partition pattern), top quarter and remainder (so-called 2N×nU partition pattern), or bottom quarter and remainder (so-called 2N×nD partition pattern). For example, in H.265/HEVC implementations, a 16×16 unit can have a single 16×16 partition (2N×2N), four 8×8 partitions (N×N) (when 16×16 is the smallest allowed CU size), two 16×8 partitions (2N×N), two 8×16 partitions (N×2N), a 4×16 partition and 12×16 partition (nL×2N), a 12×16 partition and 4×16 partition (nR×2N), a 16×4 partition and 16×12 partition (2N×nU), or a 16×12 partition and 16×4 partition (2N×nD). In some implementations, for some unit sizes (e.g., 8×8 units), the N×N partition pattern is not allowed, and the unequal partition patterns (nL×2N, nR×2N, 2N×nU, and 2N×nD) are not allowed.

In some approaches, to improve rate-distortion efficiency, an encoder checks each possible partition pattern when encoding a unit. For a given partition pattern, the encoder performs motion estimation for partition(s) of the unit, determines prediction residuals, encodes the prediction residuals, reconstructs the prediction residuals, and evaluates results of the encoding using a rate-distortion metric or other metric. In particular, evaluating options for residual coding can be very time-consuming.

To speed up the encoding process, an encoder can skip residual coding (including evaluation of options for residual coding and reconstruction of residual values to evaluate quality) for some partition patterns. The encoder tracks the quality of motion-compensated prediction for the partition patterns, and it uses the tracked prediction quality to selectively skip in-depth evaluation of residual coding for those partition patterns that are less likely to improve coding efficiency. The encoder can measure the prediction quality of motion-compensated prediction as the magnitude of prediction error after the motion-compensated prediction (e.g., sum of absolute values of the values of the residuals) or using some other measure.

For example, the encoder performs motion estimation for a first partition pattern, measures the quality of motion-compensated prediction, and determines prediction residuals. The encoder performs residual coding and reconstruction, then measures the total cost of encoding the unit using the first partition pattern. The total cost can include a bit rate cost and/or distortion cost. The variable total_cost$_{best}$ tracks the best total cost for any partition pattern so far. The variable pred_quality$_{best}$ tracks the prediction quality for the partition pattern having the best total cost so far. Initially, the total cost for the first partition pattern is the best total cost so far (total_cost$_{best}$), and the prediction quality for the first partition pattern is the best prediction quality so far (pred_quality$_{best}$).

The encoder then evaluates the other partition patterns in turn. For a given partition pattern, the encoder performs motion estimation and measures the quality of motion-compensated prediction. If the quality of motion-compensated prediction is worse than a threshold prediction quality (which depends on pred_quality$_{best}$, as explained in the next paragraph), the encoder skips residual coding and continues by evaluating the next partition pattern. Otherwise (quality of motion-compensated prediction for the given partition pattern is better than the threshold prediction quality), the encoder performs residual coding and reconstruction for the given partition pattern, then measures the total cost of encoding the unit using the given partition pattern. If the total cost of encoding the unit using the given partition pattern is better than the best total cost so far (total_cost$_{best}$), the encoder updates the best total cost (total_cost$_{best}$) to be the total cost of encoding the unit using the given partition pattern, and the encoder updates the best prediction quality (pred_quality$_{best}$) to be the prediction quality of the unit when encoded using the given partition pattern. In some scenarios, selectively skipping residual coding for ineffective partition patterns can significantly speed up encoding.

The threshold prediction quality is based on the prediction quality (pred_quality$_{best}$) for the partition pattern that has yielded the best total cost of encoding, among partition patterns evaluated so far. For example, the threshold prediction quality is $t_3$*pred_quality$_{best}$, where $t_3$ is a threshold proportion that depends on implementation. For example, the threshold proportion is 105%, 110%, or some other value higher than 100% (when a lower value of prediction quality indicates better quality, and a higher value of prediction quality indicates worse quality).

B. Skipping In-Depth Evaluation of Candidate Partition Patterns, Generally.

FIG. 24 shows a generalized technique (2400) for encoding a picture, including selectively skipping evaluation of residual coding for encoding with a given partition pattern. An encoder such as the encoder (340) described with reference to FIG. 3, encoder (400) described with reference to FIGS. 4a and 4b, or other encoder can perform the technique (2400).

The encoder encodes (2410) a picture to produce encoded data, then outputs (2420) the encoded data. As part of the encoding (2410), the encoder iteratively evaluates multiple candidate partition patterns for a unit of the picture. For example, for H.265/HEVC implementations, the unit is a CU, and each of the candidate partition patterns splits the CU into a different configuration of one or more PUs. The multiple candidate partition patterns can be the partition patterns shown in FIG. 23. Alternatively, the multiple candidate partition patterns include other and/or additional partition patterns.

For a given candidate partition pattern, the encoder selectively performs residual coding depending on prediction quality relative to a threshold prediction quality. The threshold prediction quality is set based at least in part on prediction quality for a previously evaluated candidate partition pattern. For example, the threshold prediction quality is a threshold proportion of a best prediction quality, so far, among the multiple candidate partition patterns. The value of the threshold proportion depends on implementation. For example, the threshold proportion is between 105% and 120%.

FIG. 25 shows one example technique (2500) for evaluating candidate partition patterns for a unit of a picture, including selectively skipping evaluation of residual coding for encoding with a given partition pattern. An encoder such as the encoder (340) described with reference to FIG. 3, encoder (400) described with reference to FIGS. 4a and 4b, or other encoder can perform the technique (2500).

The encoder gets (2510) a next partition pattern (which is processed as a given partition pattern) for a unit of a picture, then performs (2520) motion estimation for the unit partitioned according to that partition pattern. The encoder measures (2530) the prediction quality for the given partition pattern based at least in part on results of the motion estimation for the unit. For example, the encoder determines the prediction error based on differences between sample values for the unit and motion-compensated prediction values resulting from the motion estimation, then calculates the prediction quality for the given partition pattern based at least in part on the prediction error (e.g., as sum of absolute values of the prediction error). The prediction quality can include a bit rate factor and/or distortion factor.

Then, the encoder determines whether the prediction quality for the unit (encoded with the given partition pattern) is better than a threshold prediction quality (e.g., comparing the prediction quality for the given partition pattern to the threshold prediction quality). Depending on the result, the encoder selectively performs residual coding for the prediction error for the unit. Thus, if the prediction quality for the unit (encoded with the given partition pattern) is better than the threshold prediction quality, the encoder performs (2550) residual coding for the prediction error for the unit, calculates (2560) the total cost for encoding the unit with the given partition pattern, and selectively updates (2570) the best total cost and threshold prediction quality. For example, the encoder measures a total cost for encoding the unit (with the given partition pattern) based at least in part on results of the residual coding. The total cost can include a bit rate factor and/or distortion factor. If the total cost for encoding the unit (with the given partition pattern) is less than the best total cost so far, the encoder updates the best total cost based on the total cost for encoding the unit (with the given partition pattern), and the encoder updates the threshold prediction quality based on the prediction quality for the given partition pattern. The encoder checks (2580) whether it has evaluated the last partition pattern. If not, the encoder continues by getting (2510) the next partition pattern.

On the other hand, if the prediction quality for the unit (encoded with the given partition pattern) is worse than the threshold prediction quality, the encoder skips residual coding for the prediction error for the unit. Skipping residual coding for partition patterns that are not likely to improve coding efficiency can significantly speed up overall encoding. The encoder checks (2580) whether it has evaluated the last partition pattern. If not, the encoder continues by getting (2510) the next partition pattern.

XII. Other Features.

In addition to the features incorporated in the claims, features of the innovations described herein include, but are not limited to, the following.

| | |
|---|---|
| A | Skipping Evaluation of Candidate Unit Sizes Based on Unit Sizes of Adjacent Units |
| A1 | In a computer system, a method of media encoding comprising: encoding a picture to produce encoded data, wherein the encoding includes setting a unit size for a current unit of the picture, wherein the setting the unit size for the current unit includes: determining a unit size for at least one adjacent unit; and based at least in part on the unit size for the at least one adjacent unit, selectively skipping evaluation of a candidate unit size for the current unit; and outputting the encoded data. |
| A2 | The method of claim A1, wherein the current unit is a current coding unit ("CU"), the unit size is a CU size, and the at least one adjacent unit is at least one adjacent CU. |
| A3 | The method of claim A1, wherein the setting the unit size for the current unit further includes: determining a current unit size for the current unit, wherein the skipping is also based at least in part on the current unit size for the current unit. |
| A4 | The method of claim A3, wherein the skipping the evaluation of the candidate unit size for the current unit depends on results of comparing the unit size for at least one adjacent unit to the current unit size for the current unit. |
| A5 | The method of claim A1, wherein each of the at least one adjacent unit is a spatially adjacent unit in the picture, relative to the current unit of the picture. |

| | |
|---|---|
| A6 | The method of claim A5, wherein the determining the unit size for the at least one adjacent unit includes:<br>getting a unit size for a first adjacent unit left of the current unit; and<br>getting a unit size for a second adjacent unit above the current unit;<br>determining one or more of minimum unit size and maximum unit size among the unit size for the first adjacent unit and the unit size for the second adjacent unit. |
| A7 | The method of claim A5, wherein the skipping includes excluding any candidate unit size that is more than a threshold difference from the unit size for the at least one adjacent unit. |
| A8 | The method of claim A1, wherein each of the at least one adjacent unit is a collocated unit of a temporally adjacent picture among pictures that are lower in a temporal hierarchy. |
| A9 | The method of claim A8, wherein the determining the unit size for the at least one adjacent unit includes:<br>getting a unit size for a first collocated unit in a first temporally adjacent picture among the pictures that are lower in the temporal hierarchy;<br>getting a unit size for a second collocated unit in a second temporally adjacent picture among the pictures that are lower in the temporal hierarchy; and<br>determining minimum unit size among the unit size for the first collocated unit and the unit size for the second collocated unit. |
| A10 | The method of claim A8, wherein the skipping includes excluding any candidate unit size less than the unit size for the at least one adjacent unit. |
| | |
| B | Skipping Evaluation of Transform Skip Mode |
| | |
| B1 | In a computer system, a method of media encoding comprising:<br>encoding a first picture among multiple pictures to produce encoded data for the first picture;<br>measuring usage of transform skip mode for the first picture;<br>outputting the encoded data for the first picture;<br>encoding a second picture among the multiple pictures to produce encoded data for the second picture, the second picture following the first picture in coding order, including selectively disabling transform skip mode for the second picture based at least in part on the usage of transform skip mode for the first picture; and<br>outputting the encoded data for the second picture. |
| B2 | The method of claim B1, wherein the first picture is entirely encoded using intra-picture-coded units, and wherein the second picture is at least partially encoded using inter-picture-coded units. |
| B3 | The method of claim B1, wherein the first picture is partially encoded using intra-picture-coded units, and wherein the second picture is at least partially encoded using inter-picture-coded units. |
| B4 | The method of claim B1, wherein the selectively disabling transform skip mode for the second picture includes:<br>comparing the usage of transform skip mode for the first picture to a threshold proportion; and<br>if the usage of transform skip mode for the first picture is more than the threshold proportion, evaluating both transform skip mode and transform mode for at least some units of the second picture;<br>if the usage of transform skip mode for the first picture is less than the threshold proportion, disabling transform skip mode for the second picture. |
| B5 | The method of claim B4, wherein the threshold proportion is between 1% and 3%. |
| | |
| C | Skipping Evaluation of Splitting Into Smaller Transform Size |
| | |
| C1 | In a computer system, a method of media encoding comprising:<br>encoding a picture to produce encoded data, wherein the encoding the picture includes setting a transform size or combination of transform sizes for a unit of the picture, including:<br>evaluating a condition at a current transform size; and<br>depending on results of the evaluating the condition at the current transform size, selectively skipping evaluation of whether to split the unit from the current transform size into multiple units having a smaller transform size; and<br>outputting the encoded data. |
| C2 | The method of claim C1, wherein the condition is whether the unit has any non-zero value coefficients at the current transform size. |
| C3 | The method of claim C1, wherein the condition is checked for only a luma block of the unit. |
| C4 | The method of claim C1, wherein the condition is checked for a luma block and chroma blocks of the unit. |
| | |
| D | Skipping In-Depth Evaluation for Partition Patterns |
| | |
| D1 | In a computer system, a method of media encoding comprising:<br>encoding a picture to produce encoded data, wherein the encoding the picture includes, when iteratively evaluating multiple candidate partition patterns for a unit of the picture, selectively performing residual coding depending on prediction quality for |

| | |
|---|---|
| | a given candidate partition pattern relative to a threshold prediction quality that is set based at least in part on prediction quality for a previously evaluated candidate partition pattern; and |
| | outputting the encoded data. |
| D2 | The method of claim D1, wherein the encoding the picture includes, for the given candidate partition pattern: |
| | performing motion estimation for the unit; |
| | measuring the prediction quality for the given candidate partition pattern based at least in part on results of the motion estimation for the unit; |
| | comparing the prediction quality for the given candidate partition pattern to the threshold prediction quality; and |
| | depending on results of the comparing, selectively performing residual coding for prediction error for the unit. |
| D3 | The method of claim D2, wherein the measuring the prediction quality for the given candidate partition pattern includes: |
| | determining the prediction error based on differences between sample values for the unit and motion-compensated prediction values resulting from the motion estimation; |
| | calculating the prediction quality for the given candidate partition pattern based at least in part on the prediction error. |
| D4 | The method of claim D2, wherein the encoding the picture further includes, for the given candidate partition pattern: |
| | measuring a total cost for encoding the unit with the given candidate partition pattern based at least in part on results of the residual coding; and |
| | if the total cost for encoding the unit with the given candidate partition pattern is less than a best total cost: |
| | updating the best total cost based on the total cost for encoding the unit with the given candidate partition pattern; and |
| | updating the threshold prediction quality based on the prediction quality for the given candidate partition pattern. |
| D5 | The method of claim D1, wherein the unit is a coding unit ("CU"), and wherein each of the multiple candidate partition patterns splits the CU into a different configuration of one or more prediction units ("PUs"). |
| D6 | The method of claim D1, wherein the threshold prediction quality is a threshold proportion of a best prediction quality among the multiple candidate partition patterns. |
| D7 | The method of claim D6, wherein the threshold proportion is between 105% and 120%. |

XIII. Alternatives and Variations.

In many of the examples described herein, an attribute for a current unit (e.g., current unit size, prediction quality) or picture (e.g., usage of transform skip mode) is compared to a threshold (e.g., unit size of adjacent unit(s), threshold unit size, threshold proportion, threshold prediction quality). In such examples, the case of the attribute equaling the threshold can be handled by selecting either of the two possible outcomes of the comparison, depending on implementation. That is, the case of the attribute equaling the threshold can be handled like the case of the attribute being larger than the threshold. Or, alternatively, the case of the attribute equaling the threshold can be handled like the case of the attribute being smaller than the threshold.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method of media encoding comprising:
   encoding a first picture among multiple pictures to produce encoded data for the first picture;
   determining a threshold unit size for the first picture, the threshold unit size indicating a unit size at or below which a threshold proportion of content of the first picture is reached, the threshold proportion being reached when units no larger than the threshold unit size cover the threshold proportion of the content of the first picture;
   outputting the encoded data for the first picture;
   encoding a second picture among the multiple pictures to produce encoded data for the second picture, the second picture following the first picture in coding order, including limiting unit size for at least part of the second picture based at least in part on the threshold unit size for the first picture; and
   outputting the encoded data for the second picture.

2. The method of claim 1, wherein the content of the first picture, for purposes of the threshold unit size, is intra-picture-coded units of the first picture.

3. The method of claim 2, wherein the first picture is entirely encoded using intra-picture-coded units, wherein the second picture is at least partially encoded using inter-picture-coded units, and wherein unit size is limited for any intra-picture-coded units in the second picture.

4. The method of claim 2, wherein the first picture is partially encoded using intra-picture-coded units, wherein the second picture is at least partially encoded using inter-picture-coded units, and wherein unit size is limited for any intra-picture-coded units in the second picture.

5. The method of claim 1, wherein the threshold proportion is between 80% and 95%, wherein the threshold unit size for the first picture is threshold coding unit ("CU") size for the first picture, and wherein the unit size for the at least part of the second picture is CU size.

6. The method of claim 1, wherein the unit size is limited for the at least part of the second picture by skipping evaluation of candidate unit sizes larger than the threshold unit size in the at least part of the second picture.

7. The method of claim 1, wherein the encoding the first picture includes splitting the first picture into multiple units, each of the multiple units of the first picture having one of multiple candidate unit sizes, wherein the threshold unit size is one of the multiple candidate unit sizes, and wherein the encoding the second picture includes splitting the second picture into multiple units, each of the multiple units of the second picture having one of the multiple candidate unit sizes that is no larger than the threshold unit size.

8. The method of claim 1, wherein the threshold proportion of content is a measure of sample values.

9. One or more computer-readable storage devices having stored thereon computer-executable instructions for causing one or more processing units, when programmed thereby, to perform media encoding operations comprising:
encoding a first picture among multiple pictures to produce encoded data for the first picture;
determining a threshold unit size for the first picture, the threshold unit size indicating a unit size at or below which a threshold proportion of content of the first picture is reached, the threshold proportion being reached when units no larger than the threshold unit size cover the threshold proportion of the content of the first picture;
outputting the encoded data for the first picture;
encoding a second picture among the multiple pictures to produce encoded data for the second picture, the second picture following the first picture in coding order, including limiting unit size for at least part of the second picture based at least in part on the threshold unit size for the first picture; and
outputting the encoded data for the second picture.

10. The one or more computer-readable storage devices of claim 9, wherein the content of the first picture, for purposes of the threshold unit size, is intra-picture-coded units of the first picture.

11. The one or more computer-readable storage devices of claim 10, wherein the first picture is entirely encoded using intra-picture-coded units, wherein the second picture is at least partially encoded using inter-picture-coded units, and wherein unit size is limited for any intra-picture-coded units in the second picture.

12. The one or more computer-readable storage devices of claim 10, wherein the first picture is partially encoded using intra-picture-coded units, wherein the second picture is at least partially encoded using inter-picture-coded units, and wherein unit size is limited for any intra-picture-coded units in the second picture.

13. The one or more computer-readable storage devices of claim 9, wherein the threshold proportion is between 80% and 95%, wherein the threshold unit size for the first picture is threshold coding unit ("CU") size for the first picture, and wherein the unit size for the at least part of the second picture is CU size.

14. The one or more computer-readable storage devices of claim 9, wherein the unit size is limited for the at least part of the second picture by skipping evaluation of candidate unit sizes larger than the threshold unit size in the at least part of the second picture.

15. A computer system comprising:
one or more picture buffers configured to store multiple pictures; and
a video encoder configured to perform operations comprising:
encoding a first picture among the multiple pictures to produce encoded data for the first picture;
determining a threshold unit size for the first picture, the threshold unit size indicating a unit size at or below which a threshold proportion of content of the first picture is reached, the threshold proportion being reached when units no larger than the threshold unit size cover the threshold proportion of the content of the first picture;
outputting the encoded data for the first picture;
encoding a second picture among the multiple pictures to produce encoded data for the second picture, the second picture following the first picture in coding order, including limiting unit size for at least part of the second picture based at least in part on the threshold unit size for the first picture; and
outputting the encoded data for the second picture.

16. The computer system of claim 15, wherein the content of the first picture, for purposes of the threshold unit size, is intra-picture-coded units of the first picture.

17. The computer system of claim 16, wherein the first picture is entirely encoded using intra-picture-coded units, wherein the second picture is at least partially encoded using inter-picture-coded units, and wherein unit size is limited for any intra-picture-coded units in the second picture.

18. The computer system of claim 16, wherein the first picture is partially encoded using intra-picture-coded units, wherein the second picture is at least partially encoded using inter-picture-coded units, and wherein unit size is limited for any intra-picture-coded units in the second picture.

19. The computer system of claim 15, wherein the threshold proportion is between 80% and 95%, wherein the threshold unit size for the first picture is threshold coding unit ("CU") size for the first picture, and wherein the unit size for the at least part of the second picture is CU size.

20. The computer system of claim 15, wherein the unit size is limited for the at least part of the second picture by skipping evaluation of candidate unit sizes larger than the threshold unit size in the at least part of the second picture.

* * * * *